United States Patent
Kagramanyan

(10) Patent No.: US 10,906,791 B2
(45) Date of Patent: Feb. 2, 2021

(54) APPARATUSES AND METHODS FOR CONTAINER CONTENT PRESERVATION

(71) Applicant: Norik Kagramanyan, Pacoima, CA (US)

(72) Inventor: Norik Kagramanyan, Pacoima, CA (US)

(*) Notice: Subject to any disclaimer, the term of this patent is extended or adjusted under 35 U.S.C. 154(b) by 149 days.

(21) Appl. No.: 15/946,409

(22) Filed: Apr. 5, 2018

(65) Prior Publication Data
US 2018/0222614 A1 Aug. 9, 2018

Related U.S. Application Data

(63) Continuation-in-part of application No. 15/727,558, filed on Oct. 6, 2017.

(60) Provisional application No. 62/404,764, filed on Oct. 6, 2016.

(51) Int. Cl.
| | |
|---|---|
| *B67B 7/04* | (2006.01) |
| *B65B 31/04* | (2006.01) |
| *B65D 81/20* | (2006.01) |

(52) U.S. Cl.
CPC ......... *B67B 7/0405* (2013.01); *B65B 31/041* (2013.01); *B65D 81/2007* (2013.01)

(58) Field of Classification Search
CPC .... B65D 81/20; B65D 81/2007; B65B 31/04; B65B 31/041; B67B 7/0405
USPC ......... 99/472, 277.1; 53/432, 510; 141/8, 65
See application file for complete search history.

(56) References Cited

U.S. PATENT DOCUMENTS

| | | | |
|---|---|---|---|
| 2,457,867 A * | 1/1949 | Chambers | B67B 3/24 53/79 |
| 5,535,900 A | 7/1996 | Huang | |
| 7,743,796 B1 * | 6/2010 | Schooley | B65D 39/0052 141/351 |
| 2003/0136091 A1 * | 7/2003 | Takahashi | B65B 31/02 53/510 |

(Continued)

FOREIGN PATENT DOCUMENTS

| | | |
|---|---|---|
| DE | 202004016080 U1 | 5/2005 |
| EP | 0272736 A1 | 6/1988 |

(Continued)

OTHER PUBLICATIONS

PCT/US2018/026264. International Search Report & Written Opinion (dated Sep. 24, 2018).

*Primary Examiner* — Reginald Alexander
(74) *Attorney, Agent, or Firm* — Loza & Loza, LLP; Sevan Savsa

(57) ABSTRACT

One feature pertains to a device that includes a main body having a bottle-receiving end that receives an end of a bottle having a mouth and forms an airtight seal between an exterior surface of the bottle and an interior air cavity of the main body. The device also includes an actuator assembly that drives a stopper securement device into a stopper positioned within the mouth of the bottle and retracts the stopper securement device to remove the stopper from the mouth of the bottle. The device also includes a vacuum pump that evacuates air out of the interior air cavity and the bottle's headspace after the stopper has been removed to create a vacuum within the headspace. The actuator assembly may also drive the stopper securement device and the stopper back into the mouth of the bottle to reseal the bottle while the headspace is under vacuum.

19 Claims, 55 Drawing Sheets

(56) References Cited

U.S. PATENT DOCUMENTS

| | | | |
|---|---|---|---|
| 2005/0016129 A1 | 1/2005 | Yoshida et al. | |
| 2008/0142470 A1 | 6/2008 | Van Der Lande | |
| 2010/0155419 A1* | 6/2010 | Nishino | B67D 1/04 |
| | | | 222/81 |
| 2011/0126939 A1* | 6/2011 | Luis | B65B 31/047 |
| | | | 141/65 |
| 2011/0204093 A1* | 8/2011 | Lee | B67D 1/0004 |
| | | | 222/152 |
| 2016/0136048 A1* | 5/2016 | Marantis | B67C 11/00 |
| | | | 141/331 |

FOREIGN PATENT DOCUMENTS

| | | |
|---|---|---|
| FR | 2394452 A1 | 1/1979 |
| FR | 2650816 A1 | 2/1991 |

\* cited by examiner

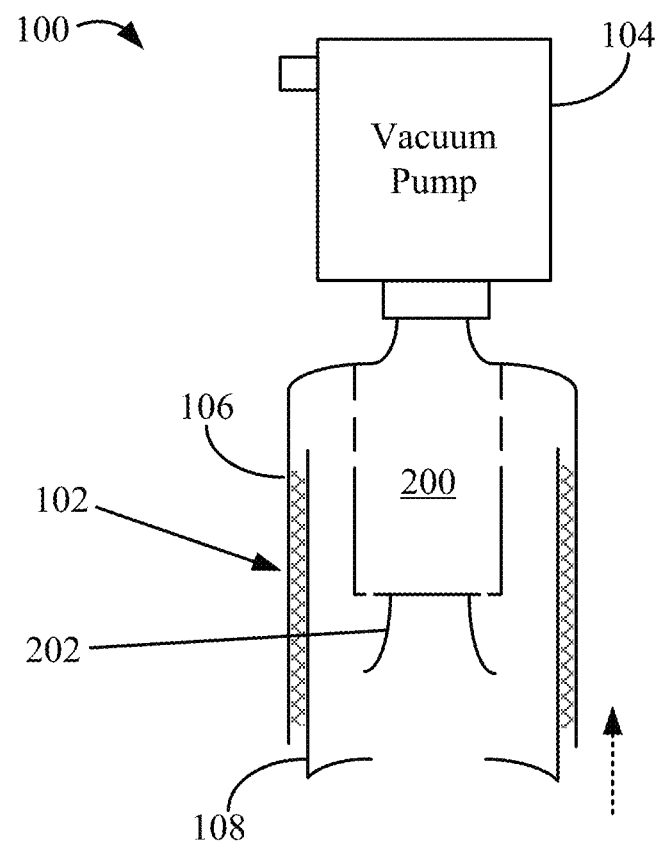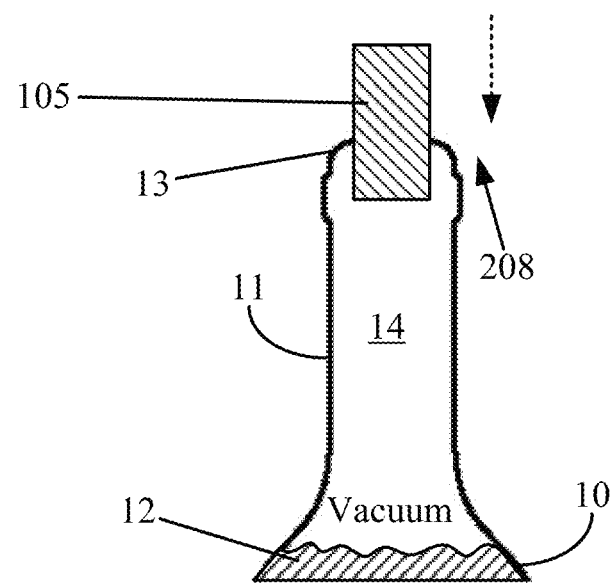
FIG. 8

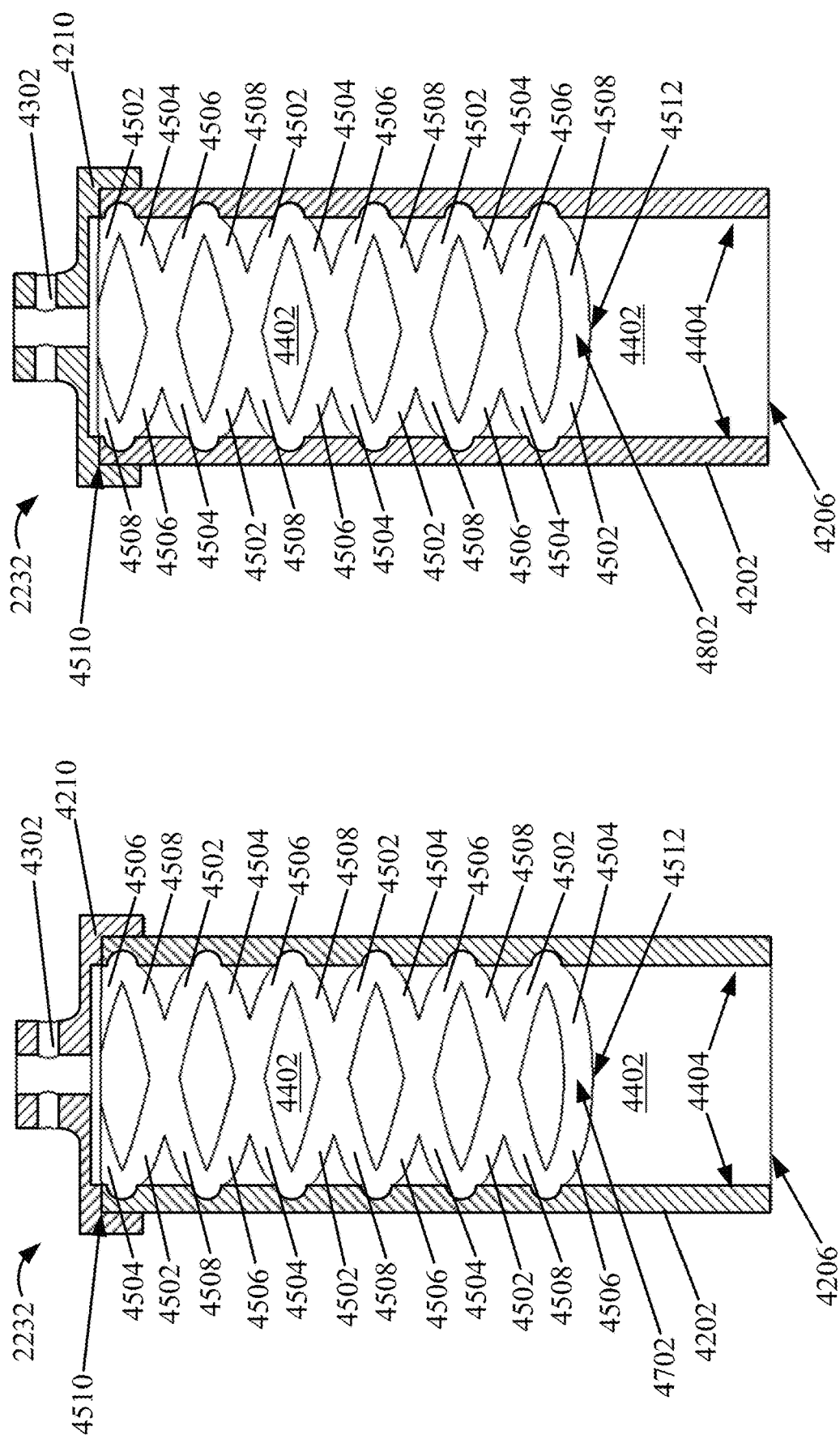

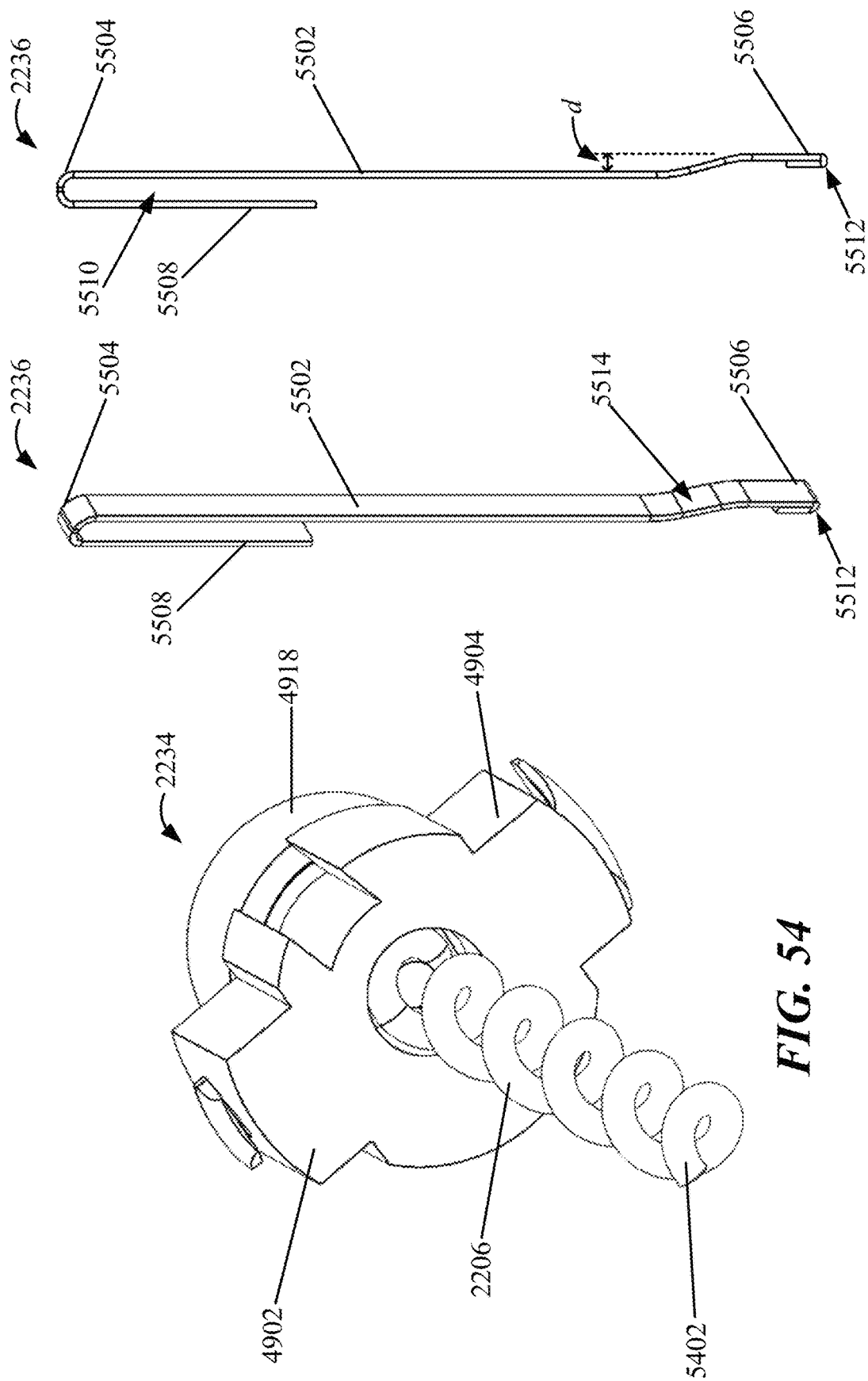

APPARATUSES AND METHODS FOR CONTAINER CONTENT PRESERVATION

CLAIM OF PRIORITY

The present application for patent is a continuation-in-part of U.S. application Ser. No. 15/727,558 entitled "APPARATUSES AND METHODS FOR CONTAINER CONTENT PRESERVATION" filed Oct. 6, 2017, which in turn claims priority to provisional application Ser. No. 62/404,764 entitled "APPARATUS AND METHOD FOR EVACUATING A BOTTLE AND SECURING A STOPPER WITHIN" filed Oct. 6, 2016, the entire disclosures of which are hereby expressly incorporated by reference.

BACKGROUND

Field

Various features relate to devices that create at least a partial vacuum within the headspace of a bottle prior to resealing the bottle. In particular, features relate to handheld devices that may open bottles having stoppers, such as wine bottles, and resealing such bottles under vacuum using the bottle's original stopper.

Background

Bottles containing fermented beverages, such as wine, are typically sealed with a cork stopper made of natural or synthetic materials. The cork is lodged within the neck of the bottle and prevents the bottle's contents from being exposed to air. The cork may be removed using a traditional corkscrew or other various tools and techniques.

Once the cork is removed, the wine is exposed to oxygen in the air and becomes susceptible to oxidation. Prolonged exposure to oxygen can detrimentally affect the quality and flavor of the wine. Thus, wine that remains in a partially consumed bottle can quickly deteriorate in smell and taste even if the bottle is re-corked. This occurs because oxygen that entered the bottle when the cork was removed remains in the headspace of the bottle after re-corking.

In an effort to preserve partially consumed wine, various vacuum sealers have been developed to remove air from the headspace of a bottle after re-corking so as to minimize oxidation of the wine. One such example is presented in U.S. Pat. No. 5,535,900. This conventional vacuum sealer, and other devices like it, utilize a hand pump working in conjunction with a specially designed stopper fitted with a one-way valve to evacuate air from the bottle. These systems have multiple and significant disadvantages. First, they are cumbersome and may be costly because they are two piece systems that require the use of device-specific stoppers that can only work with their corresponding vacuum pump device. Second, the number of device-specific stoppers a user has in their possession limits the number of bottles they can reseal. Sealing many bottles may require the user to order additional device-specific stoppers at additional cost. Third, such one-way valve stoppers have been known to work poorly because they are prone to air leakage.

Other common types of vacuum sealers are those that combine a vacuum pump and a stopper into one device. An example of one such pump and stopper combination is presented in U.S. Pat. No. 6,637,321. This conventional vacuum sealer, and other like it, are problematic because the entire device, including the pump, remains fixed atop the bottle. Thus, a user needing to preserve multiple bottles at the same time is forced to acquire a separate device for each bottle they wish to preserve.

All of the aforementioned systems also fail to provide any means for opening an unopened bottle. They are only meant to offer limited attempts to preserve the bottle's contents under vacuum. Thus, a user must also purchase and store a separate bottle opener, which can be cumbersome.

Therefore, there is a need for apparatuses that can both open bottles/containers and also preserve their contents under vacuum. There is also a need for apparatuses that reseal such bottles/containers without requiring device-specific, complex stoppers and allow a user to reseal many bottles without requiring additional parts or devices.

SUMMARY

One feature provides an apparatus comprising a main body having a bottle-receiving end that is configured to receive a bottle and form a substantially airtight seal between the main body and an exterior surface of the bottle surrounding a mouth of the bottle, the bottle-receiving end having a bottom opening to allow for fluid-flow communication between an interior air cavity of the main body and a headspace of the bottle, a stopper securement device, a vacuum pump configured to evacuate air out of the interior air cavity and the headspace to create a vacuum or partial vacuum within the headspace, and means for inserting a stopper into the mouth of the bottle using the stopper securement device after the vacuum pump evacuates air out of the interior cavity and the headspace, thereby sealing the bottle with the headspace of the bottle under vacuum or partial vacuum. According to one aspect, the apparatus further comprises a means for removing the stopper from the mouth of the bottle using the stopper securement device, the means for removing the stopper configured to remove the stopper prior to the vacuum pump evacuating air out of the interior air cavity and the headspace. According to another aspect, the means for inserting the stopper into the mouth of the bottle and the means for removing the stopper from the mouth of the bottle is an actuator assembly that includes an electric motor powered by a battery.

According to one aspect, the apparatus further comprises an input interface coupled to the main body, the input interface including at least one button that is configured to instruct the actuator assembly to move the stopper securement device. According to another aspect, the bottle-receiving end includes an elastic bottom surface configured to form a substantially airtight seal between the main body and the exterior surface of the bottle surrounding the mouth of the bottle. According to yet another aspect, the bottle-receiving end includes a foam ring configured to form a substantially airtight seal between the main body and the exterior surface of the bottle surrounding the mouth of the bottle.

According to one aspect, the vacuum pump includes an inlet within the interior air cavity of the main body to evacuate air from the interior air cavity and an outlet at or near an exterior surface of the main body to eject the air evacuated outside the apparatus. According to another aspect, the main body includes an upper portion, and a lower portion, wherein the upper portion and lower portion have different diameters and are slideably coupled to each other allowing one to retract into the other, the lower portion including the bottle-receiving end having the bottom opening. According to yet another aspect, the upper portion and the lower portion are configured to move relative to each other so that the upper portion lowers the stopper down into the mouth of the bottle after the vacuum pump evacuates air out of the interior cavity and the headspace. According to another aspect, the apparatus further comprises a locking mechanism coupled to the main body, the locking mechanism configured to prevent the upper portion and the lower portion from moving with respect to each other when engaged.

Another feature provides an apparatus comprising a housing having a bottle-receiving end that is configured to receive a bottle and form a substantially airtight seal between the housing and an exterior surface of the bottle surrounding a mouth of the bottle, the bottle-receiving end having a bottom opening to allow for fluid-flow communication between an interior air cavity of the housing and a headspace of the bottle, an actuator assembly operatively coupled to a stopper securement device, the actuator assembly configured to move the stopper securement device to secure to a stopper and remove the stopper from the mouth of the bottle, and a vacuum pump configured to evacuate air out of the interior air cavity and the headspace after the stopper has been removed to create a vacuum or partial vacuum within the headspace, wherein the actuator assembly is further configured to move the stopper securement device and the stopper secured thereto in order to insert the stopper into the mouth of the bottle. According to one aspect, the actuator assembly is further configured to extend the stopper securement device toward the bottom opening and into the stopper while rotating the stopper securement device. According to another aspect, the actuator assembly is further configured to retract the stopper securement device with the stopper secured thereto without rotating the stopper securement device. According to yet another aspect, the actuator assembly is further configured to extend the stopper securement device with the stopper secured thereto toward the bottom opening, and press the stopper into the mouth of the bottle while rotating the stopper securement device.

According to one aspect, the bottle-receiving end includes an elastic bottom surface configured to form a substantially airtight seal between the housing and the exterior surface of the bottle surrounding the mouth of the bottle. According to another aspect, the bottle-receiving end includes a foam ring configured to form a substantially airtight seal between the housing and the exterior surface of the bottle surrounding the mouth of the bottle. According to yet another aspect, the apparatus further comprises an air pressure sensor that determines whether the air pressure within the headspace has achieved or exceed a predetermined level of vacuum prior to the actuator assembly inserting the stopper into the mouth of the bottle.

According to one aspect, the vacuum pump is an electronic, battery-operated positive-displacement vacuum pump, and the actuator assembly includes a direct current (DC) electric motor that drives the stopper securement device. According to another aspect, the housing is substantially cylindrical in shape and the apparatus if a handheld, battery-operated device.

Another feature provides a method comprising inserting a mouth of a bottle into a bottom opening of a bottle-receiving end of a device to form a substantially airtight seal between the bottle-receiving end of the device and an exterior surface of the bottle surrounding the mouth of the bottle, providing fluid-flow communication between an interior air cavity of the device and a headspace of the bottle through the bottom opening, extending a corkscrew within the device toward the bottom opening of the bottle-receiving end to secure to a stopper within the mouth of the bottle, retracting the corkscrew to remove the stopper from the mouth of the bottle, storing the stopper within the interior air cavity of the device, evacuating air out from the interior air cavity of the device and the headspace of the bottle to create a vacuum or partial vacuum within the headspace, and extending the corkscrew with the stopper secured thereto toward the mouth of the bottle and inserting the stopper into the mouth of the bottle while the headspace of the bottle is under vacuum or partial vacuum.

Another feature provides an apparatus comprising a main body having a bottle-receiving end that is configured to receive an end of a bottle having a mouth and form an airtight seal between an exterior surface of the bottle surrounding the bottle's mouth and an interior air cavity of the main body, the bottle-receiving end having a bottom opening to allow for fluid-flow communication between the interior air cavity and a headspace of the bottle, an actuator assembly within the main body configured to drive a stopper securement device toward and away from the bottle-receiving end, the actuator assembly further configured to drive the stopper securement device into a stopper positioned within the mouth of the bottle and retract the stopper securement device to remove the stopper from the mouth of the bottle, and a vacuum pump configured to evacuate air out of the interior air cavity and the headspace after the stopper has been removed to create a vacuum or partial vacuum within the headspace, wherein the actuator assembly is further configured to drive the stopper securement device and the stopper back into the mouth of the bottle to reseal the bottle while the headspace is under vacuum or partial vacuum. According to one aspect of the disclosure, the apparatus further comprises a bottle securement assembly configured to secure the end of the bottle having the mouth to the apparatus and form the airtight seal between the exterior surface of the bottle surrounding the bottle's mouth and the interior air cavity of the main body in a bottle lock state, the bottle securement assembly further configured to release the end of the bottle having the mouth from the apparatus in a bottle unlock state. According to another aspect, the bottle securement assembly comprises a bottle lock nut having an interior cavity and a bottom opening, a bottle lock outer member that resides, at least in part, within the interior cavity of the bottle lock nut, the bottle lock outer member having a bottom opening, a bottle lock inner member having a lower portion and an upper portion, the lower portion of the bottle lock inner member including a ring of flexible teeth that forms a bottom cavity, and a bottle neck seal having a bottom opening, the bottle neck seal positioned, at least in part, within the bottom cavity of the bottle lock inner member's lower portion, and wherein the bottom openings of the bottle lock nut, bottle lock outer member, and the bottle neck seal are substantially aligned to allow the end of the bottle having the mouth to pass there through and rest within an internal cavity of the bottle neck seal.

According to one aspect of the disclosure, the bottle lock inner member includes a central opening configured to allow a stopper to pass from the bottom cavity of the bottle lock inner member's lower portion to an interior region of the bottle lock inner member's upper portion, the bottle neck seal including a top opening opposite the bottle neck seal's bottom opening that is aligned with the bottle lock inner member's central opening. According to another aspect, the bottle securement assembly comprises a bottle lock nut having a bottom opening, a bottle lock inner member including a ring of flexible teeth that forms a bottom cavity, the bottom cavity accessible via the bottle lock nut's bottom opening, and wherein the apparatus is placed in a bottle lock state by manipulating the bottle lock nut to cause the ring of flexible teeth to clamp down on an elastic material which presses against the exterior surface of the bottle surrounding the bottle's mouth to create a hermetic seal. According to yet another aspect, the actuator assembly further comprises a device head guide having an internal cavity, a stopper securement device head coupled to the stopper securement device, the stopper securement device head residing within the internal cavity of the device head guide, and a motor configured to rotate the device head guide, wherein rotation of the device head guide in a first direction causes the stopper securement device head and the stopper securement device to move toward the bottom opening of the bottle-receiving end, and rotation of the device head guide in a second direction causes the stopper securement device head and the stopper securement device to move away from the bottom opening of the bottle-receiving end.

According to one aspect, the device head guide includes a plurality of helical grooves along an inner surface of the device head guide's internal cavity, and the stopper securement device head includes at least one runner that resides in and navigates one or more of the plurality of helical grooves as the device head guide rotates to cause the stopper securement device head to move toward or away from the bottom opening of the bottle-receiving end. According to another aspect, the apparatus further comprises a bottle lock inner member having an upper portion that includes a first guide and a second guide, the first guide and the second guide extending into the device head guide's internal cavity through a bottom opening of the device head guide, the first guide and the second guide each having edges that limit rotational movement of the stopper securement device head. According to yet another aspect, the first guide includes a slit that receives a mode pin.

According to one aspect, the second guide includes at least one groove that receives a retractable protrusion on a rear face of the stopper securement device head. According to another aspect, the at least one groove of the second guide forms a path followed by the retractable protrusion that causes the stopper securement device head to rotate while the stopper securement device head moves toward or away from the bottom opening of the bottle-receiving end. According to yet another aspect, the apparatus further comprises a spin control accessory that resides within the internal cavity of the device head guide, the spin control accessory having a bottom opening and a top opening and an internal cavity there between, the spin control accessory including a bar that runs across the spin control accessory's internal cavity perpendicular to a longitudinal axis of the stopper securement device.

According to one aspect, the spin control accessory is configured to remain fixed within the internal cavity of the device head guide while the stopper securement device traverses the spin control accessory's internal cavity causing the stopper securement device to rotate as the stopper securement device moves past the spin control accessory's bar. According to another aspect, a termination point at a bottom end of a mode pin presses against a surface of the spin control accessory to hold the spin control accessory fixed within the internal cavity of the device head guide. According to yet another aspect, the spin control accessory is configured to move up and down through the device head guide's internal cavity with the stopper securement device so the stopper securement device does not rotate as it moves toward or away from the bottom opening of the bottle-receiving end.

According to one aspect, the stopper securement device head includes a pair of runners that navigate a first pair of helical grooves and a second pair of helical grooves that run along an inner surface of the device head guide's internal cavity, and when the apparatus is in a first state the pair of runners rest within a first position in the second pair of helical grooves, the stopper securement device head is located at a first position of the device head guide, and the spin control accessory is positioned at a bottom end of the device head guide. According to another aspect, when the apparatus transitions from the first state to a second state the pair of runners are configured to travel from the first position in the second pair of helical grooves to a groove transition point, the stopper securement device head is configured to travel down from the first position of the device head guide to a base point, and the stopper securement device is configured to rotate as it moves through the spin control accessory's internal cavity and past the spin control accessory's bar thereby penetrating into a stopper within a bottle positioned within the bottle opening of the bottle-receiving end. According to yet another aspect, when the apparatus transitions from the second state to a third state the pair of runners are configured to travel from the groove transition point to a second position in the first pair of helical grooves, the stopper securement device head is configured to travel up from the base point of the device head guide to a second position at a top end of the device head guide, the stopper securement device travels up along with the stopper securement device head to pull the stopper out of the bottle, and the spin control accessory moves up with the stopper securement device to prevent the stopper securement device from rotating.

According to one aspect, when the apparatus transitions from the third state to a fourth state the vacuum pump is configured to evacuate air out of the interior air cavity and headspace of the bottle to create a vacuum or partial vacuum within the headspace, the pair of runners are configured to travel from the second position in the first pair of helical grooves to the groove transition point, the stopper securement device head is configured to travel down from the second position at the top end of the device head guide to the base point, the stopper securement device travels down along with the stopper securement device head to push the stopper back into the bottle while the headspace is under vacuum or partial vacuum, and the spin control accessory moving down with the stopper securement device to prevent the stopper securement device from rotating. According to another aspect, when the apparatus transitions from the fourth state to the first state the pair of runners are configured to travel from the groove transition point to the first position of the second pair of helical grooves, the stopper securement device head is configured to travel up from the base point to the first position of the device head guide, the stopper securement device travels up along with the stopper securement device head while rotating and withdrawing from the stopper, and the spin control accessory remains fixed within the internal cavity of the device head guide.

Another feature provides an apparatus comprising a housing having a bottle-receiving end that is configured to receive an end of a bottle having a mouth and form an airtight seal between an exterior surface of the bottle surrounding the bottle's mouth and an interior air cavity of the housing, an actuator assembly within the housing configured to actuate a stopper securement device toward and away from the bottle-receiving end, the actuator assembly further configured to actuate the stopper securement device to penetrate into a stopper positioned within the mouth of the bottle and retract the stopper securement device to remove the stopper from the mouth of the bottle, the housing's interior air cavity configured to temporarily retain the stopper, and a vacuum pump configured to evacuate air out of the interior air cavity and the headspace after the stopper has been removed to create a vacuum or partial vacuum within the headspace, wherein the actuator assembly is further configured to actuate the stopper securement device to push the stopper back into the mouth of the bottle to reseal the bottle while the headspace is under vacuum or partial vacuum.

BRIEF DESCRIPTION OF THE DRAWINGS

FIG. 8 illustrates ambient air pressure being restored within an interior air cavity of the main body after removing the bottle.

FIGS. 45, 46, 47, and 48 illustrate cross-sectional views of the device head guide along the lines 45-45, 46-46, 47-47, and 48-48, respectively shown in FIG. 44.

FIG. 54 illustrates a bottom view of the stopper securement device head.

FIG. 55 illustrates a front perspective view of a mode pin.

FIG. 56 illustrates a side view of the mode pin.

DETAILED DESCRIPTION

In the following description, specific details are given to provide a thorough understanding of the various aspects (e.g., embodiments) of the disclosure. However, it will be understood by one of ordinary skill in the art that aspects of the disclosure may be practiced without these specific details. The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Figure 1:
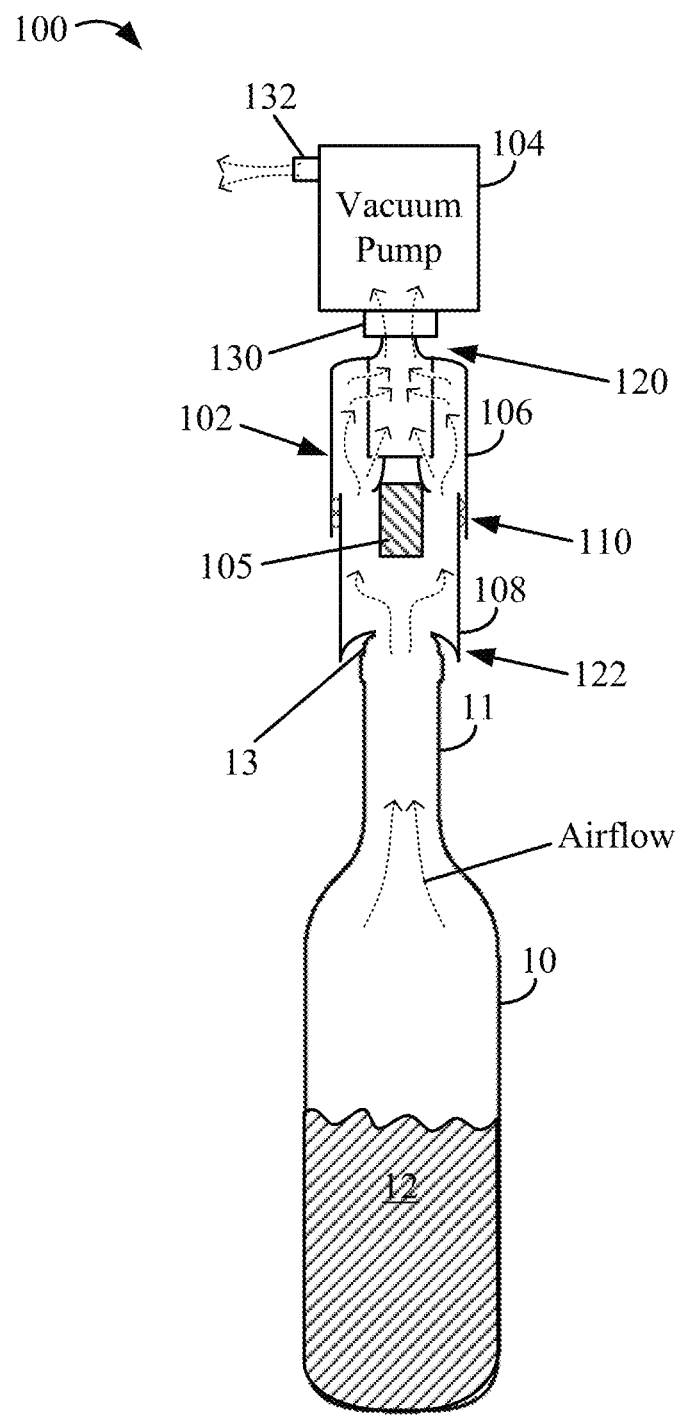
FIG. 1 illustrates a cross-sectional schematic view of a device for evacuating a bottle and securing a stopper within.

FIG. 1 illustrates a cross-sectional schematic view of a device 100 (e.g., apparatus) for evacuating a bottle 10 and securing a stopper within according to one aspect. As just one example the device 100 may be a handheld device used to evacuate air containing oxygen from a wine bottle 10 and secure a stopper (e.g., natural cork, rubber cork, etc.) 105 within the neck 11 of the bottle 10. Evacuating the air within the bottle 10 preserves the contents (e.g., wine) 12 of the bottle 10 longer, which having been previously opened may have been exposed to oxygen. For the sake of clarity the description that follows assumes the device 100 is used to reseal a bottle of wine with a cork. However, in practice the device 100 may be used to evacuate air from any type of bottle containing any type of substance and secure a stopper within an opening of the bottle.

Referring to FIG. 1, the device 100 includes a main body 102 (e.g., housing) that is in fluid communication with a vacuum pump 104. The main body 102 may be substantially hollow and, as described in greater detail below, the vacuum pump 104 is used to evacuate the hollow main body 102 and air space within a bottle 10 coupled to the main body 102. The main body 102 includes an upper portion 106 and a lower portion 108 that are slideably coupled to one another at an air tight juncture 110. The upper portion 106 includes a top end (e.g., first end) 120 having an opening that couples to the vacuum pump 104. The lower portion 108 includes a bottom end (e.g., first end) 122 that couples to the top of an open wine bottle 10 to form an airtight seal between the wine bottle 10 and the device 100. The wine bottle 10 is at least partially full of wine 12. A bottom end of the upper portion 106 couples to a top end of the lower portion 108 at the airtight juncture 110.

The vacuum pump 104 may be any vacuum pump known in the art that includes an inlet 130 for sucking out air from the vessel to be evacuated and an outlet 132 to dispel the air sucked out from the vessel. In one aspect, the vacuum pump 104 is a manually (e.g., hand) operated positive displacement pump. In another aspect, the vacuum pump 104 is a battery operated positive displacement pump. Regardless of the specific operative characteristics of the vacuum pump 104 used, the vacuum pump's inlet 130 is coupled to the device's main body 102 and the pump 104 serves to evacuate the air contained within the main body 102 through the opening at the upper portion's top end 120. Since the bottle 10 is in fluid communication with the main body 102, air within the bottle 10 itself is also evacuated.

Figure 2:
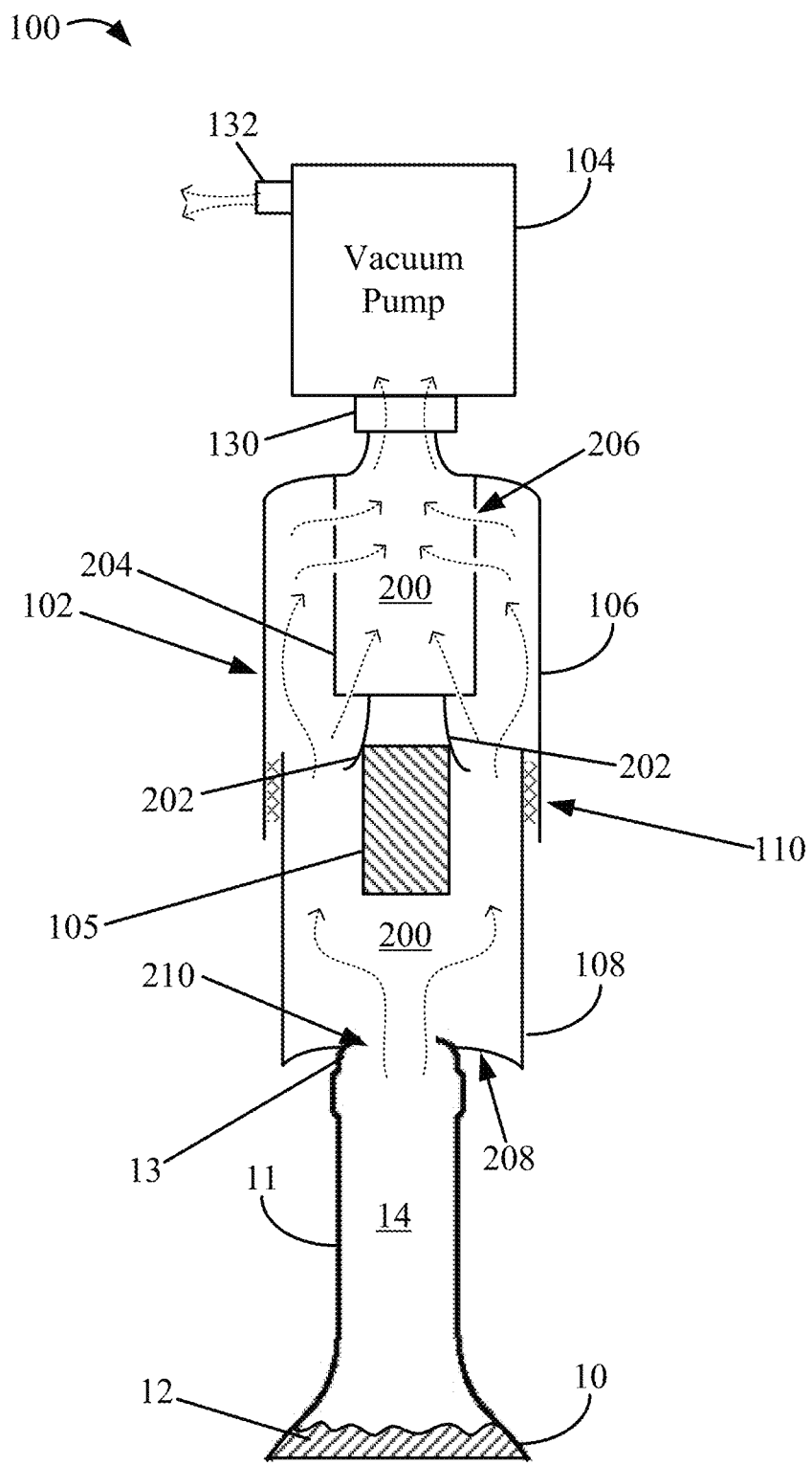
FIG. 2 illustrates a cross-sectional view of the device of FIG. 1 and its features in greater detail.

FIG. 2 illustrates a cross-sectional view of the device 100 and its features in greater detail. The upper portion 106 includes a stopper securement device 202 (e.g., stopper securement device) that is adapted to receive and secure a stopper such as, but not limited to, a cork 105. In one aspect, the stopper securement device 202 may be a plurality of prongs that have a curved shape as shown. In another aspect, the stopper securement device 202 may be a funnel shaped cup having a curved inner surface that is again adapted to receive and secure a cylindrical stopper like a cork. The stopper securement device 202 in all its various forms may constitute examples of a means for securing a stopper 105 within the main body 102.

The stopper securement device 202 may in turn be coupled to a mount 204 that is secured to the inner wall(s) of the upper portion 106. The mount 204 includes a plurality of vents 206 to allow air to pass through the mount 204. According to one aspect, the upper portion 106 and/or the mount 204 alone or together may be non-limiting, non-exclusive examples of a means for inserting a stopper 105 into a mouth 13 of a bottle using the stopper securement device 202.

The lower portion 108 includes an elastic bottom surface 208 that fits over the open end of the wine bottle's neck 11 to form an airtight seal between the main body's hollow interior chamber 200 (e.g., "main body's interior air cavity") and the wine bottle's headspace 14. The lower portion 108 also includes an opening 210 that allows air (dashed arrows) to move between the main body chamber 200 and the wine bottle's headspace 14.

Figure 3:
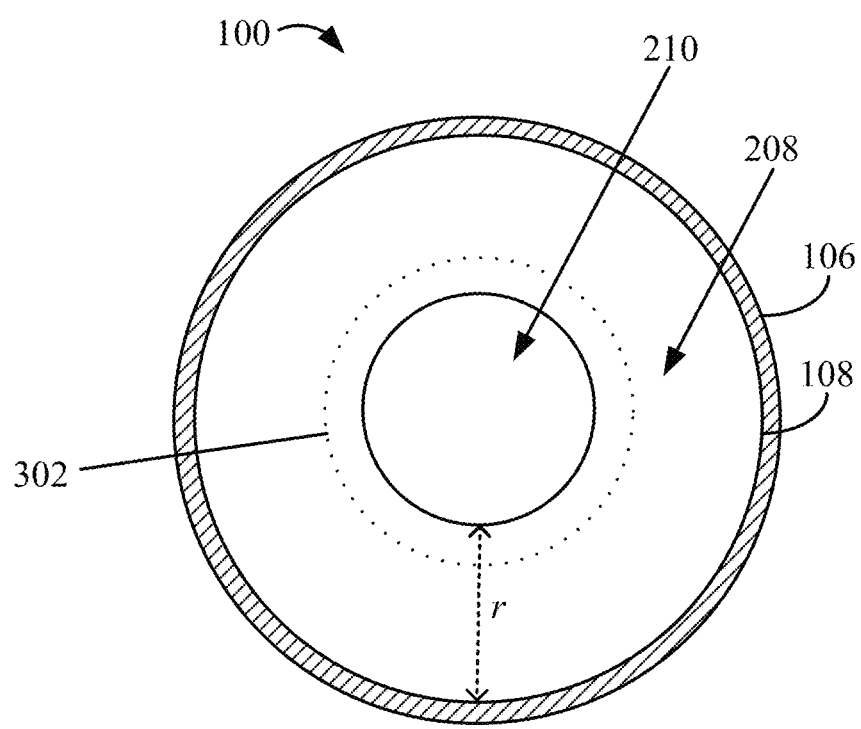
FIG. 3 illustrates a bottom view of the device of FIG. 1.

FIG. 3 illustrates a bottom view of the device 100 according to one aspect. Referring to FIGS. 1-3, the bottom end 122 (e.g., "bottle-receiving end") of the lower portion 108 includes a bottom opening 210 that allows air to flow from the bottle 10 into the main body's chamber 200. Surrounding the bottom opening 210 may be an elastic bottom surface 208 that is adapted to press against the mouth 13 of a bottle (e.g., open end of a wine bottle's neck) and create an airtight seal. The elastic bottom surface 208 may be composed of rubber, silicon, foam, etc. The elastic bottom surface 208 is relatively wide in size (i.e., distance r) so that it can accommodate bottles having mouths of various shapes and sizes. The dotted circle 302 indicates where the mouth of an exemplary bottle may press against the elastic bottom surface 208 as it is inserted through the bottom opening 210.

Figure 4:
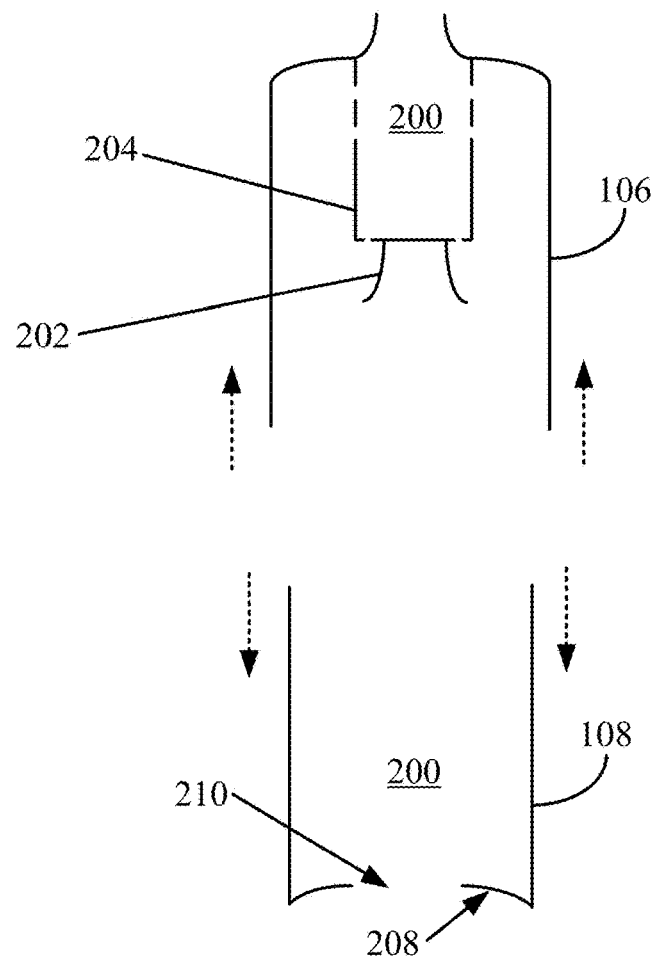
FIG. 4 illustrate that the device may be first opened up by detaching the upper and lower portions of the main body from one another.
Figure 5:
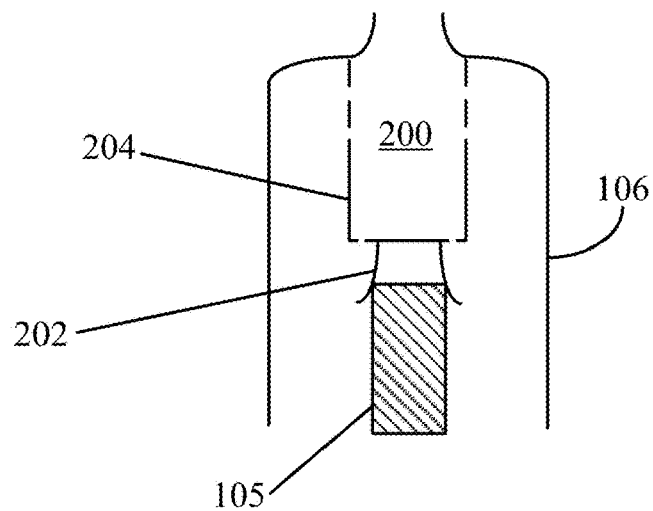
FIG. 5 illustrates a wine bottle cork secured to the stopper securement device.
Figure 6:
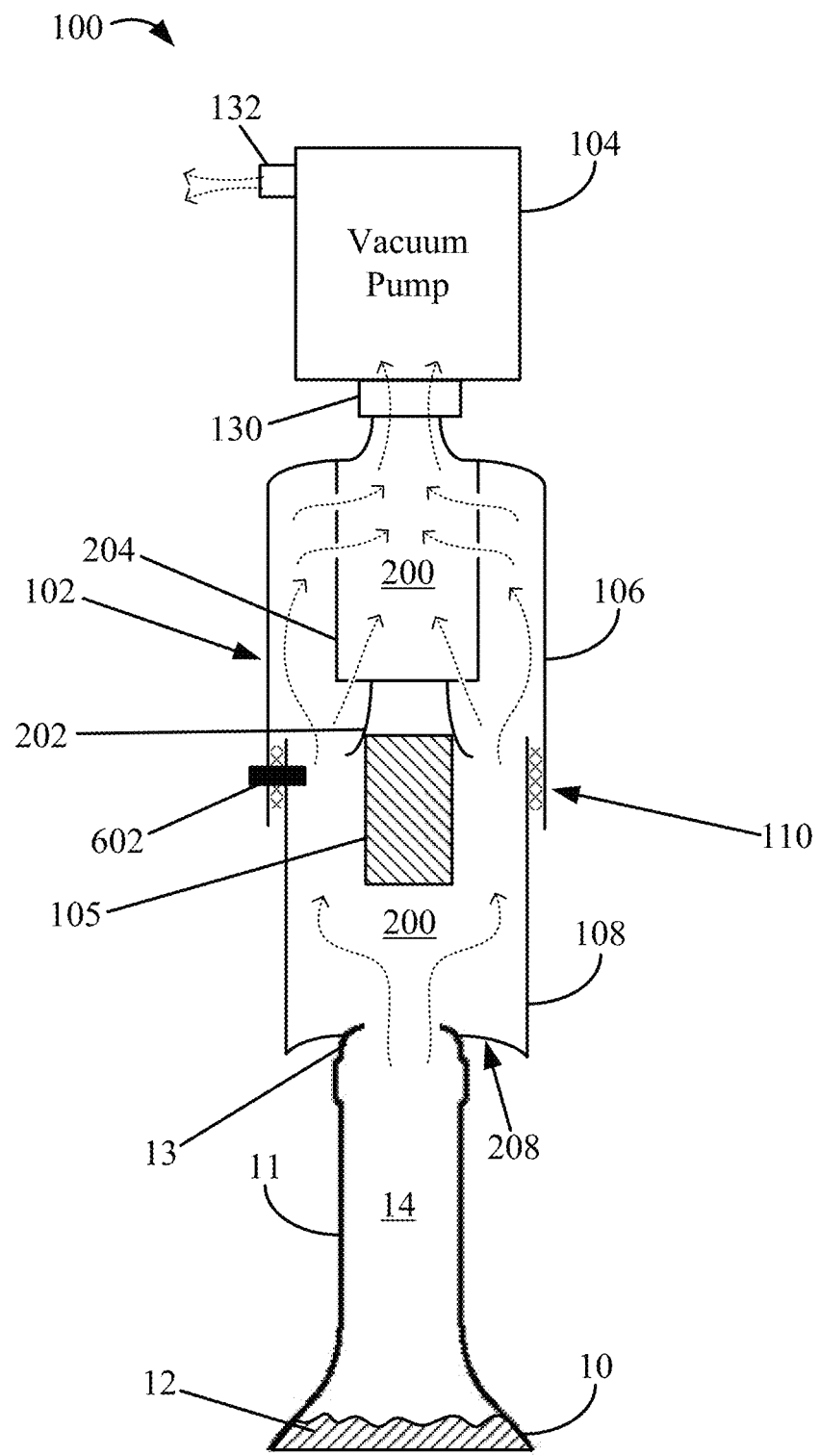
FIG. 6 illustrates the device reassembled and the elastic bottom surface pressed over the wine bottle neck's opening.

FIGS. 4-7 illustrate the device 100 in operation according to one aspect. Referring to FIG. 4, the device 100 is first opened up by, for example, detaching the upper and lower portions 106, 108 of the main body from one another as shown by the dashed arrows. Then, referring to FIG. 5, a wine bottle's cork 105 is secured to the stopper securement device 202 by pressing the cork 105 into the securement device 202. Referring to FIG. 6, the device 100 is then reassembled and the elastic bottom surface 208 is pressed over the wine bottle neck's opening (i.e., bottle's mouth and at least a portion of its neck are inserted through the bottom opening 210.

A user next operates the vacuum pump 104 to draw out air (dashed arrows) within the main body's chamber 200 by creating a vacuum within the chamber 200. The vacuum created within the main body's chamber 200 also draws out air from the open wine bottle's headspace 14 because the main body's inner chamber 200 is in fluid communication with the bottle's headspace 14 via the bottom opening 210. The user continues to work the vacuum pump 104 until a sufficient amount of air is drawn out from the wine bottle's headspace 14. An indicator (e.g., output device 2010 of FIG. 20) may provide notice to the user when a sufficient amount of air has been evacuated. The indicator may be visual or auditory in nature and may measure or otherwise be indicative of the air pressure within the chamber 200.

Note that the device 100 in FIG. 6 is shown in an uncompressed state where the upper and lower portions 106, 108 of the main body 102 are extended from one another yet are still coupled at the juncture 110. A locking mechanism 602 may be utilized to keep the upper and lower portions 106, 108 in the uncompressed position while air is drawn out of the chamber 200 and headspace 14. The lock 602 may be engaged while the vacuum pump 104 is being operated to draw out air from the bottle 10. The lock 602 helps prevent the upper portion 106 from undesirably collapsing down into the lower portion 108 prematurely before the desired volume of air has been evacuated.

Figure 7:
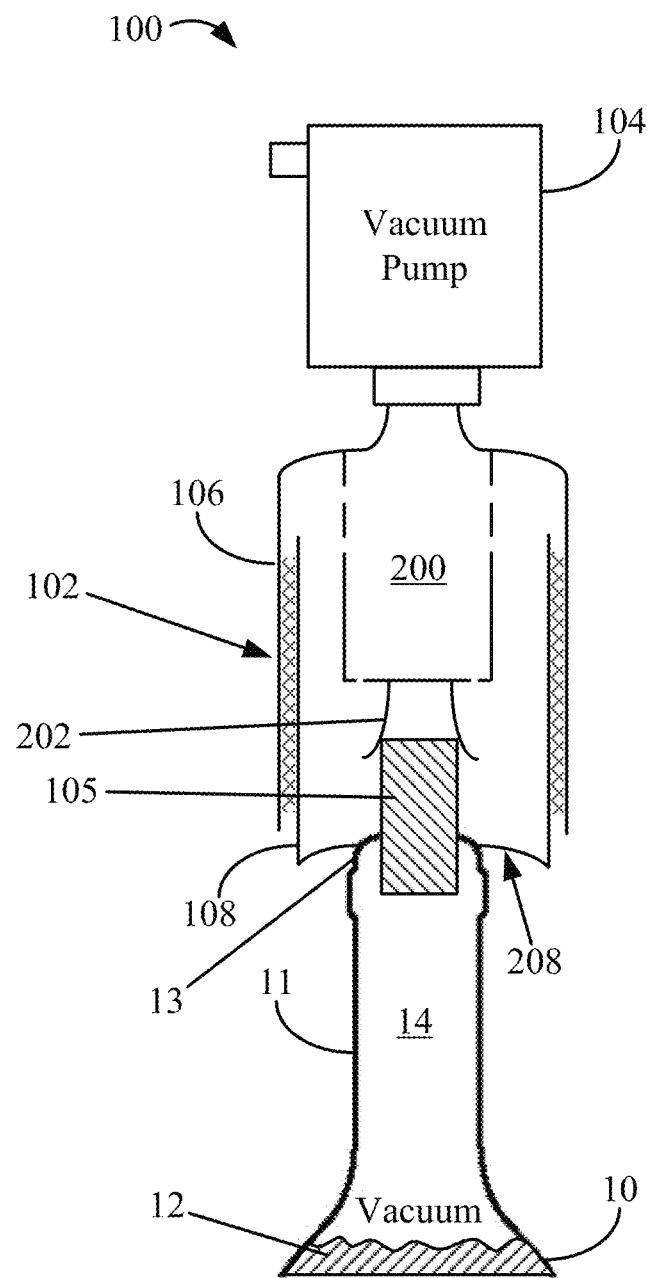
FIG. 7 illustrates the lock being disengaged and the upper portion of the main body pushing downward to lower the stopper into the mouth of the bottle.

Referring to FIG. 7, once a sufficient amount of air has been drawn out from the bottle's headspace 14, the user may disengage the lock 602 and push down on the upper portion 106 of the main body 102 so that it lowers down over the lower portion 108. Lowering the upper portion 106 down also lowers the cork 105 down through the lower portion's opening 210 and into the wine bottle's open end thereby sealing the bottle 10 which is now under vacuum. This places the device 100 in a compressed state with the upper and lower portions 106, 108 pushed in toward each other.

Referring to FIG. 8, after the cork 105 is secured within the bottle 10, ambient air pressure may be restored within the chamber 200 (e.g., detaching the vacuum pump 104) and the main body 102 may be removed from the bottle 10 leaving the cork 105 within the bottle 10. Since the air, including oxygen, within the bottle 10 was evacuated before the cork 105 was secured, the wine is stored under vacuum. The lack of oxygen within the wine bottle 10 helps preserve the wine within. Notably, the wine bottle's own cork 105 may be reused to help preserve the wine and there is no need for specially designed stoppers. The same device may be used to reseal dozens of wine bottles with their own corks without having to purchase a separate device 100 and/or special stopper for each partially opened bottle to be preserved.

Figure 9:
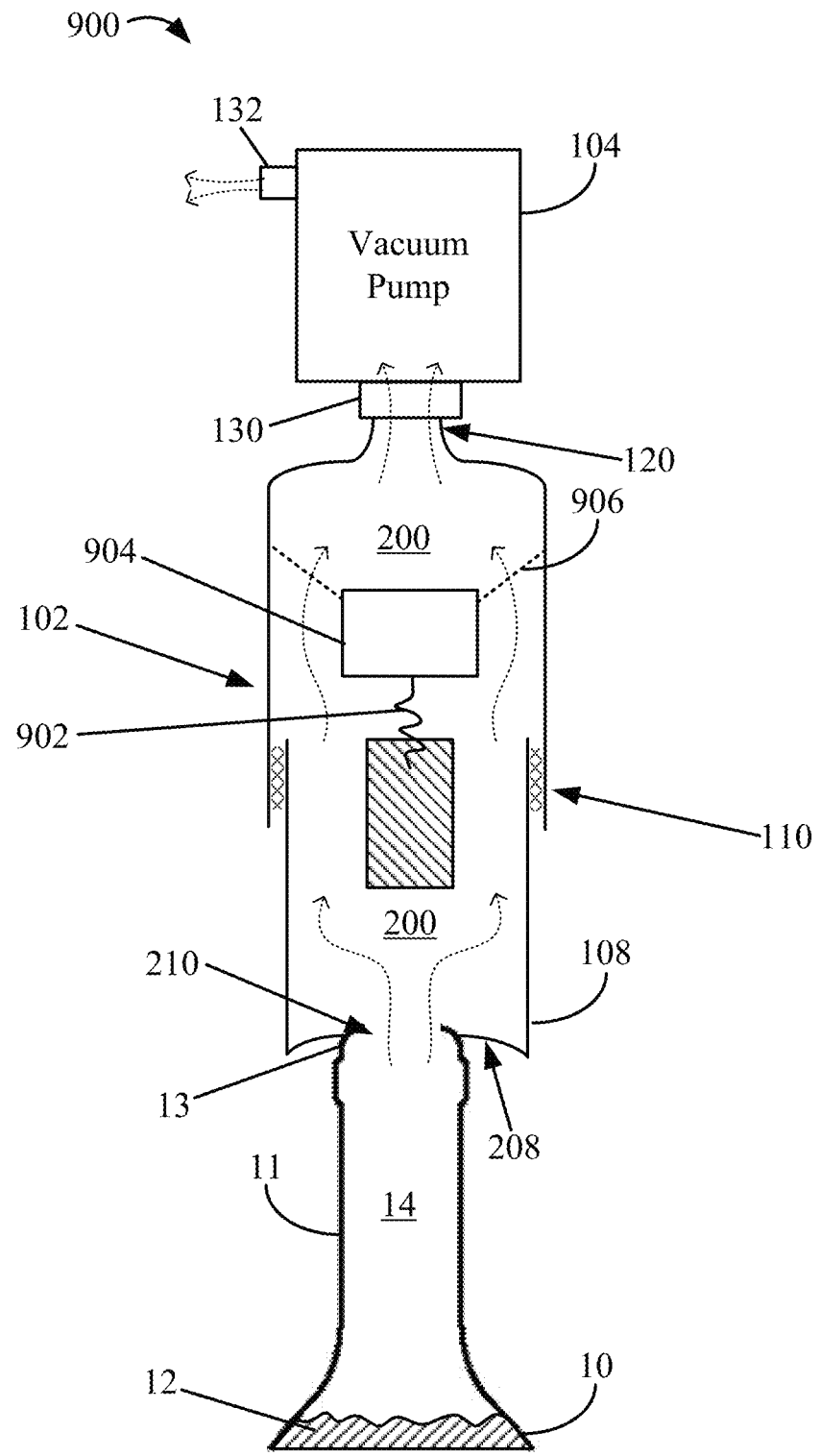
FIG. 9 illustrates another cross-sectional schematic view of a device for evacuating a bottle and securing a stopper within.

FIG. 9 illustrates a cross-sectional schematic view of a device 900 for evacuating a bottle 10 and securing a stopper within according to another aspect. In the illustrated example, the stopper securement device 902 is a pin, threaded screw, or a corkscrew, which may all be examples of a means for securing a stopper 105 within the main body 102. The stopper securement device 902 is secured to a stopper securement device mount 904 that is secured to one or more walls of the upper portion's inner surface via one or more support members 906 such as support rods, plates, pieces, etc. The support members 906 may be evenly spaced like spokes to allow air to flow unimpeded from the lower portion's opening 210 and out through the opening 120 at the top portion 106 near the vacuum pump 104. In FIGS. 1-4 and 6-9, the device's upper portion 106 is depicted as having a larger diameter than the lower portion 108. However, in another aspect, this may be reversed so that the upper portion 106 fits within the lower portion 108. According to one aspect, the upper portion 106 and/or the mount 904 alone or together may constitute some examples of means for inserting a stopper 105 into a mouth of a bottle using the stopper securement device 902.

Figure 10:
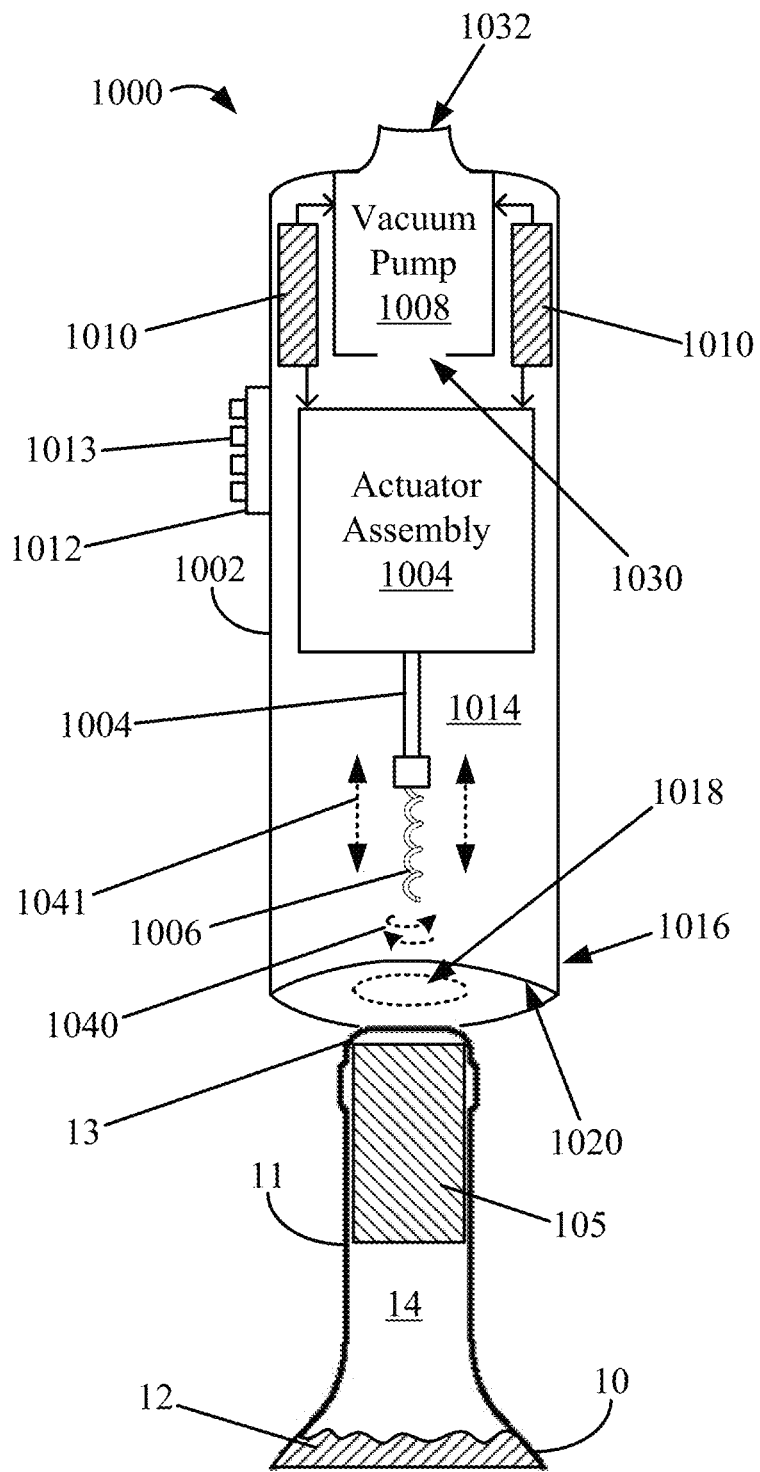
FIG. 10 illustrates yet another cross-sectional schematic view of a device.

FIG. 10 illustrates a cross-sectional schematic view of a device 1000 (e.g., apparatus) according to one aspect. As just one example, the device 1000 may be used to: remove a stopper (e.g., natural cork, rubber cork, etc.) 105 from the neck 11 of a bottle 10; evacuate air containing oxygen from a wine bottle's headspace 14; and reseal the wine bottle 10 using the same stopper 105 previously removed. For the sake of clarity the description that follows assumes the device 1000 is used to open and reseal a bottle of wine having a cork. However, in practice the device 1000 may be used to evacuate air from different types of bottles or containers that contain different types liquids and/or solids. The device 1000 may then be used to reseal such bottles or containers after the air within their headspace has been evacuated.

The device 1000 may include a main body 1002 (e.g., housing) that houses various components of the device 1000 such as, but not limited to, an actuator assembly 1004, a stopper securement device 1006, a vacuum pump 1008, a power source 1010 (e.g., batteries, transformer, etc.), and/or an input/output (I/O) interface 1012. The main body 1002 may be relatively small so that the device 1000 may be held in the hand of a user. The main body 1002 may be cylindrical in shape as shown or may have other generalized shapes like a rectangular or hexagonal prism shape.

Space within the main body 1002 that is unoccupied by one or more of these components forms an interior air cavity 1014 of the device 1000. As described in greater detail below, the vacuum pump 1008 is used to evacuate air within this interior air cavity 1014 and also the headspace 14 of a bottle coupled to a bottom end 1016 of the device 1000. In the example illustrated in FIG. 10, the main body 1002 substantially houses the vacuum pump 1008. In other aspect of the disclosure, the vacuum pump may be external to the main body 1002, similar to the device 100 shown in FIG. 2. According to one non-limiting, non-exclusive example, the stopper securement device 1006, which may be one example of a means for securing a stopper within the main body 1002 of the device, may be a corkscrew as shown. However, in practice the stopper securement device 1006 may be any device of varying design and construction that may secure to grasp a stopper such as a cork. For the sake of simplicity the stopper securement device 1006 may be referred to below as a corkscrew.

Referring to FIG. 10, the actuator assembly 1004 is coupled to the corkscrew 1006 and is used to rotate 1040 the corkscrew 1006 and also move it in a longitudinal direction (e.g., up and down; toward and away from the bottle's cork) 1041. The actuator assembly 1004 may be hydraulic, pneumatic, electric, and/or mechanical in nature and operation. However, in preferred aspects, the actuator assembly 1004 is electric and/or mechanical. For example the actuator assembly 1004 may include an electric motor, gears, and a driveshaft to drive the corkscrew 1006 up and down in the longitudinal direction 1041 and also rotate 1040 the corkscrew 1006 clockwise and counterclockwise. As described in greater detail below, the actuator assembly 1004 drives the corkscrew 1006 into a cork 105 lodged within a bottle's neck and removes the cork 105. The actuator assembly 1004 and corkscrew 1006 may also drive the cork 105 back into the bottle to reseal the bottle. The actuator assembly 1004 may be one non-limiting, non-exclusive example of a means for inserting the stopper 105 into the mouth 13 of the bottle 10 using the stopper securement device 1006.

The vacuum pump 1008 evacuates air contained within the main body's air cavity 1014 and also the headspace 14 of the bottle 10 and releases it outside of the device 1000. Specifically, the vacuum pump 1008 may draw in air contained within the cavity 1014 and headspace 14 from its inlet 1030 and releases the air out through its outlet 1032. Various types of vacuum pumps 1008 known in the art may be used. In one aspect, such as the example shown in FIG. 10, the vacuum pump 1008 is a battery powered positive displacement pump. In other aspects, the vacuum pump may be a manually-operated (e.g., hand) positive displacement pump. Regardless of the specific operative characteristics of the vacuum pump 1008 used, the vacuum pump's inlet 1030 is within or otherwise exposed to the main body's cavity 1014 so that it can draw in air from within the main body's cavity 1014 and bottle's headspace 14 and release it out through its outlet 1032 to the ambient air outside of the device 1000.

The main body's bottom end 1016 (e.g., herein referred to as either "main body's first end" or "bottle-receiving end") is adapted to couple to and form an airtight seal around the bottle's neck 11 and/or mouth 13. The bottom end 1016 includes an bottom opening 1018 large enough to allow a bottle's stopper (e.g., wine bottle cork/stopper) to pass through it. The opening 1018 also allows air to be drawn out from the bottle's headspace 14 into the main body's interior air cavity 1014 when the device's vacuum pump 1008 is operating. The bottom end 1016 may feature different components to help maintain an airtight seal around the bottle's neck 11 and/or mouth 13 so that air drawn into main body's interior air cavity 1014 is drawn in from the bottle's headspace 14 and not from ambient air located outside of the mouth 13 of the bottle 10.

According to one non-limiting, non-exclusive example, the bottom end 1016 may feature an elastic bottom surface 1020 like the elastic bottom surface 208 shown and described herein with respect to FIG. 3. The elastic bottom surface 1020 surrounds the bottom opening 1018 and may be made of rubber, and/or airtight, dense foam that when fitted over the bottle's mouth 13 and/or neck 11 substantially prevents ambient air outside of the bottle from entering the headspace 14 or main body's interior air cavity 1014.

Figure 11:
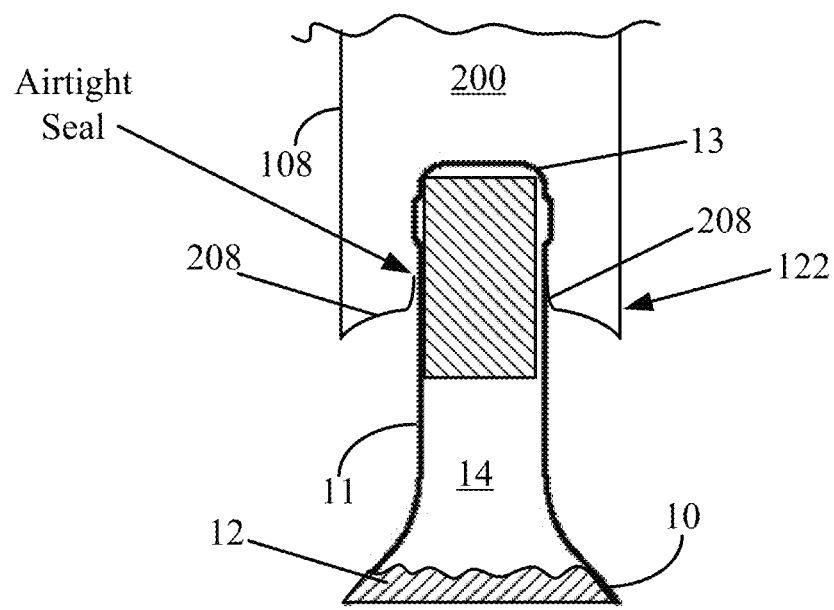
FIGS. 11 and 12 illustrate cross-sectional views of non-limiting, non-exclusive examples of how the elastic bottom surfaces fit over a bottle's neck and mouth to form an airtight seal.
Figure 12:
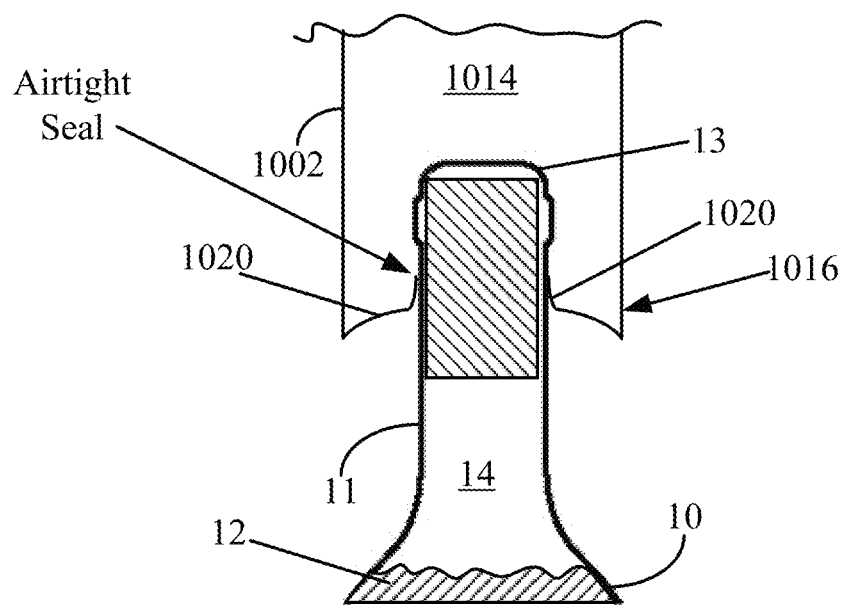

FIGS. 11 and 12 illustrate cross-sectional views of non-limiting, non-exclusive examples of how the elastic bottom surfaces 208, 1020 fit over a bottle's neck 11 and mouth 13 to form an airtight seal. In both FIGS. 11 and 12 the bottle's mouth 13 and neck 11 pass through the bottom opening 210, 1018 (see FIGS. 2 and 10) of the device 100, 1000 while the elastic bottom surfaces 208, 1020 press up against the sides of the bottle's neck 11 and/or mouth 13 all the way around the circumference of the bottle's neck 11 and/or mouth 13. This forms an airtight seal around the circumference of the bottle's neck 11 and/or mouth 13.

Figure 13:
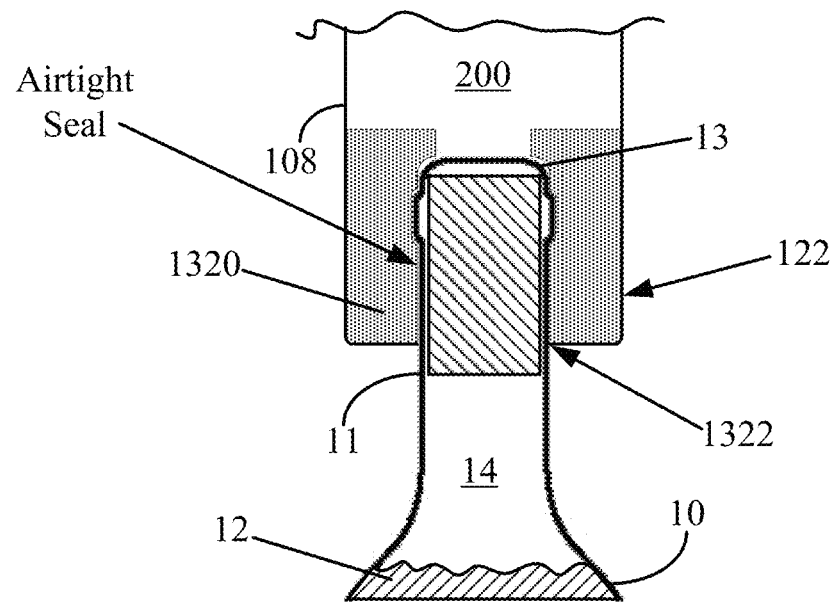
FIGS. 13 and 14 illustrate cross-sectional views of other non-limiting, non-exclusive examples of how the bottom ends of the devices may form airtight seals with a bottle.
Figure 14:
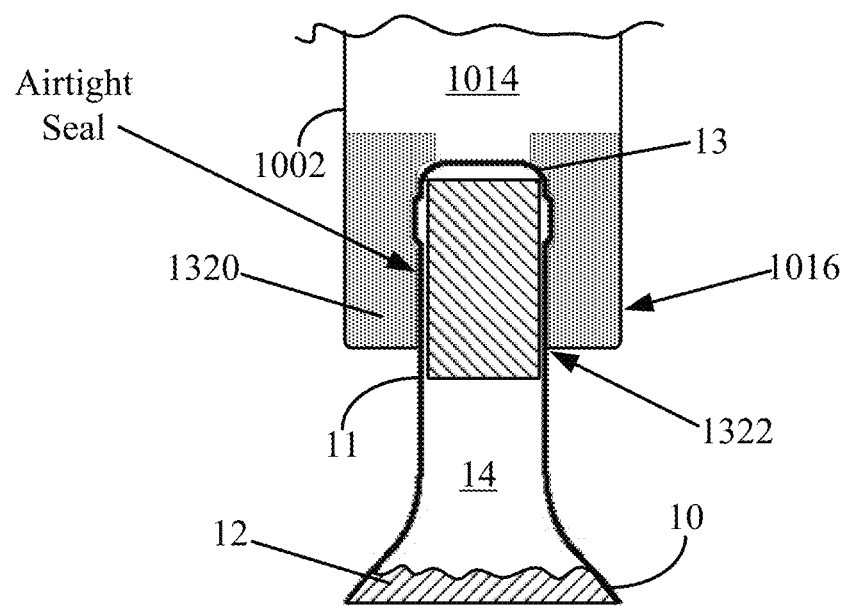

FIGS. 13 and 14 illustrate cross-sectional views of other non-limiting, non-exclusive examples of how the bottom ends 122, 1016 of the devices 100, 1000 may form airtight seals with a bottle 10. The devices' bottom ends 122, 1016 may include an airtight, dense foam ring 1320 that snugly fits over a bottle's neck 11 and mouth 13 to form an airtight seal. In both FIGS. 13 and 14 the bottle's mouth 13 and neck 11 pass through a bottom opening 1322 of the device 100, 1000 while the foam ring 1320 presses up against the sides of the bottle's neck 11 and/or mouth 13 all the way around the circumference of the bottle's neck 11 and/or mouth 13. This forms an airtight seal around the circumference of the bottle's neck 11 and/or mouth 13.

Referring back to FIG. 10, the power source 1010 may be one or more batteries according to one aspect. In the case where the power source 1010 is a battery, it may provide electrical power (e.g., direct current (DC)) to a DC electric motor of the actuator assembly 1004. The battery may also provide electrical power to the vacuum pump 1008 in aspects where the vacuum pump 1008 is electrically powered. The battery may also provide electrical power to other electronic components (e.g., I/O interface 1012) or circuits of the device 1000.

According to one aspect, the I/O interface 1012 may include a plurality of buttons 1013 that control the actuator assembly 1004 and/or the vacuum pump 1008. For example, one button 1013 may cause the actuator assembly 1004 to lower or extend out the corkscrew 1006 and rotate it in such a direction so as to cause the corkscrew 1006 to penetrate the bottle's stopper 105 and be firmly secured therein. Another button or the same button may then cause the actuator assembly 1004 to then raise or retract the corkscrew 1006 without rotation so as to pull the bottle's stopper 105 out from its position within the bottle's neck 11. Yet another button may then cause the actuator assembly 1004 to lower or extend the corkscrew 1006 with the stopper 105 still attached back into the bottle's neck 11. Yet another button or the same button may then cause the actuator assembly 1004 to raise or retract the corkscrew 1006 and rotate the corkscrew 1006 in an opposite direction so as to leave the stopper 105 within the bottle's neck while withdrawing the corkscrew 1006 from the stopper 105.

According to one aspect, the I/O interface 1012 may include a display that provides the user with operational information of the device 1000, such as, what setting the device 1000 is currently in, any operational errors or warnings for the device 1000, battery life, battery charging progress, etc. While not shown in FIG. 10, the device 1000 may also include various electronic components such as controllers, buses, memory, etc. that are known to one of ordinary skill in the art to allow the I/O interface to send control instructions to the actuator assembly 1004 and the vacuum pump 1008 as well as receive signals and data back from such systems 1004, 1008.

FIGS. 15-19 illustrate the device 1000 in operation according to one aspect of the disclosure.

Figure 15:
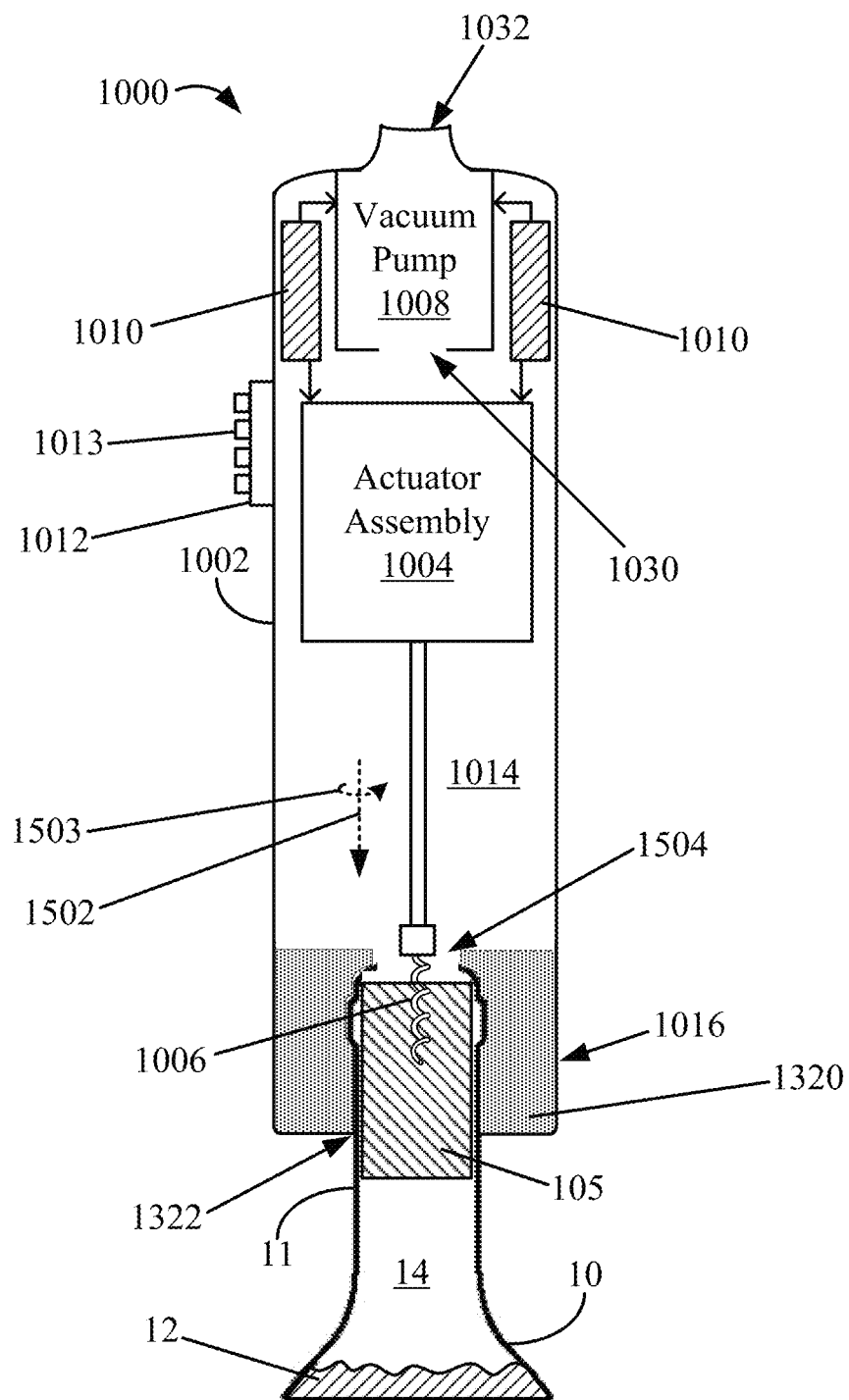
FIG. 15 illustrates a cross-sectional schematic view of the device in a bottle opening state.

FIG. 15 illustrates a cross-sectional schematic view of the device 1000 in a bottle opening state according to one aspect. First, an unopened bottle 10 (e.g., unopened bottle of wine) having a stopper 105 secured within its neck 11 may be inserted into the bottom end 1016 of the device 1000 through the bottom opening 1322. In the example shown in FIGS. 15-19, the device's bottom end 1016 features the airtight, dense foam ring 1320 shown in FIG. 14. However, the same principles of operation described in FIGS. 15-19 equally apply to a device 1000 featuring a different means for receiving a bottle and forming an airtight seal between the bottle and the device such as, but not limited to, the elastic bottom surface 1020 shown in FIGS. 3 and 12.

After the unopened bottle 10 has been securely inserted into the bottom end 1016 of the device 1000, a user may press a button 1013 on the I/O interface 1012 that causes the actuator assembly 1004 to lower/extend 1502 and rotate 1503 the corkscrew 1006 into a bottle's stopper 105 (e.g., wine bottle's cork). The corkscrew 1006 may continue to lower and rotate until it goes past the foam ring 1320 through ring's center opening 1504 and firmly and securely embeds itself within the stopper 105 as shown.

Figure 16:
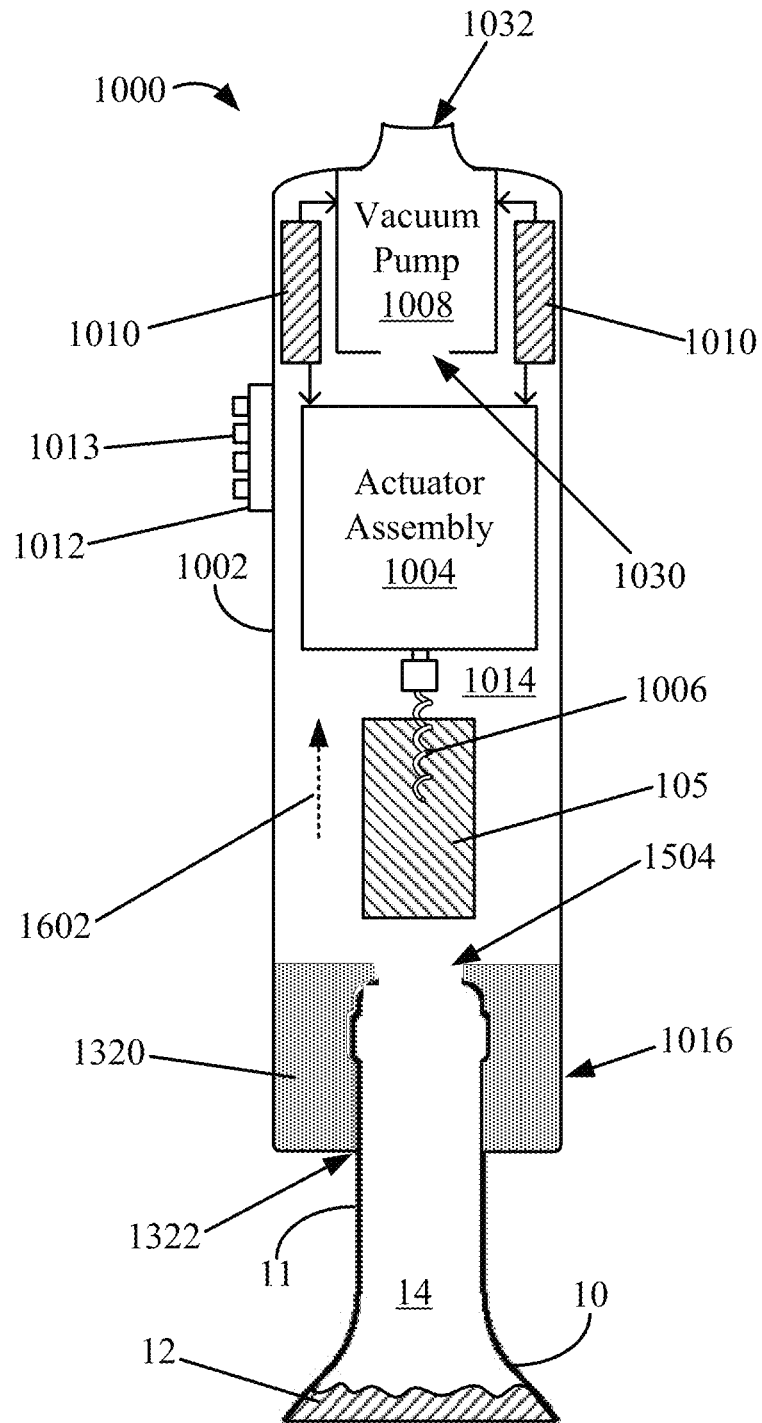
FIG. 16 illustrates a cross-sectional schematic view of the device in a bottle opened state.

FIG. 16 illustrates a cross-sectional schematic view of the device 1000 in a bottle opened state according to one aspect. Once the corkscrew 1006 is firmly and securely embedded within the stopper 105, a user may select another button 1013 on the I/O interface 1012 to cause the actuator assembly 1004 to raise/retract 1602 the corkscrew 1006 (without rotation). The actuator assembly 1004 may raise/retract the corkscrew 1006 with the stopper 105 still firmly attached to the corkscrew 1006 until both the corkscrew 1006 and the stopper 105 have been fully removed from the bottle 10 and reside within the device's main body 1002 as shown. The bottle 10 may at this point be removed from the device's bottom end 1016 and its contents 12 (e.g., wine, spirit, herbs, etc.) may be served.

Figure 17:
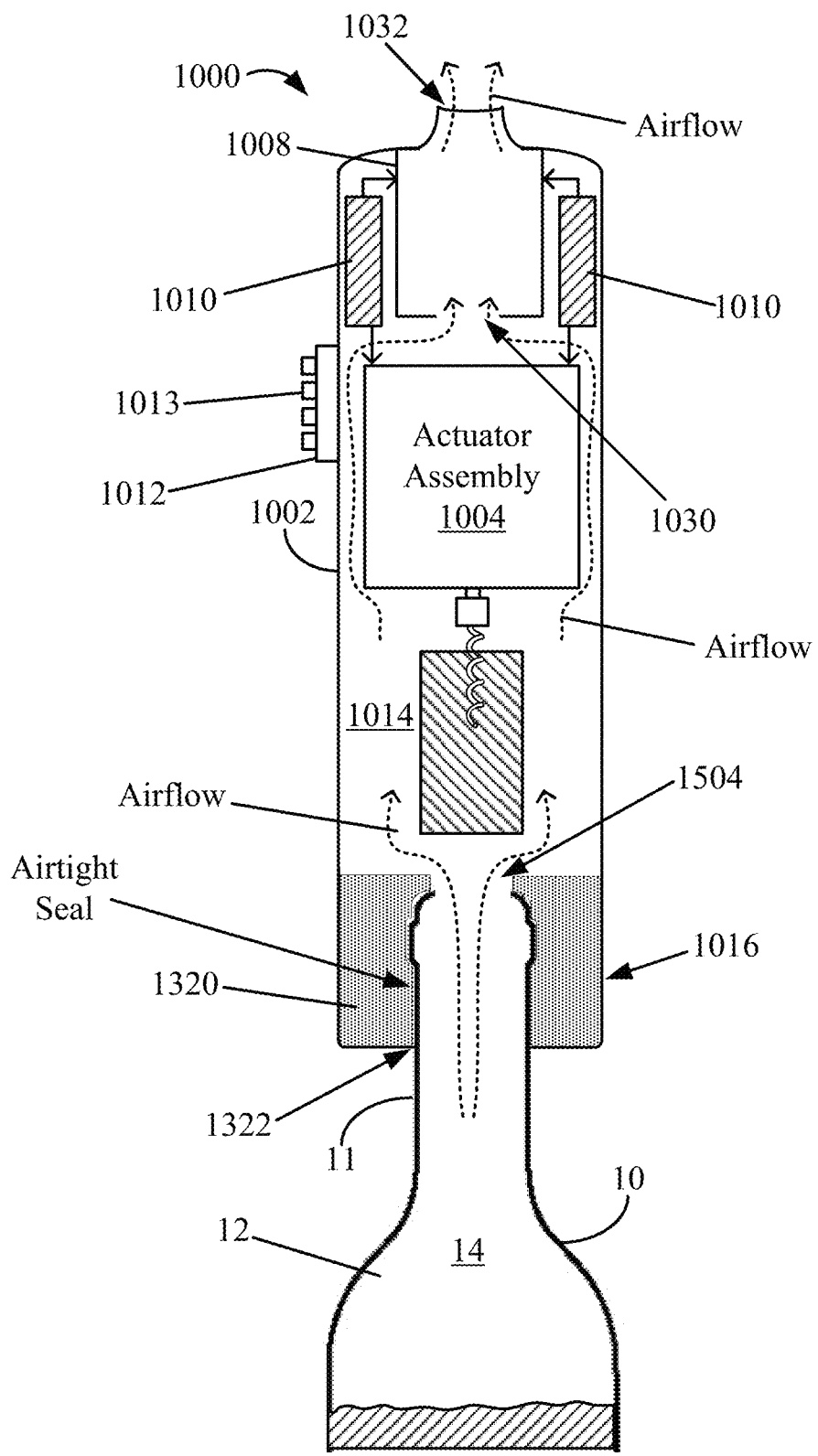
FIG. 17 illustrates a cross-sectional schematic view of the device in a vacuum induction state.

FIG. 17 illustrates a cross-sectional schematic view of the device 1000 in a vacuum induction state according to one aspect. After the bottle's contents 12 may have been served in part, the remaining content 12 (e.g., wine) may be preserved by reinserting the bottle 10 back into the device's bottom end 1016 through the bottom opening 1322 (or bottom opening 210 in the case where the device features the elastic bottom surface 208; see FIGS. 2, 3, 11) so that the bottle's headspace 14 and the main body's cavity 1014 are in fluid flow communication. The bottle 10 should be inserted back into the device's bottom end 1016 so that a sufficient airtight seal is formed between the bottle 10 (e.g., outer surface of the bottle's neck 11 and/or mouth 13) and the device's bottom end 1016. The user may then select a button 1013 that turns the vacuum pump 1008 ON. The vacuum pump 1008 evacuates the air within the bottle's headspace 14 and the main body's cavity 1014 and discharges it outside the device 1000 so that a vacuum or partial vacuum of sufficient degree is achieved within the bottle's headspace 14. An indicator (e.g., LED light or digital display) on the I/O interface 1012 may be activated to let the user know that a sufficient level of partial vacuum or full vacuum within the bottle's headspace 14 has been achieved. The airtight seal between the bottle and the device's bottom end 1016 ensures that a sufficiently strong vacuum within the bottle's headspace 14 is created without ambient air outside the bottle's neck 11 from seeping into the main body's cavity 1014 or bottle's headspace 14.

Figure 18:
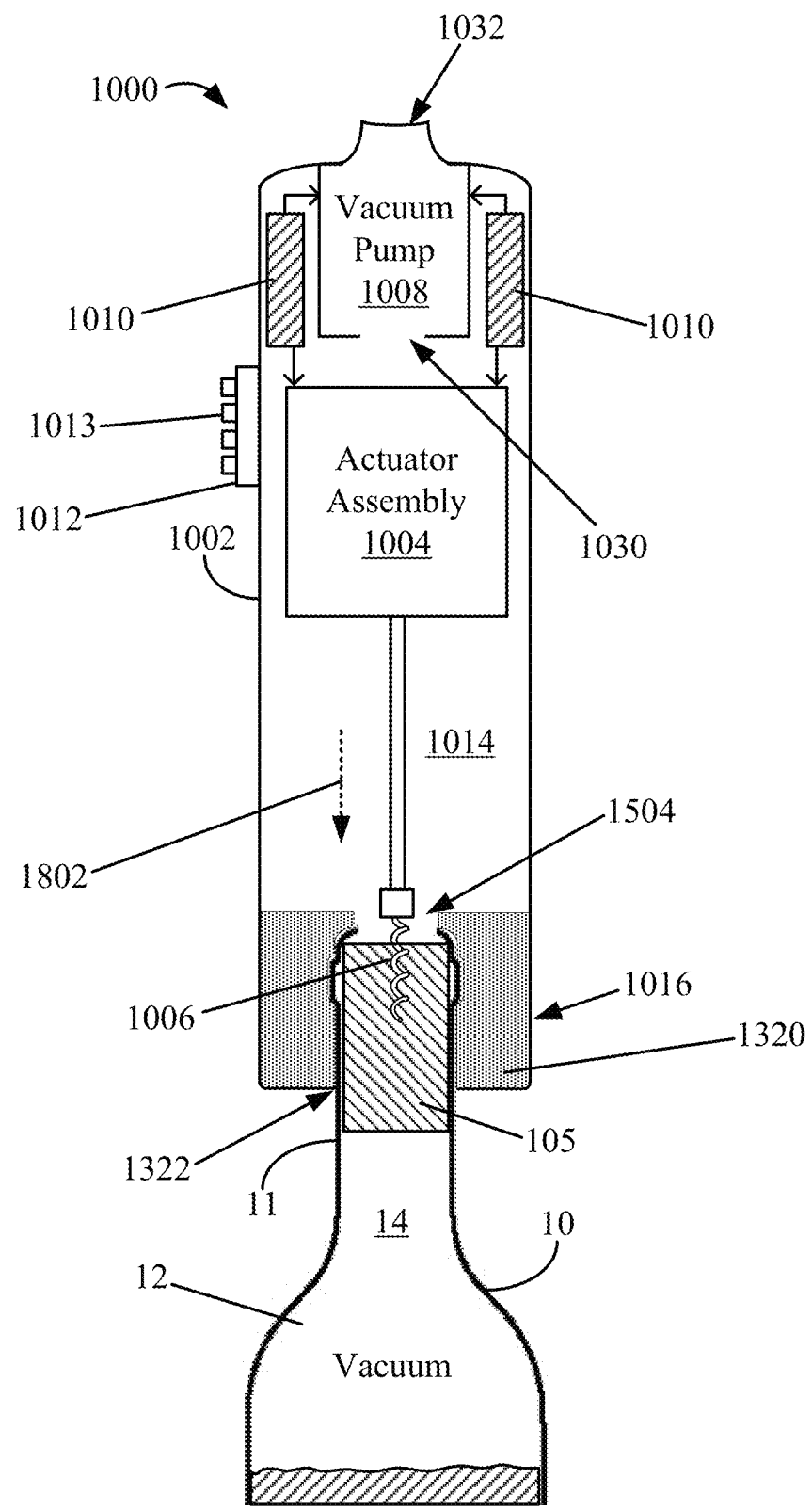
FIG. 18 illustrates a cross-sectional schematic view of the device in a resealing state.

FIG. 18 illustrates a cross-sectional schematic view of the device 1000 in a resealing state according to one aspect. After the vacuum pump 1008 has run long enough to create a vacuum or a desired level of partial vacuum within the bottle's headspace 14, the user may press a button 1013 on the interface 1012 or the device 1000 may automatically cause the actuator assembly 1004 to lower/extend 1802 the corkscrew 1006 with the stopper 105 attached back into neck 11 of the bottle 10. According to one aspect, the corkscrew 1006 may not rotate while it is being lowered and pressed back into the bottle's neck 11. According to another aspect, the corkscrew 1006 may undergo some rotation while it is being lowered and/or pressed back into the bottle's neck 11. The rotation may be in a direction that further secures the corkscrew 1006 into the stopper 105. Doing so may help the stopper 105, which may have slightly expanded since having been removed from the bottle's neck 11, to fit back into the bottle's neck 11 while it is being pressed inside. Yet according to another aspect, the corkscrew 1006 may rotate in the opposite direction (i.e., loosening the corkscrew's 1006 grip on the stopper 105) while it is being lowered and/or pressed into the bottle's neck 11.

Figure 19:
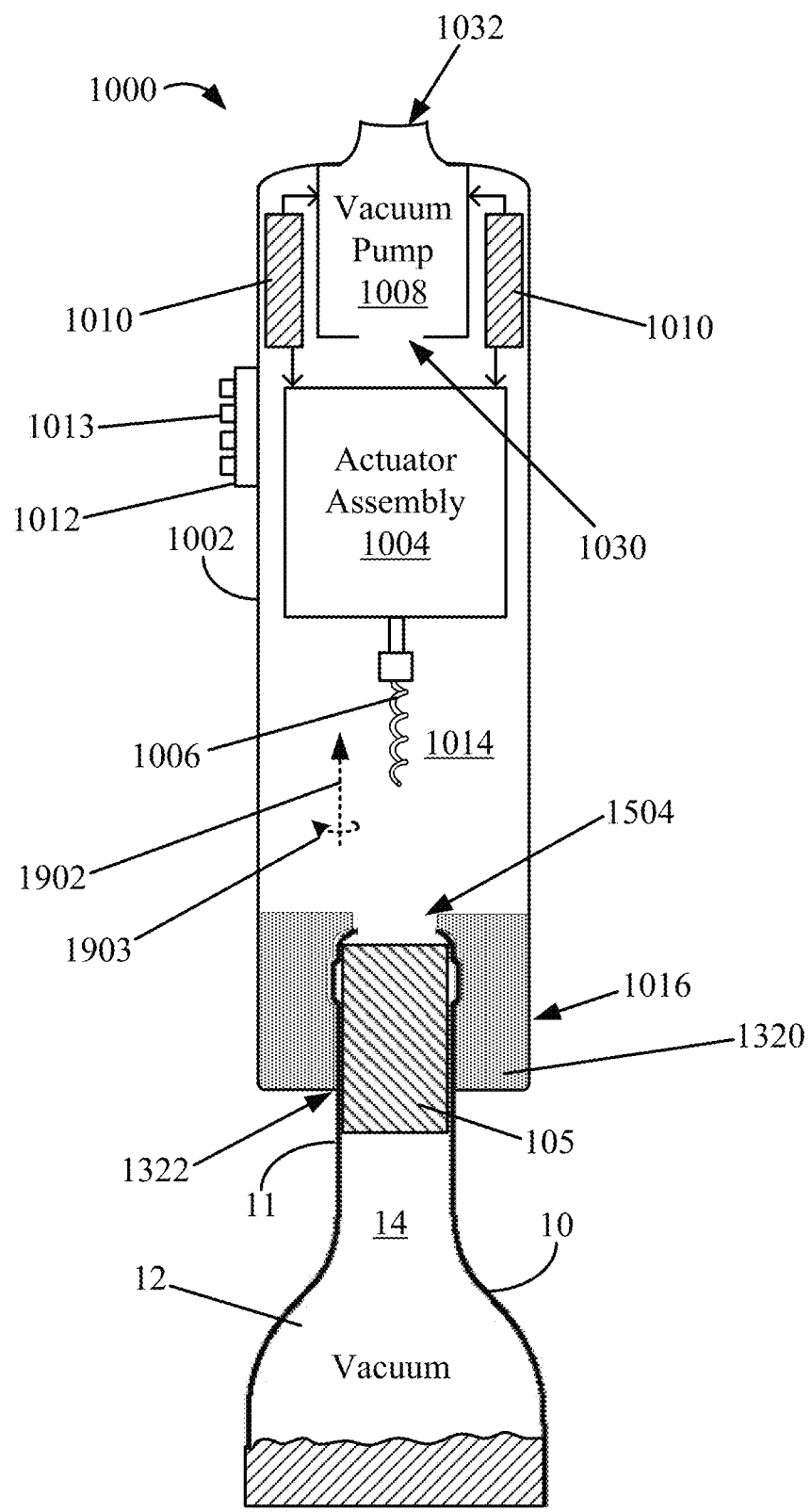
FIG. 19 illustrates a cross-sectional schematic view of the device in a vacuum resealed state.

FIG. 19 illustrates a cross-sectional schematic view of the device 1000 in a vacuum resealed state according to one aspect. Once the actuator assembly 1004 has pressed and secured the stopper 105 back into the bottle 10, a user may press a button 1013 or the device 1000 may automatically cause the actuator assembly 1004 to raise/retract 1902 and rotate 1903 the corkscrew 1006 out of the stopper 105 and back into the device's main body 1002. The corkscrew 1006 may be rotated 1903 in a direction opposite the original direction of rotation 1503 (see FIG. 15) so that it detaches from the stopper 105 while retracting. The bottle's contents 12 is now stored under vacuum or partial vacuum, which may significantly lengthen the contents' shelf life (e.g., prevent spoilage, prevent or reduce oxidation, maintain taste, smell, and freshness).

Figure 20:
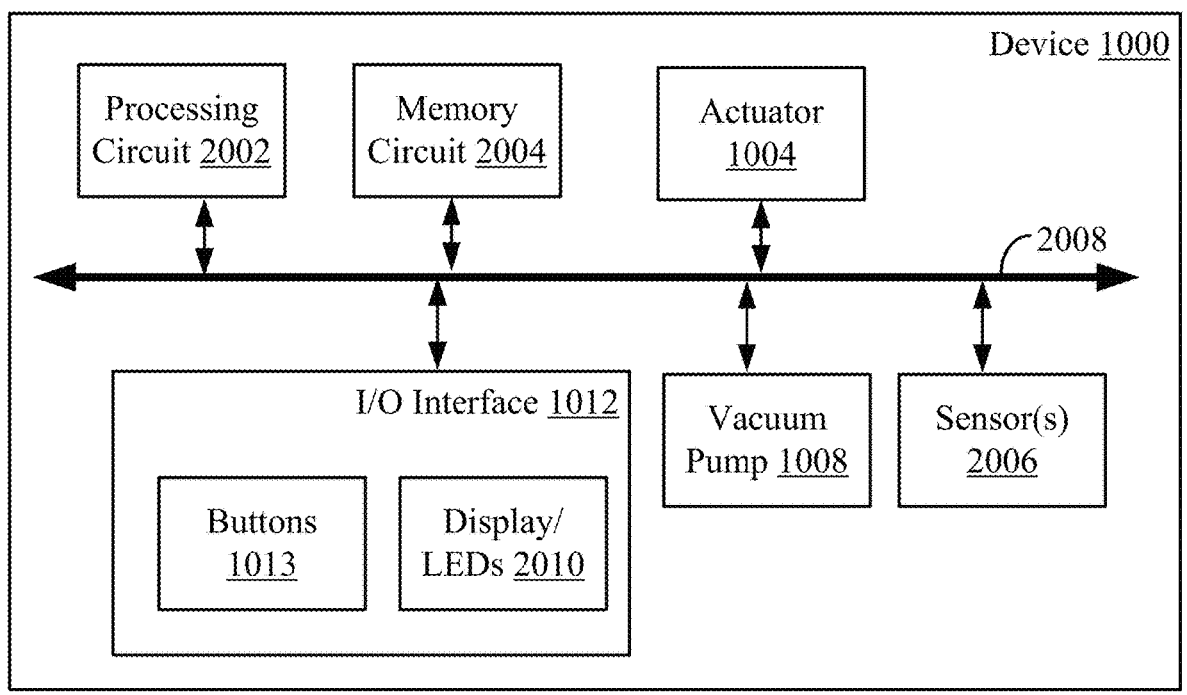
FIG. 20 illustrates a schematic block diagram of the device according to yet another aspect.

The corkscrew 1006 shown and described with respect to FIGS. 10, 15, 16, 17, 18, and 19 serves as one non-limiting, non-exclusive example of a means for securing a stopper 105 within the main body 1002 of the device 1000. However, many other devices having varying structure may be used to secure the stopper 105 within the main body 1002 not limited to corkscrews FIG. 20 illustrates a schematic block diagram of the device 1000 according to one aspect. The device 1000 may include one or more processing circuits 2002 (e.g., controller, microcontroller, etc.), one or more memory circuits 2004, an I/O interface 1012, an actuator 1004, a vacuum pump 1008, one or more sensors 2006, and/or a communication bus 2008. The processing circuit 2002, memory circuit 2004, I/O interface 1012, actuator 1004, vacuum pump 1008, and sensors 2006 may be communicatively coupled via the communication bus 2008 or other communication line architecture known in the art.

The processing circuit 2002 may execute instructions that send control signals to the actuator 1004, vacuum pump 1008, and I/O interface 1012 devices to control their operation. The memory circuit 2004 may store the instructions executed by the processing circuit 2002. The memory circuit 2004 may include volatile and/or non-volatile memory. The I/O interface 1012 may include one or more buttons 1013 that allow a user to configure or control the device 1000. The I/O interface 1012 may also include a display, lights (e.g., LEDs), and other output devices 2010 that provide information as to the operation and condition of the device 1000 to a user. The sensors 2006 may include an air pressure sensor that can determine whether the air pressure within the interior air cavity 1014 (see FIG. 17) of the main body 1002, and by extension the bottle's headspace 14, has dropped to a sufficiently low level (i.e., partial or total vacuum) to allow for resealing of the bottle 10. The processing circuit 2002 may obtain such air pressure data from the sensor 2006 and initiate the actuator assembly 1004 to seal the bottle by inserting the stopper 105 back into the bottle's mouth 13.

Figure 21:
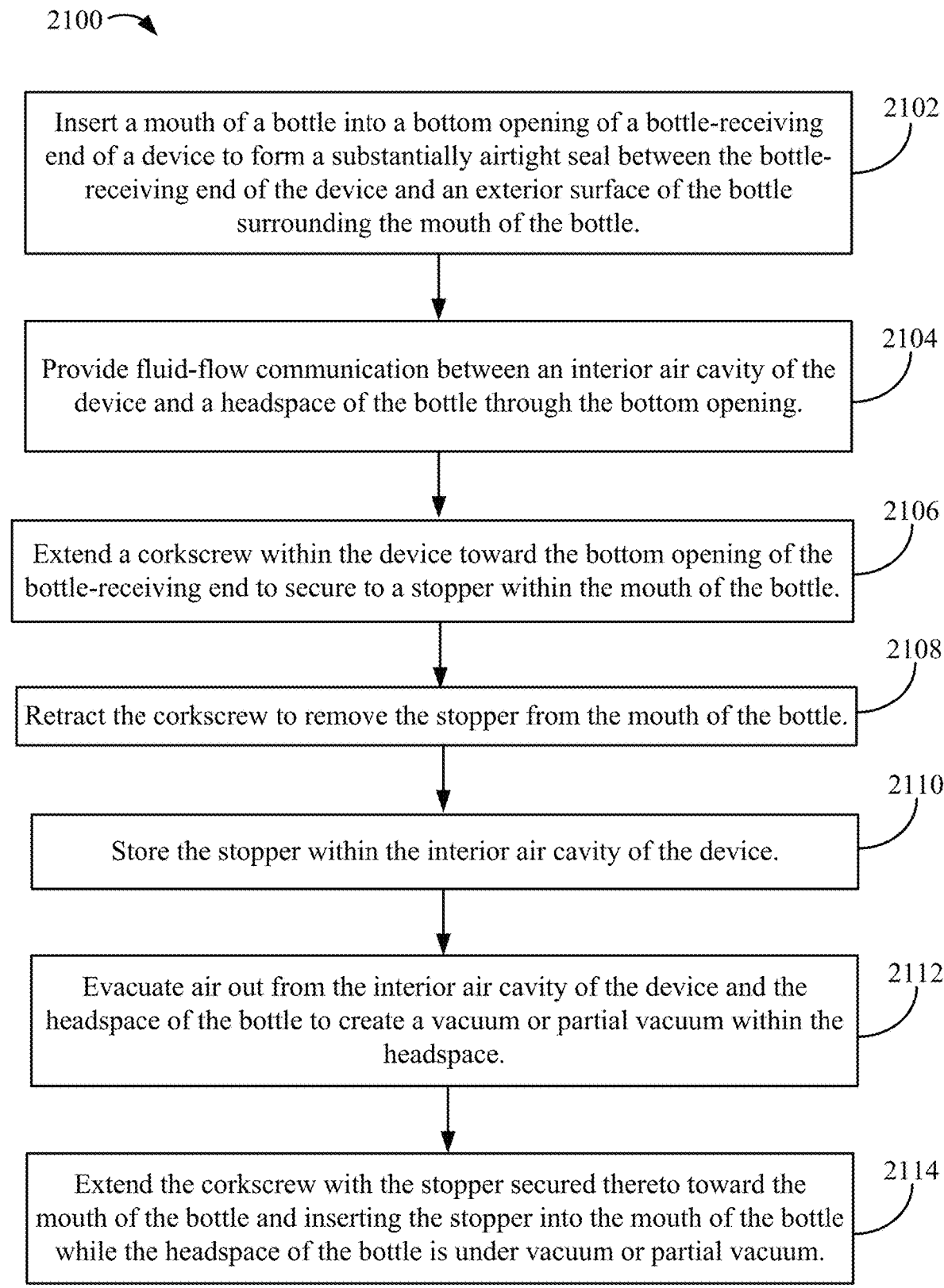
FIG. 21 illustrates a flow diagram of a method.

FIG. 21 illustrates a flow diagram 2100 of a method according to one aspect of the disclosure. First, a mouth of a bottle is inserted 2102 into a bottom opening of a bottle-receiving end of a device to form a substantially airtight seal between the bottle-receiving end of the device and an exterior surface of the bottle surrounding the mouth of the bottle. Next, fluid-flow communication is provided 2104 between an interior air cavity of the device and a headspace of the bottle through the bottom opening. Then, a corkscrew is extended 2106 within the device toward the bottom opening of the bottle-receiving end to secure to a stopper within a neck/mouth of the bottle. Next, the corkscrew is retracted 2108 to remove the stopper from the neck of the bottle. Then, the stopper is stored 2110 within the interior air cavity of the device. Next, air is evacuated 2112 out from the interior air cavity of the device and the headspace of the bottle to create a vacuum or partial vacuum within the headspace. Then, the corkscrew is extended 2114 with the stopper secured thereto toward the mouth of the bottle and inserting the stopper into the neck of the bottle while the headspace of the bottle is under vacuum or partial vacuum.

Figure 22A:
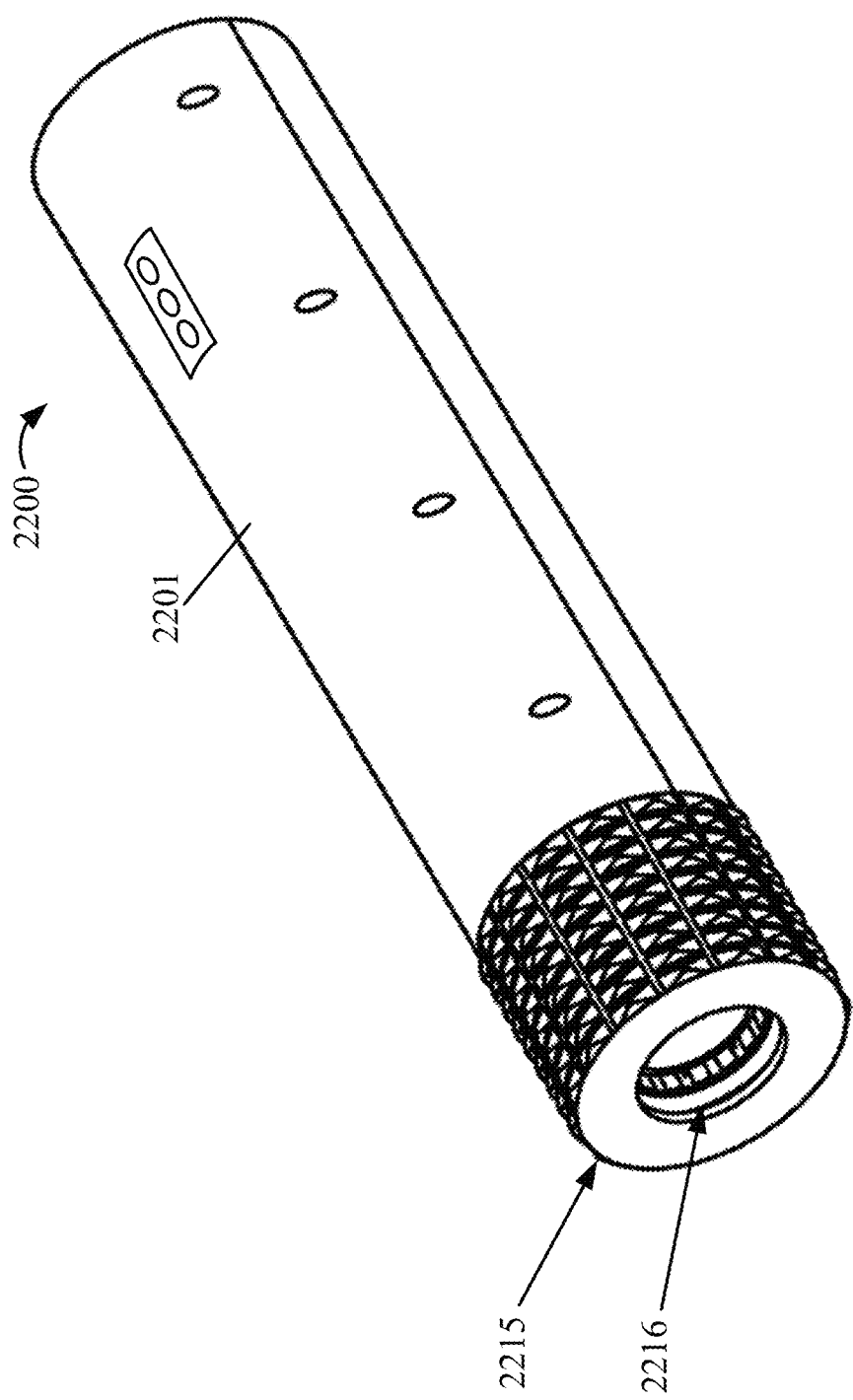
FIG. 22A illustrates a perspective view of an exemplary device for resealing a bottle with a stopper under vacuum.

FIG. 22A illustrates a perspective view of an exemplary device 2200 for resealing a bottle with a stopper under vacuum according to one aspect. The device 2200 includes a main body 2201 (e.g., housing) that houses a plurality of internal components. The device 2200 also includes a bottle-receiving end 2215 that receives the mouth and/or neck of a bottle. Specifically, the bottle-receiving end 2215 includes a bottom opening 2216 that the bottle's neck/mouth may pass through. As described in greater detail below, the device 2200 may remove a stopper within the bottle's neck/mouth, and then later reseal the bottle with its original cork under vacuum to preserve and extend the useable life of the bottle's contents. According to one non-limiting, non-exclusive example, the bottle may be a wine bottle, the stopper may be a cork (natural or synthetic), and the bottle's contents may be wine. In practice, however, the bottle may contain other contents not limited to liquids, such as powders, herbs, and other substances.

Figure 22B:
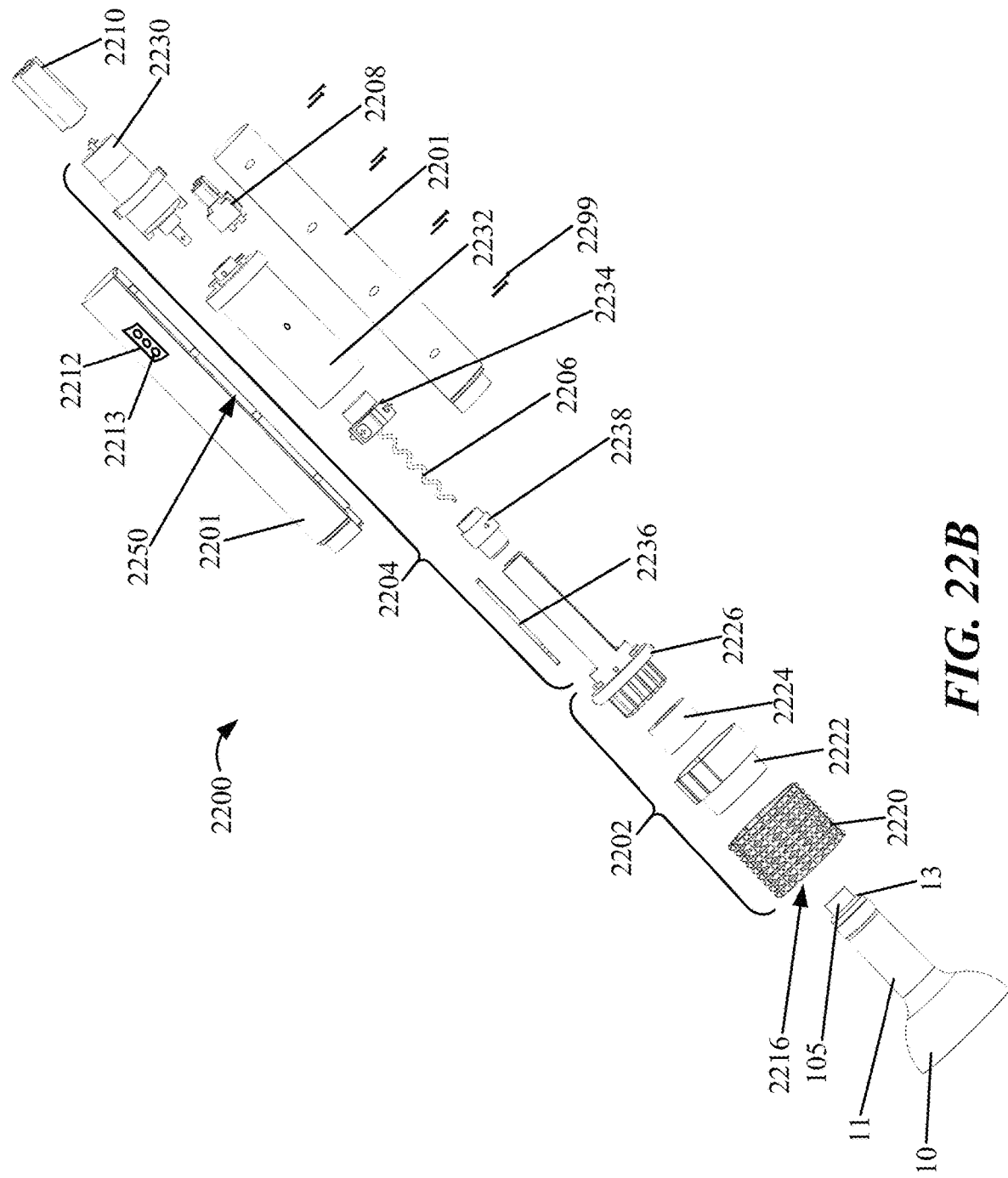
FIG. 22B illustrates an exploded view of the device shown in FIG. 22A and a wine bottle having a neck with a stopper lodged therein.

FIG. 22B illustrates an exploded view of the device 2200 shown in FIG. 22A and a wine bottle 10 having a neck 11 with a stopper 105 lodged therein. The device 2200 may include a bottle securement assembly 2202, an actuator assembly 2204, a stopper securement device 2206, one or more vacuum pumps 2208, one or more batteries 2210, and/or an input interface 2212. During at least one mode of operation, the vacuum pumps 2208 create a vacuum or partial vacuum within an interior air cavity 2250 of the device 2200. In particular, the device 2200 is configured to reseal a bottle 10 with its own stopper 105 under such vacuum conditions. The housing 2201, which contains one or more of these components 2202, 2204, 2206, 2208, 2210, 2212 or portions thereof, may be composed of more than one piece (two pieces are shown by way of example in FIG. 22B) and may be held together with fasteners 2299 (e.g., screws, nails, bolts, etc.) and/or glue, or its pieces may simply snap and lock together.

The bottle securement assembly 2202 may include a bottle lock nut 2220, a bottle lock outer member 2222, a bottle neck seal 2224, and/or a bottle lock inner member 2226. The actuator assembly 2204 may include an electric motor 2230, a device head guide 2232, a stopper securement device head 2234, a mode pin 2236, and/or a spin control accessory 2238.

Figure 23:
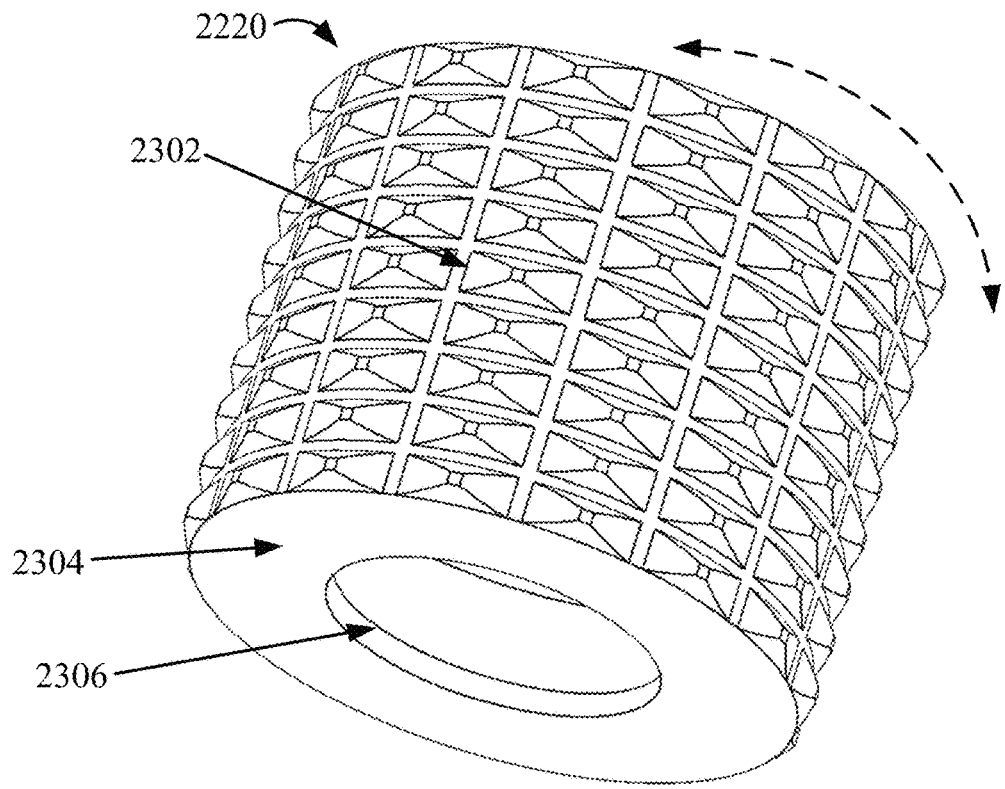
FIG. 23 illustrates a bottom perspective view of a bottle lock nut.
Figure 24:
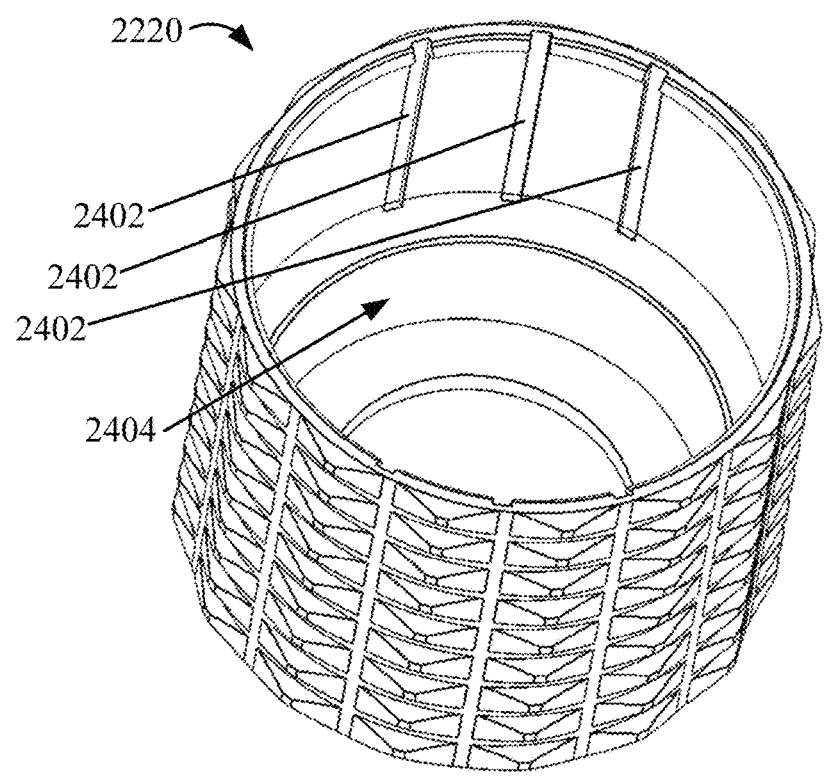
FIG. 24 illustrates a top perspective view of the bottle lock nut.
Figure 25:
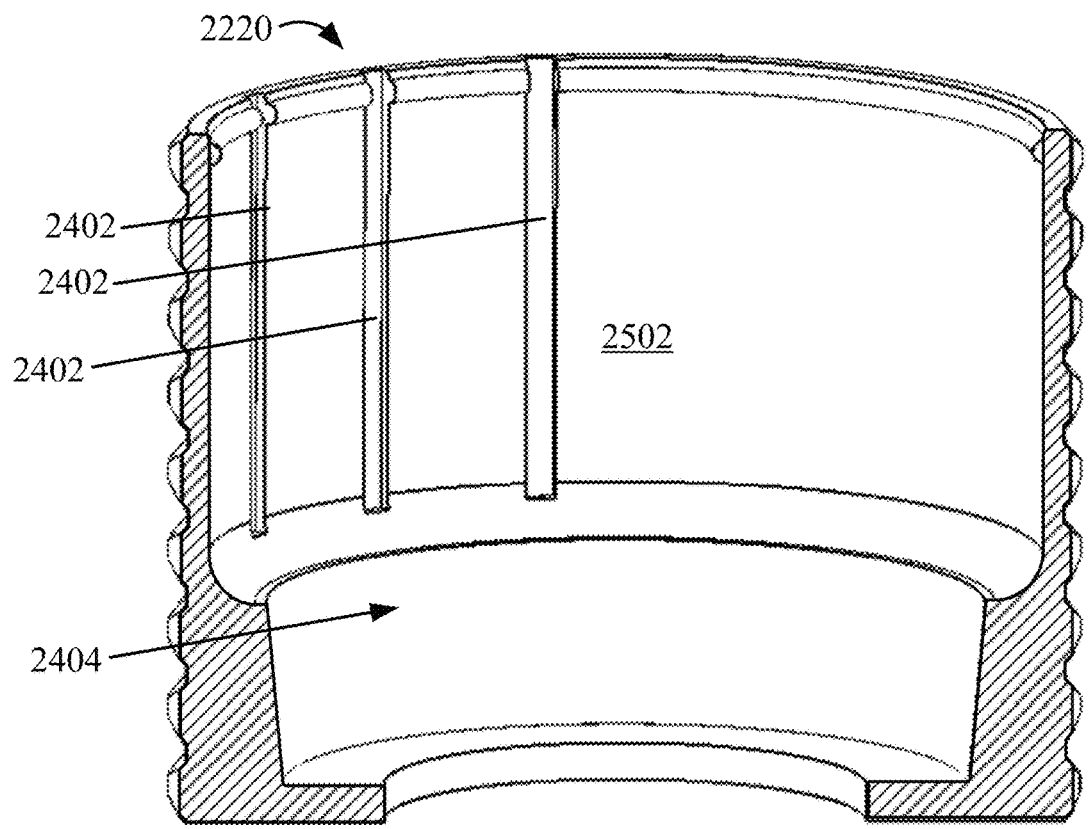
FIG. 25 illustrates a cross-sectional view of the bottle lock nut.

FIGS. 23-25 illustrate the bottle lock nut 2220 according to one aspect. Specifically, FIG. 23 illustrates a bottom perspective view, FIG. 24 illustrates a top perspective view, and FIG. 25 illustrates a cross-sectional view of the bottle lock nut 2220 according to one aspect.

Referring to FIG. 23, the bottle lock nut 2220 includes an outer surface 2302. In one aspect, the outer surface 2302 may be ribbed or otherwise textured as shown to help a user grip and rotate the bottle luck nut 2220 in the directions indicated by the dashed double arrow. The bottle lock nut 2220 may also include a bottom end 2304 that has a bottom opening 2306 through which a bottle's neck 11 may pass through. Referring to FIGS. 24 and 25, the bottle lock nut 2220 includes an interior cavity 2502 that includes inner surface features such as grooves 2402 and a lower portion 2404 having a narrowed diameter.

Figure 26:
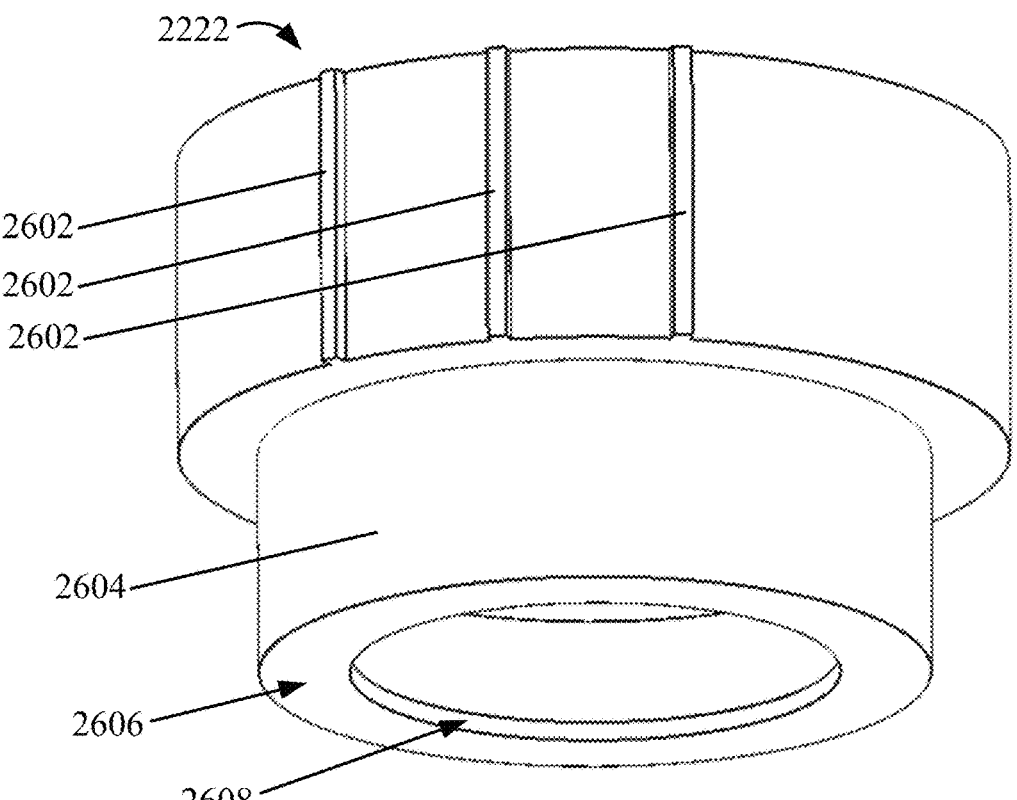
FIG. 26 illustrates a bottom perspective view of a bottle lock outer member.
Figure 27:
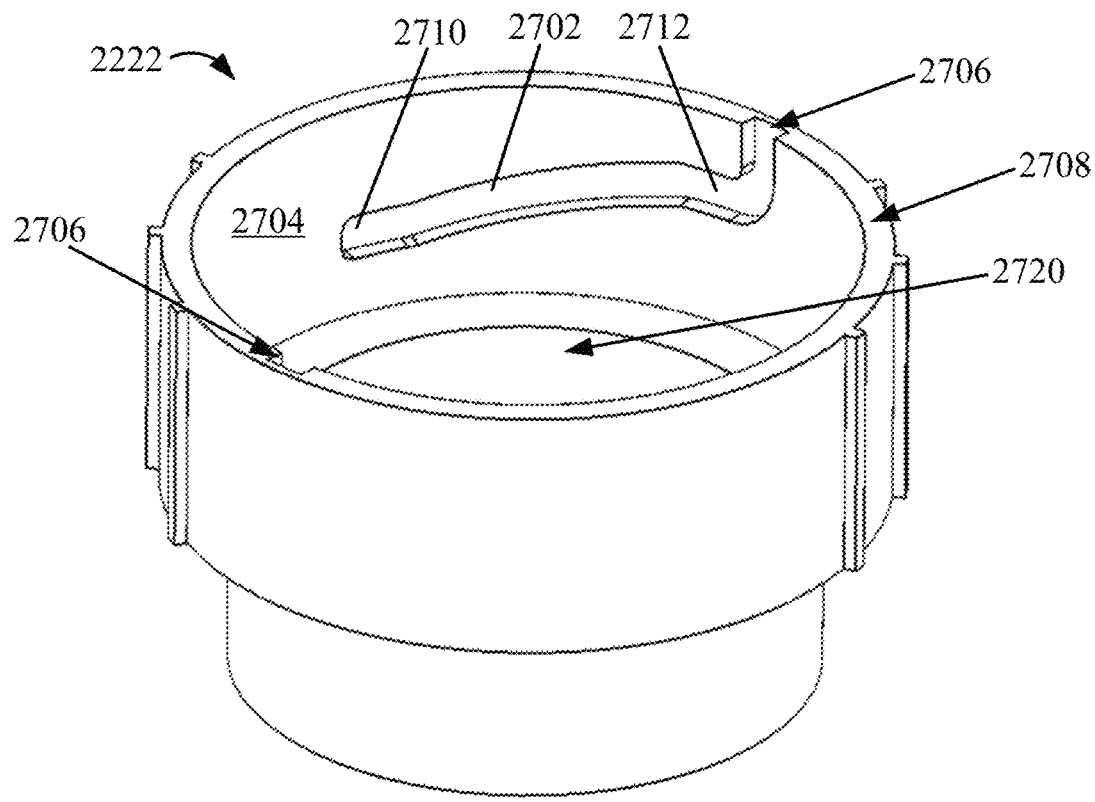
FIG. 27 illustrates a top perspective view of the bottle lock outer member.
Figure 28:
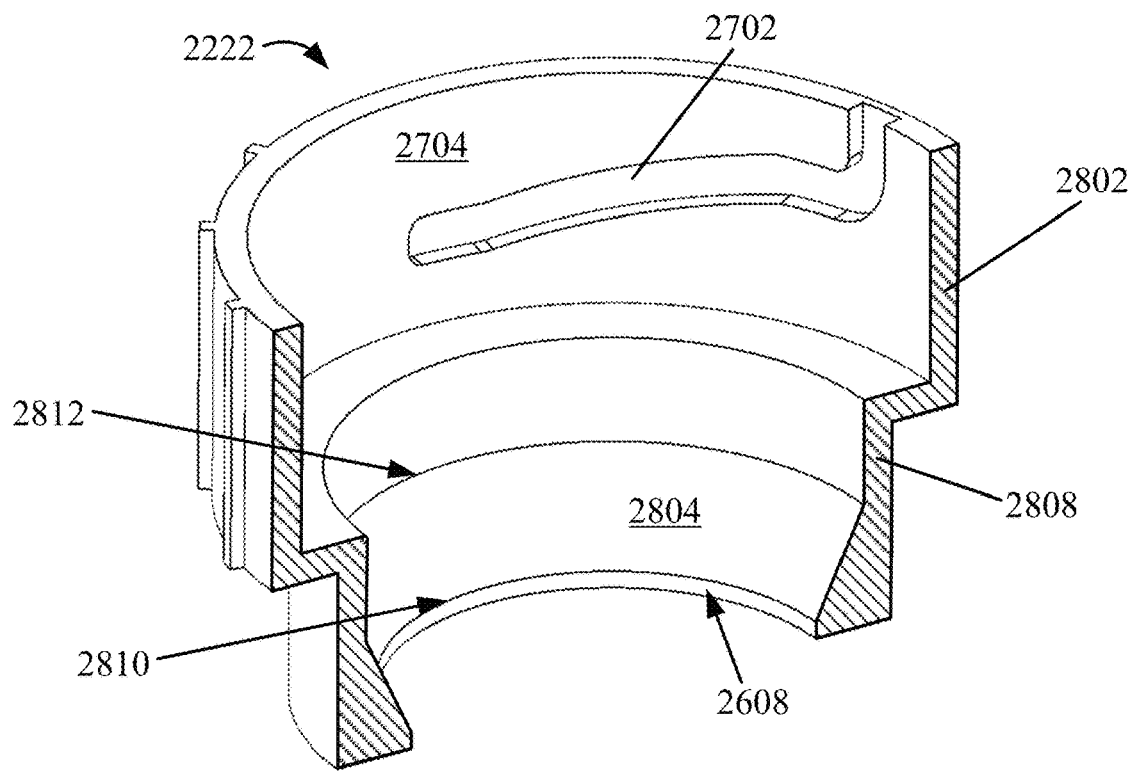
FIG. 28 illustrates a cross-sectional view of the bottle lock outer member.

FIGS. 26-28 illustrate the bottle lock outer member 2222 according to one aspect. Specifically, FIG. 26 illustrates a bottom perspective view of the bottle lock outer member 2222 according to one aspect. FIG. 27 illustrates a top perspective view of the bottle lock outer member 2222 according to one aspect. FIG. 28 illustrates a cross-sectional view of the bottle lock outer member 2222 according to one aspect.

Referring to FIGS. 25 and 26, the bottle lock outer member 2222 resides within the bottle lock nut's interior cavity 2502. The bottle lock outer member 2222 includes outer surface features, such as rails 2602 and a lower portion 2604 having a narrowed diameter, that match or fit the corresponding grooves 2402 and lower portion 2404 of the bottle lock nut's 2220 inner cavity 2502. These matching features allow the bottle lock outer member 2222 to be secured to and reside within the bottle lock nut 2220. Thus, if the bottle lock nut 2220 is rotated (see dashed arrow in FIG. 23), the bottle lock outer member 2222 rotates along with the bottle lock nut 2220. The bottle lock outer member 2222 may also include a bottom end 2606 that has a bottom opening 2608 through which a bottle's neck 11 may pass through. In the examples shown in FIGS. 23 and 26, the bottle lock nut 2220 and the bottle lock outer member 2222 are two separate pieces. However, in other aspects these two components 2220, 2222 may be a single piece.

Referring to FIGS. 27 and 28, the bottle lock outer member 2222 may include one or more bottle lock grooves 2702 on an inner surface 2704 of an upper portion 2802 of the bottle lock outer member 2222. Each bottle lock groove 2702 may have an opening 2706 at the top perimeter surface 2708 of the bottle lock outer member 2222. The grooves 2702 extend down into the bottle lock outer member 2222 away from the openings 2706 along the bottle lock outer member's inner surface 2704. Accordingly, an end point 2710 of each groove 2702 terminates down in the interior of the bottle lock outer member 2222 further away from the member's top perimeter surface 2708 than a starting point 2712 of the groove 2702. The bottle lock outer member 2222 may also include an inward sloping surface 2804 (i.e., sloping in towards its center) that extends around the circumference 2806 of a lower portion 2808 of the bottle lock outer member 2222. Thus, a lower part 2810 of the inward sloping surface 2804 near the bottom opening 2608 may have a smaller diameter than an upper part 2812 of the inward sloping surface 2804.

Figure 29:
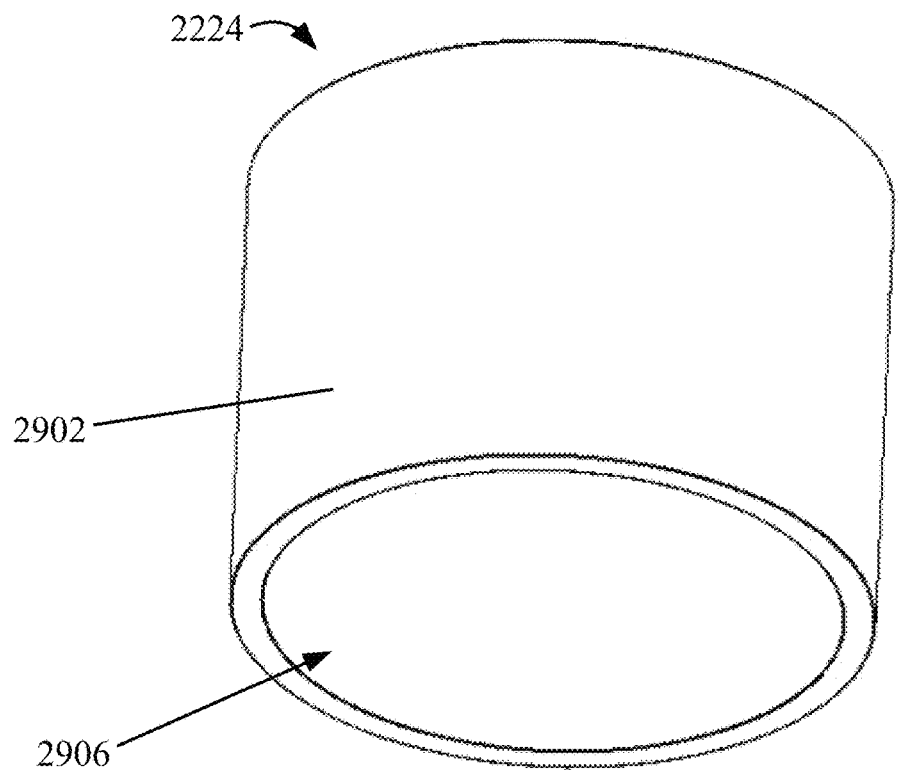
FIG. 29 illustrates a bottom perspective view of a bottle neck seal.
Figure 30:
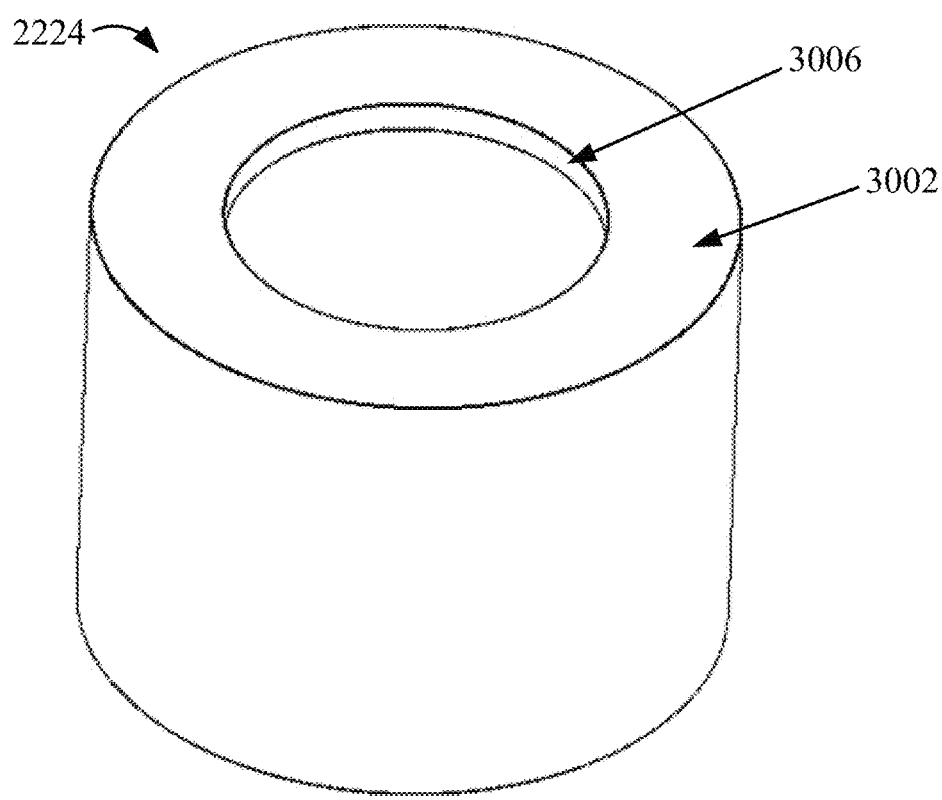
FIG. 30 illustrates a top perspective view of the bottle neck seal.
Figure 31:
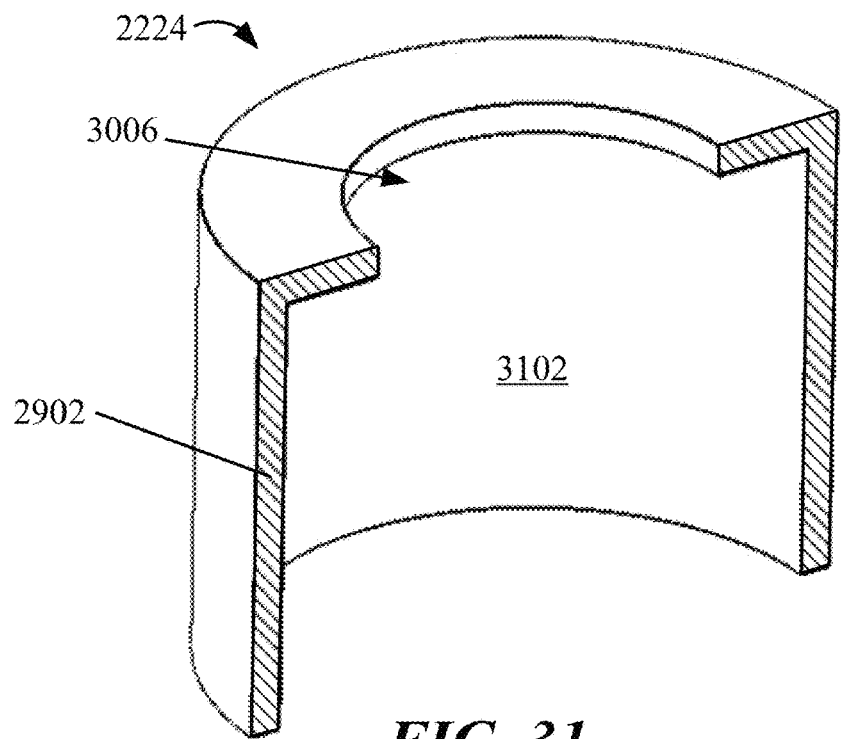
FIG. 31 illustrates a cross-sectional view of the bottle neck seal.

FIGS. 29-31 illustrate the bottle neck seal 2224 according to one aspect. Specifically, FIG. 29 illustrates a bottom perspective view of the bottle neck seal 2224. FIG. 30 illustrates a top perspective view of the bottle neck seal 2224. FIG. 31 illustrates a cross-sectional view of the bottle neck seal 2224.

Referring to FIG. 29, the bottle neck seal 2224 may be substantially cylindrical in shape as shown. Referring to FIGS. 22B and 29, the bottle neck seal 2224 may be composed of one or more materials that provide a hermetic seal around the neck 11 of a bottle 10 that is inserted into the device's bottom opening 2216. The bottle neck seal 2224 includes a bottom opening 2906 that receives the bottle's neck 11. According to one aspect, the bottle neck seal 2224 may be composed of airtight rubber, plastic, foam, or any other airtight material. Referring to FIG. 30, the bottle neck seal 2224 may have a top end 3002 having a top opening 3006. The top opening's 3006 diameter should be larger than a diameter of the stopper 105 within the bottle's neck 11 so that the stopper 105 may pass through the top opening 3006.

Figure 32:
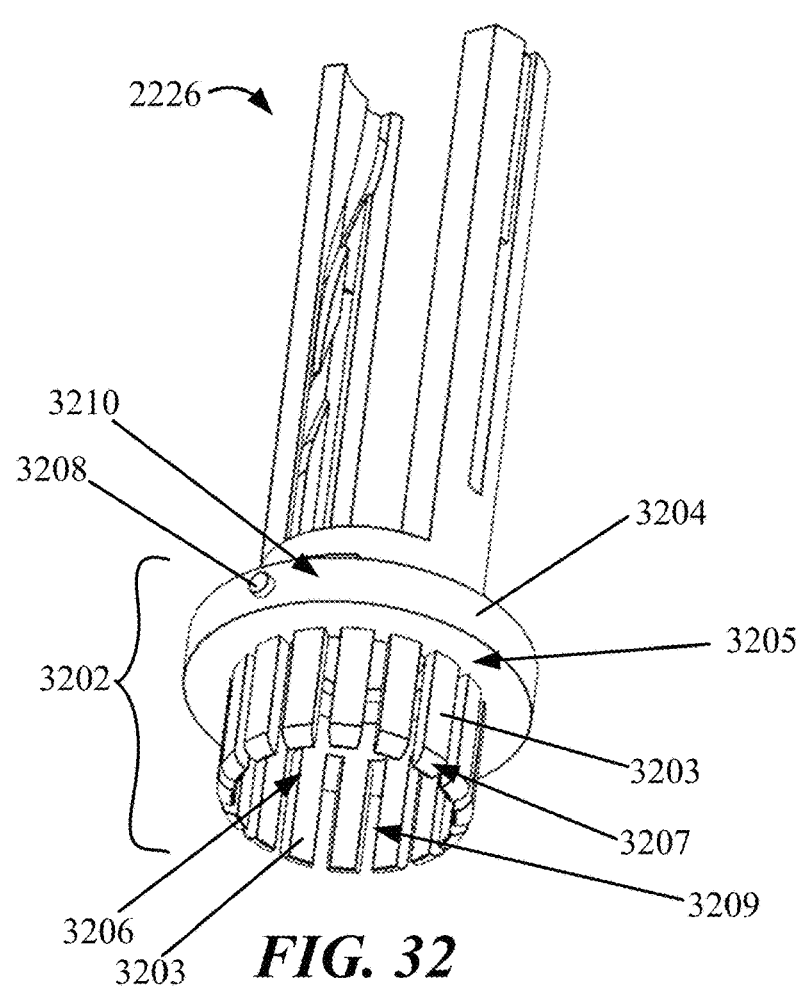
FIG. 32 illustrates a bottom perspective view of a bottle lock inner member.
Figure 33:
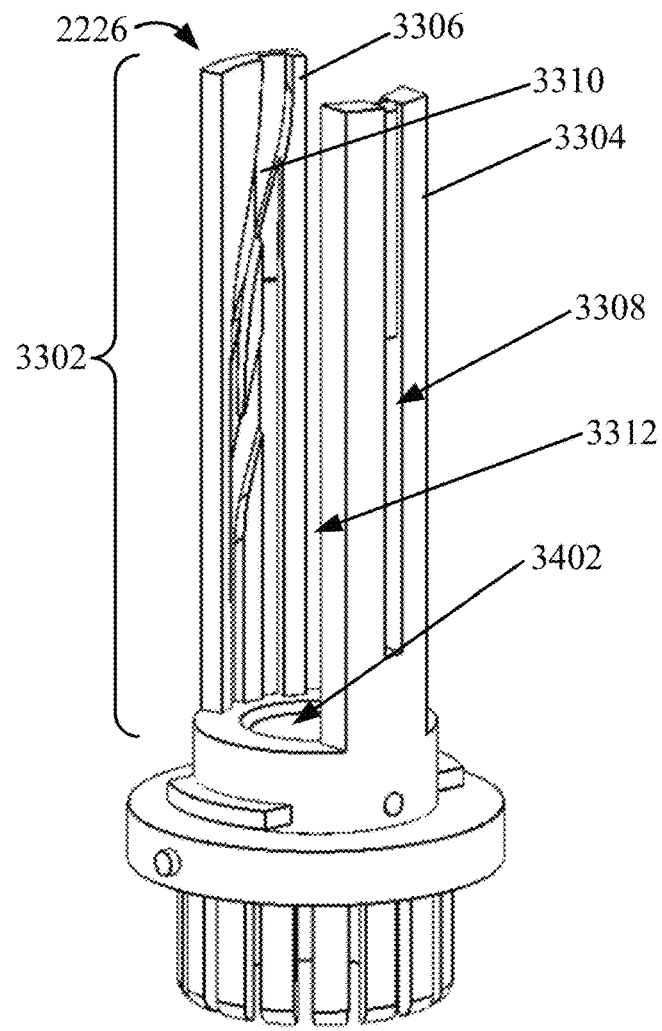
FIG. 33 illustrates a top perspective view of the bottle lock inner member.
Figure 34:
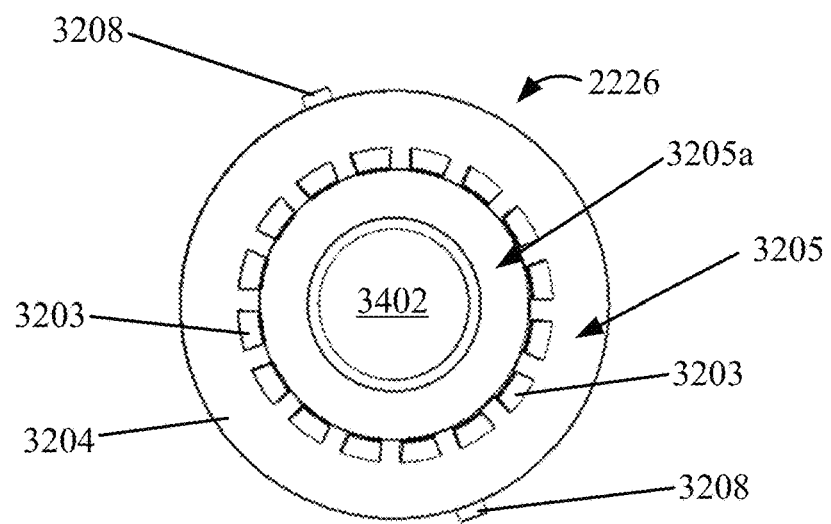
FIG. 34 illustrates a bottom view of the bottle lock inner member.
Figure 35:
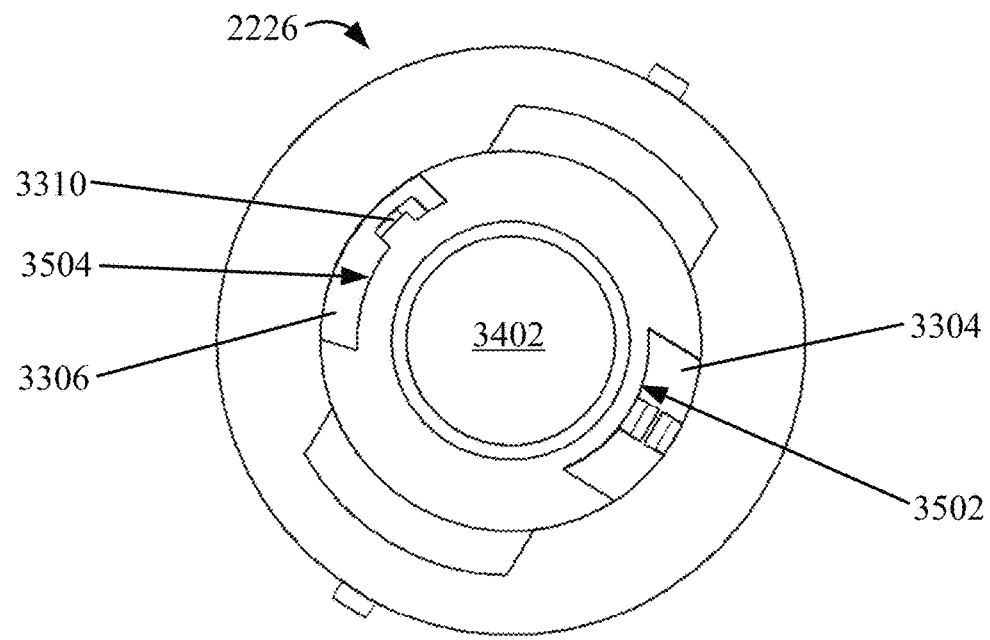
FIG. 35 illustrates a top view of the bottle lock inner member.
Figure 36:
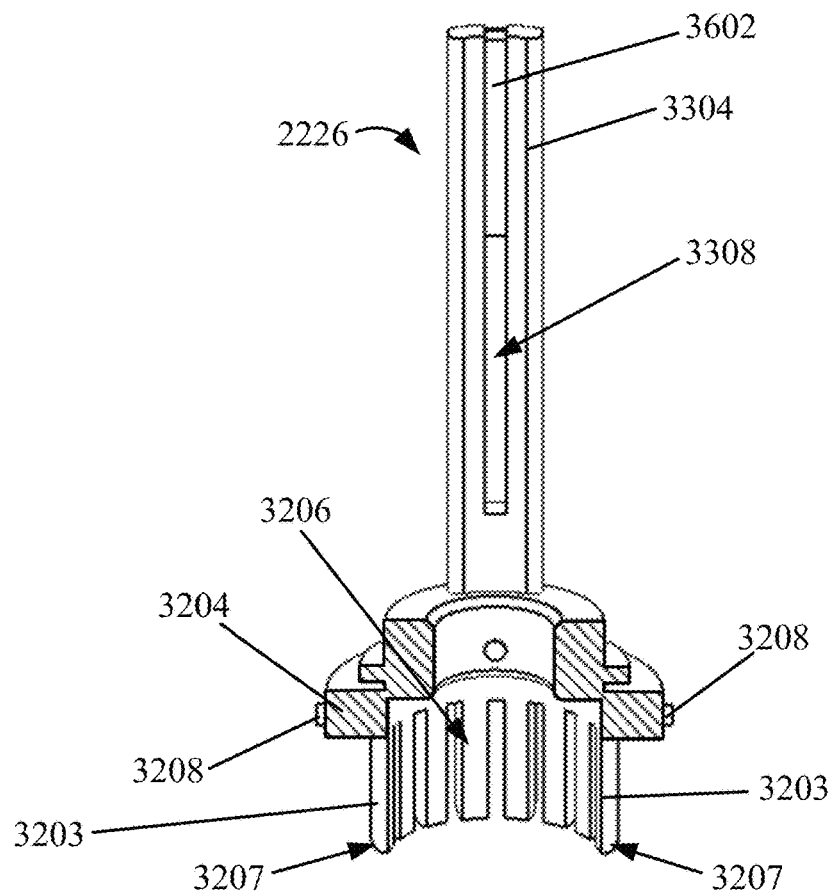
FIG. 36 illustrates a cross-sectional view of the bottle lock inner member.

FIGS. 32-36 illustrate the bottle lock inner member 2226 according to one aspect. Specifically, FIG. 32 illustrates a bottom perspective view of the bottle lock inner member 2226. FIG. 33 illustrates a top perspective view of the bottle lock inner member 2226. FIG. 34 illustrates a bottom view of the bottle lock inner member 2226. FIG. 35 illustrates a top view of the bottle lock inner member 2226. FIG. 36 illustrates a cross-sectional view of the bottle lock inner member 2226.

Referring to FIG. 32, the bottle lock inner member 2226 includes a lower portion 3202 having a plurality of flexible teeth 3203 that may be arranged in a ring formation mounted onto a platform's 3204 bottom surface 3205. The ring of flexible teeth 3203 forms a bottom cavity 3206 that houses the bottle neck seal 2224 shown in FIG. 29. Referring to FIGS. 30, 32, and 34, the bottle neck seal 2224 resides within the bottle lock inner member's bottom cavity 3206 such that the bottle neck seal's top end 3002 presses against the platform's inner bottom surface 3205a and the bottle neck seal's top opening 3006 coincides with the bottle lock inner member's central opening 3402. The central opening's 3402 diameter is large enough so that the stopper 105 within the bottle's neck 11 may pass through.

Referring to FIG. 33, the bottle lock inner member 2226 may also include an upper portion 3302 that includes a pair of guides 3304, 3306 that may be on opposite sides of the central opening 3402. The first guide 3304 may include a long narrow slit 3308 that, as described in greater detail below, may accommodate a portion of the mode pin 2236. The second guide 3306 may include one or more grooves 3310 that, as explained in greater detail below, accommodate a retractable protrusion of the stopper securement device head 2234.

Referring to FIG. 35, the guides' 3304, 3306 inner surfaces 3502, 3504 may have a concave curvature as shown to accommodate a cylindrical stopper (see FIG. 22B) in the interior region 3312 (see FIG. 33) of the bottle lock inner member 2226.

Referring to FIGS. 27, 28, 32, and 34, the bottle lock inner member's lower portion 3202 is sized and shaped to fit into the bottle lock outer member 2222. For example, the bottle lock inner member's lower portion 3202 may be inserted into the bottle lock outer member's interior cavity 2720 so that the inner member's ring of teeth 3203 fit snugly into the outer member's lower portion 2808 and the inner member's platform 3204 fits snugly into the outer member's upper portion 2802. The bottle lock inner member's lower portion 3202 may also include one or more protrusions (e.g., knobs) 3208 that reside on a side surface 3210 of the platform 3204. The knobs 3208 are configured to pass through the outer member's bottle lock groove openings 2706 and reside within bottle lock grooves 2702. When the device 2200 is in a "bottle unlock state," the knobs 3208 may rest at or near the grooves' starting points 2712 and the end points 3207 of the plurality of teeth 3203 may rest at or near the upper part 2812 of the inward sloping surface 2804.

Referring to FIGS. 23, 27, 28, 31, and 32, if the bottle lock nut 2220 is twisted in a clockwise direction, the bottle lock outer member also rotates in a clockwise direction. This causes the device 2200 to enter a "bottle lock state" where the knobs 329 within the grooves 2702 travel from the starting points 2712 to the grooves' end points 2710. This in turn causes the bottle lock inner member's lower portion 3202 to descend down into the bottle lock outer member 2222, which causes the ends 3207 of the ring of teeth 3203 to descend down to the lower part 2810 of the inward sloping surface 2804. In the process, the ends 3207 of the teeth 3203 push against the inward sloping surface 2804 and are bent inward toward the center of the bottle neck seal's inner cavity 3102. If a bottle's neck 11 resides within the bottle neck seal's inner cavity 3102, the bent teeth 3203 will push on the bottle neck seal's side wall 2902 and clamp down onto the bottle's neck 11 to form an airtight seal. Similarly, the bottle lock nut 2220 may be twisted in the opposite direction to cause the knobs 2702 to go back to the grooves' starting points 2712 and the teeth ends 3207 back to the inward sloping surface's upper part 2812 in order to relax the teeth 3203 off of the bottle's neck 11.

Figure 37:
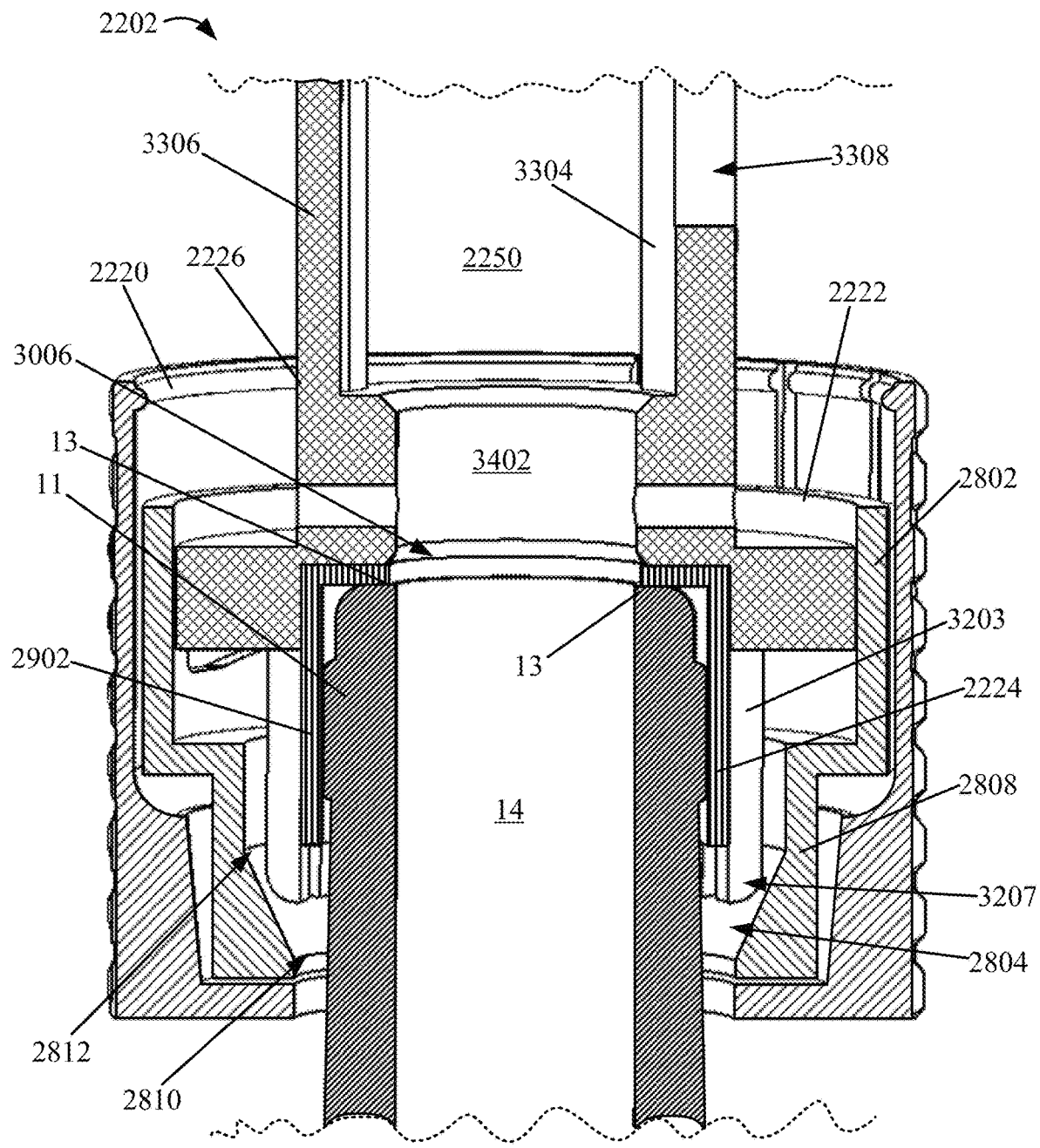
FIG. 37 illustrates a cross-section of a portion of the bottle securement assembly in a bottle unlock state.
Figure 38:
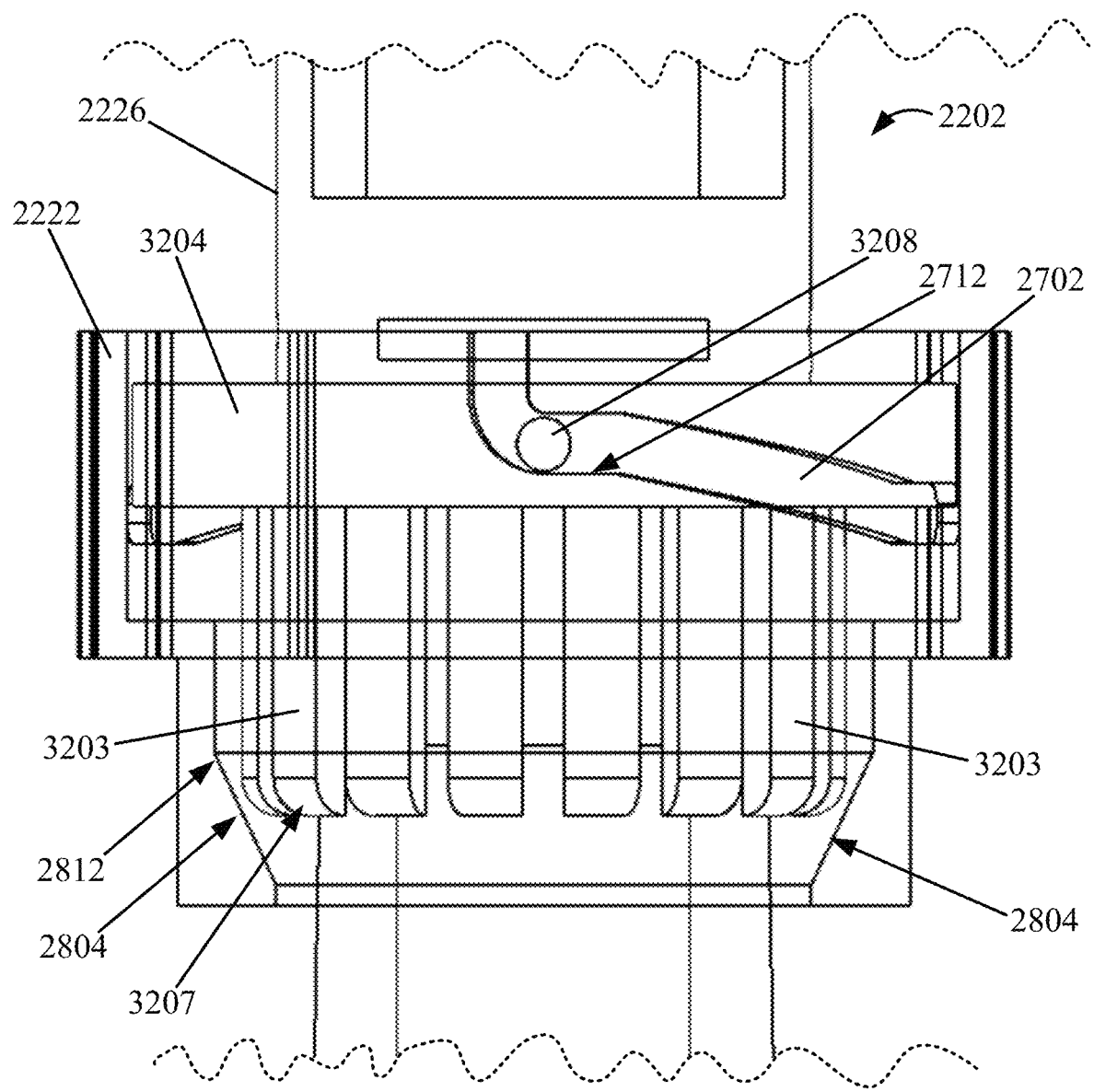
FIG. 38 illustrates a side view of a portion of the bottle securement assembly in a bottle unlock state.

FIG. 37 illustrates a cross-section of a portion of the bottle securement assembly 2202 in a bottle unlock state according to one aspect. FIG. 38 illustrates a side view of a portion of the bottle securement assembly 2202 in a bottle unlock state according to one aspect. Referring to FIGS. 22A, 37, and 38, a bottle's neck 11 is positioned within the bottle securement assembly 2202 by passing it through the device's bottom opening 2216. Specifically, the bottle lock nut's bottom opening 2306, the bottle lock outer member's bottom opening 2608, the bottle neck seal's bottom opening 2906, and the bottle lock inner member's bottom opening 3209 are aligned with one another (e.g., bottom openings 2306, 2608, 2906, 3209 vertically overlap) to allow the bottle's mouth 13 and neck 11 to pass through the device's bottom opening 2216 and be positioned within the bottle neck seal's inner cavity 3102. In the example shown, the bottle's neck 11 is not secured by bottle securement assembly 2202 and thus may be freely removed and reinserted into the device's bottom opening 2216. In such a bottle unlock state, the protrusions 3208 that reside on the platform's 3204 side surface rest in the outer member's grooves' starting points 2712, and inner member's teeth ends 3207 are positioned near the upper part 2812 of the inward sloping surface 2804.

Figure 39:
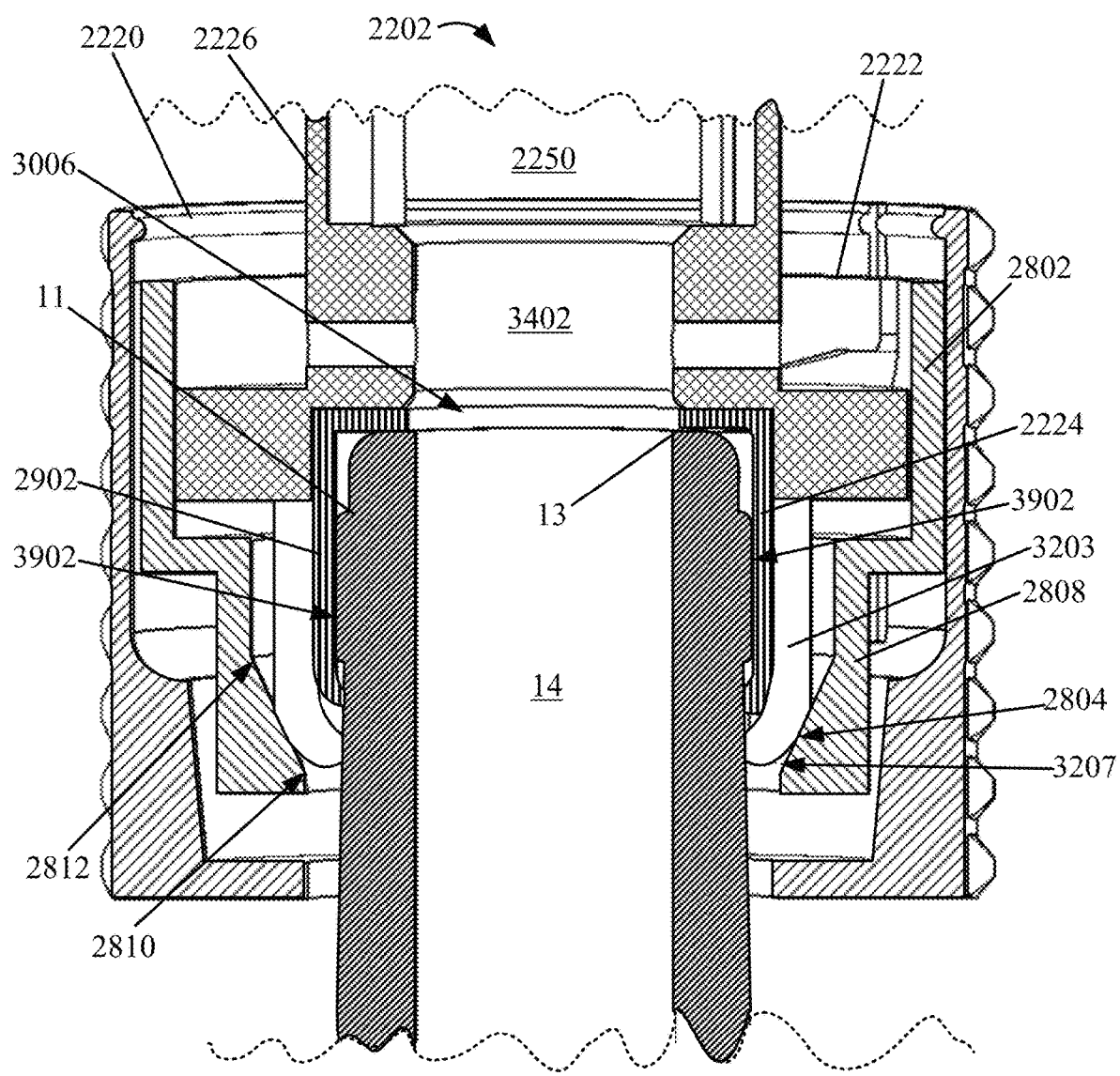
FIG. 39 illustrates a cross-section of a portion of the bottle securement assembly in a bottle lock state.
Figure 40:
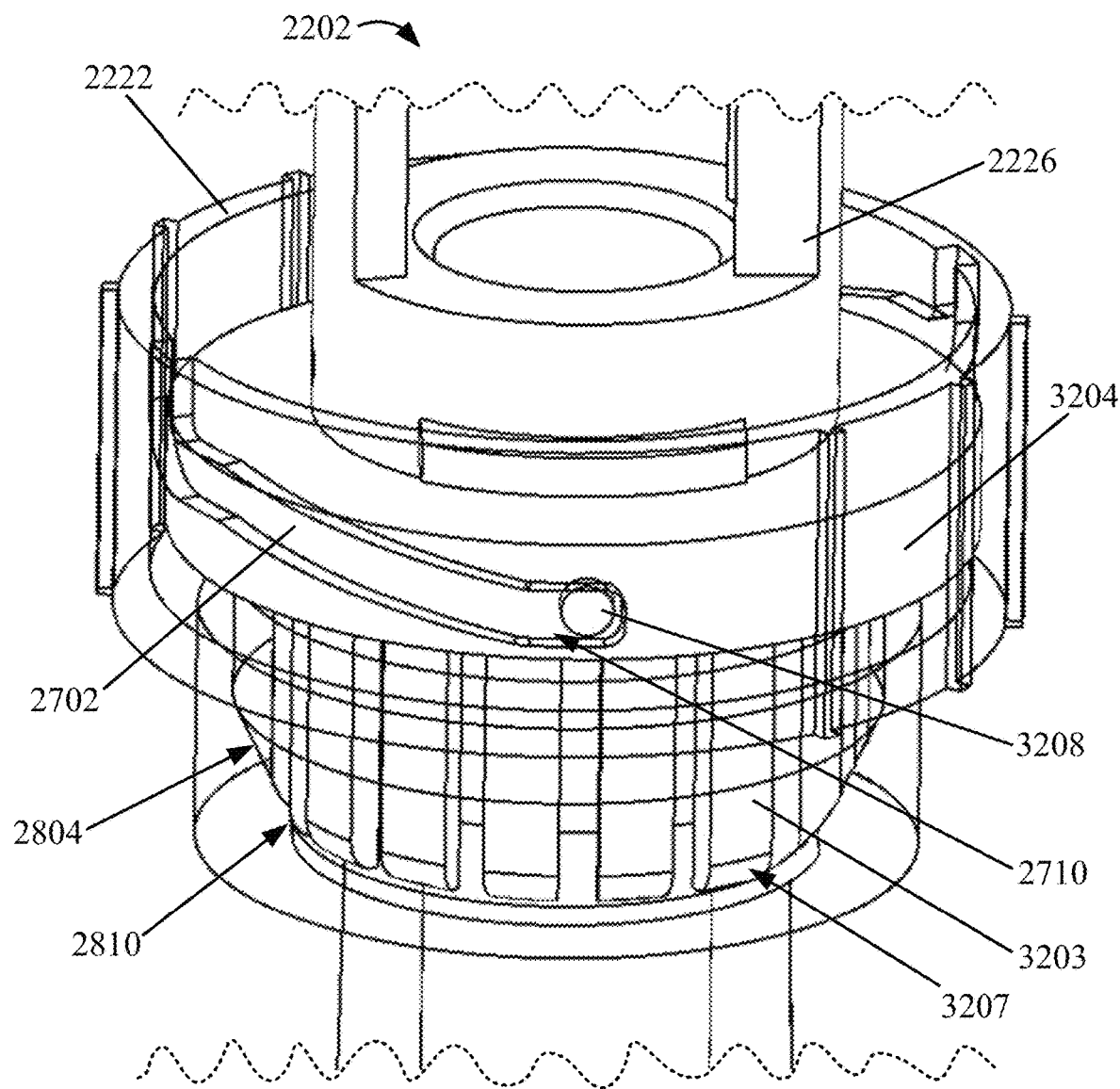
FIG. 40 illustrates a side view of a portion of the bottle securement assembly in a bottle lock state.

FIG. 39 illustrates a cross-section of a portion of the bottle securement assembly 2202 in a bottle lock state according to one aspect. FIG. 40 illustrates a side view of a portion of the bottle securement assembly 2202 in a bottle lock state according to one aspect. Referring to FIGS. 22A, 39, and 40, the bottle's neck 11 may be secured within the bottle securement assembly 2202 by rotating the bottle lock outer member 2222 (e.g., in a clockwise direction). The bottle lock outer member 2222 may be rotated by rotating the bottle lock nut 2220 to which it is attached. Rotating the bottle lock outer member 2222 causes the inner member's protrusions 3208 to travel along the outer member's grooves 2702 and stop at the termination point 2710 (end point) of the grooves 2702. This causes the outer member 2222 to move upwards (e.g., away from the device's bottom opening 2216) relative to the inner member 2226, which causes the ends 3207 of the inner member's teeth 3203 to press against the outer member's inward sloping surface 2804. This in turn causes the inner member teeth ends 3207 to bend inward toward the bottle's neck 11 thereby pressing the bottle neck seal's side wall 2902 firmly against the outer surface 3902 of the bottle's neck 11. Once the bottle neck seal's side wall 2902 is firmly pressed against the bottle's neck outer surface 3902 an airtight seal is formed between the bottle neck seal 2224 and bottle 10 preventing air from seeping into the device's interior air cavity 2250 (see FIG. 22B) so that the device's vacuum pumps 2208 can create an effective vacuum or partial vacuum within the device 2200 when necessary (e.g., when resealing the bottle 10 with a stopper 105).

The example of the bottle securement assembly 2202 shown and described above with respect to FIGS. 22A-40 is merely exemplary and is non-limiting. Other designs or variations of the design described above may also be used lock the bottle's neck within the device 2200 and create an airtight seal between the bottle neck's outer surface 3902 and the bottle securement assembly 2202 to prevent ambient air outside the device 2200 from entering the device's interior air cavity 2250 or the bottle's headspace 14. Thus, the bottle securement assembly is a means for securing the bottle's neck 11 within the device 2200 and creating an airtight seal between the bottle neck's outer surface 3902 and the bottle securement assembly 2202. Moreover, the bottle securement assembly 2202 described above is placed in a bottle lock state by twisting the bottle lock nut 2220 in a clockwise direction and a bottle unlock state by twisting the bottle lock nut 2220 in a counterclockwise direction. This is merely exemplary. In other aspects, the bottle securement assembly 2202 may be placed in a bottle lock state and a bottle unlock state by twisting the bottle lock nut 2220 in a counterclockwise direction and clockwise direction, respectively. In other aspects, no rotation may be required at all. For example, the bottle securement assembly 2202 may utilize latches, buckles, clamps, etc. to tighten the bottle securement assembly 2202 around the bottle's neck 11.

Figure 41:
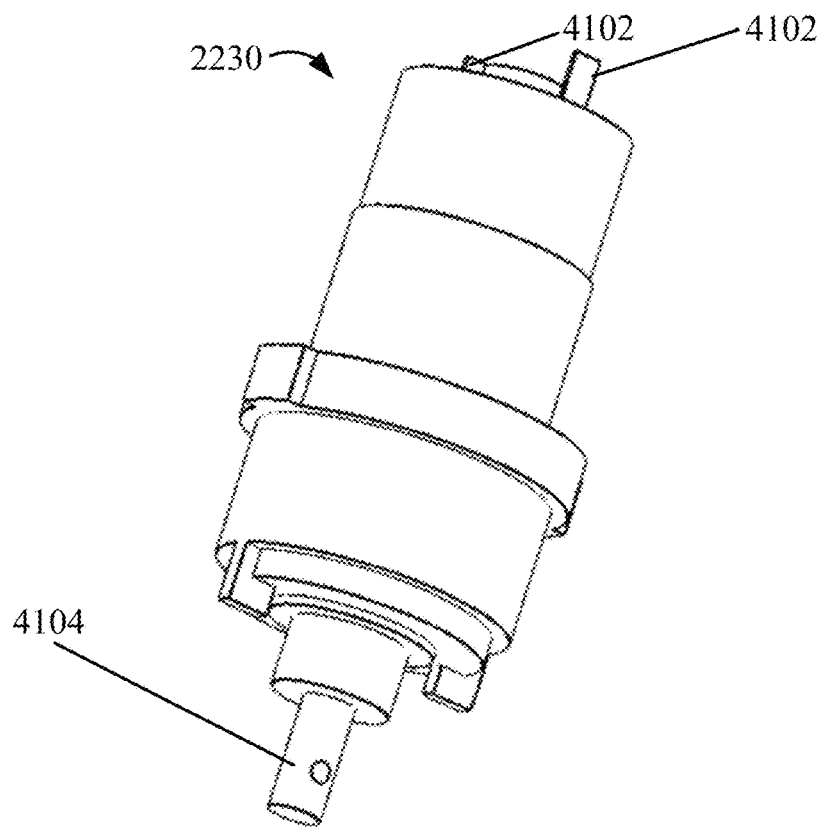
FIG. 41 illustrates a bottom perspective view of an exemplary electric motor.

FIG. 41 illustrates a bottom perspective view of an exemplary electric motor 2230 according to one aspect. The motor 2230 may include electrical contacts 4102 that are coupled to a power source such as the batteries 2210 shown in FIG. 22B. Referring to FIG. 41, the motor 2230 also includes a driveshaft 4104.

Figure 42:
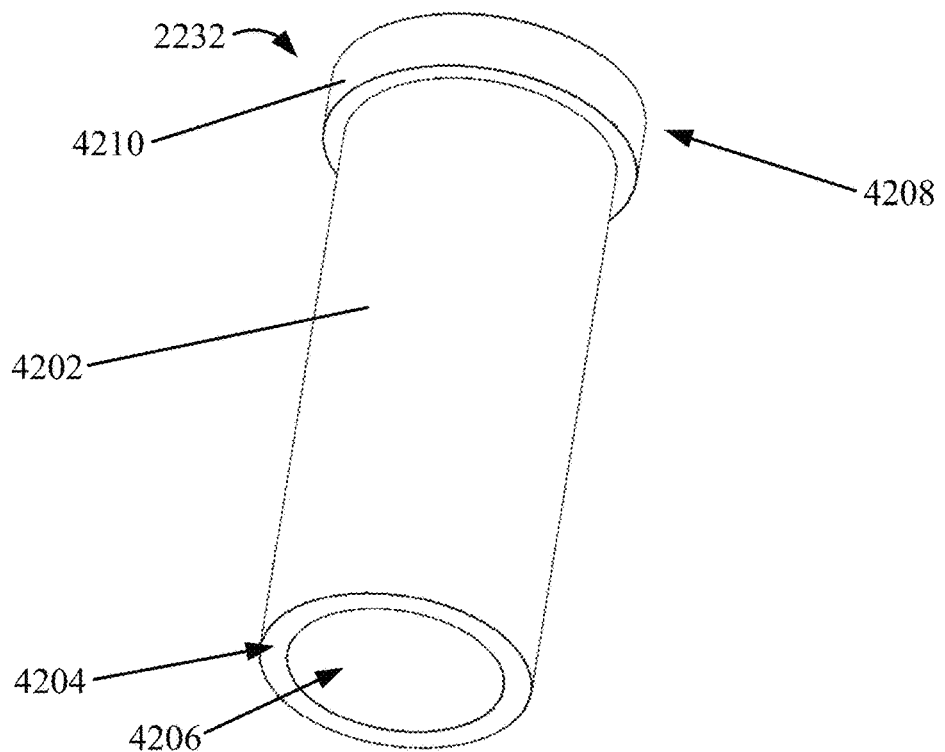
FIG. 42 illustrates a bottom perspective view of a device head guide.
Figure 43:
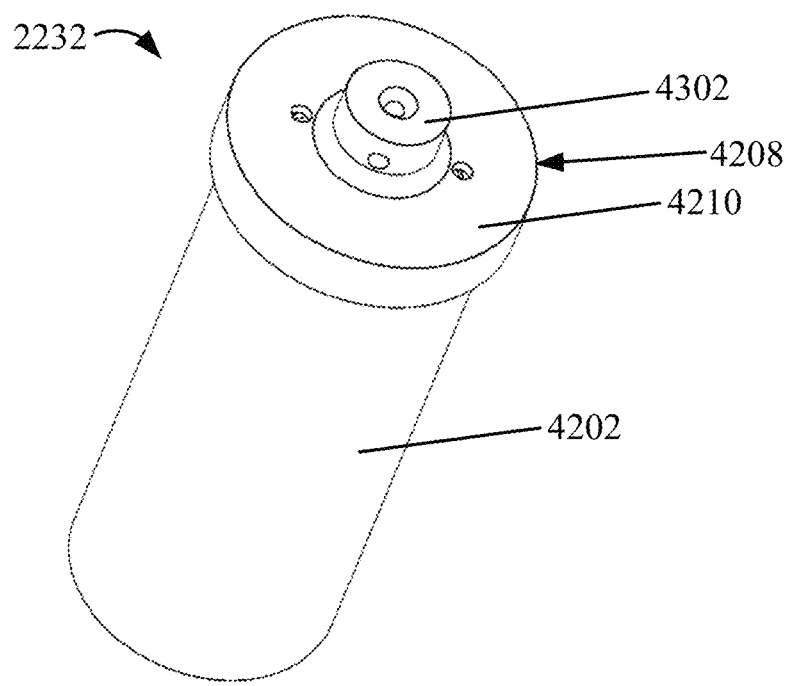
FIG. 43 illustrates a top perspective view of the device head guide.
Figure 44:
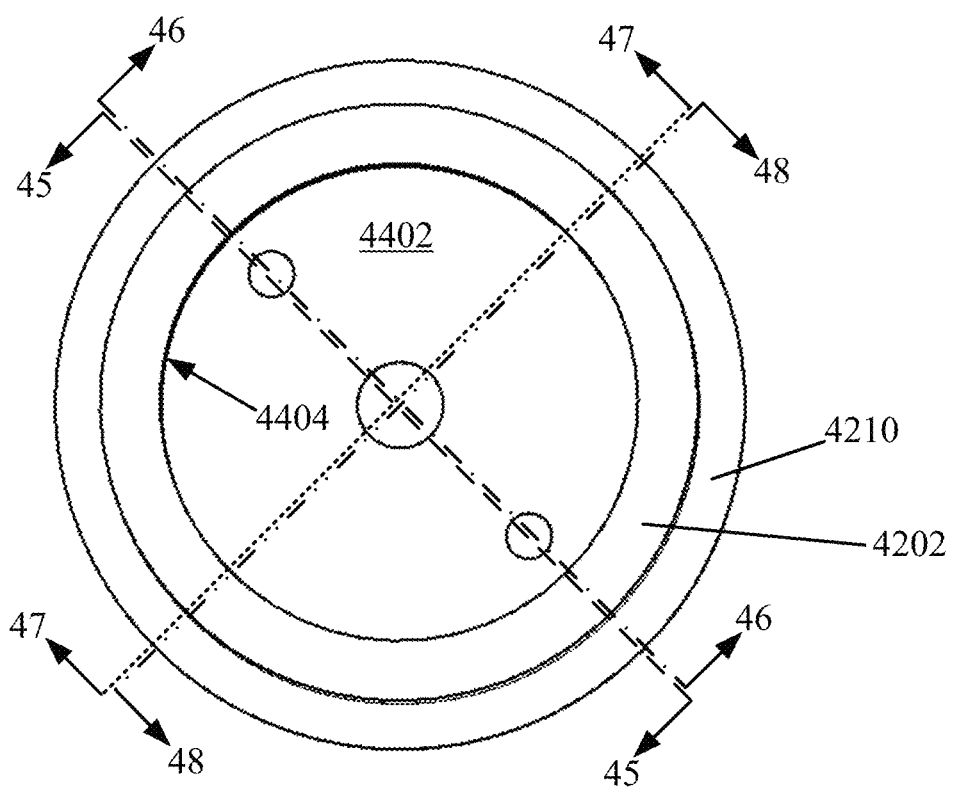
FIG. 44 illustrates a bottom view of the device head guide.
Figure 46:
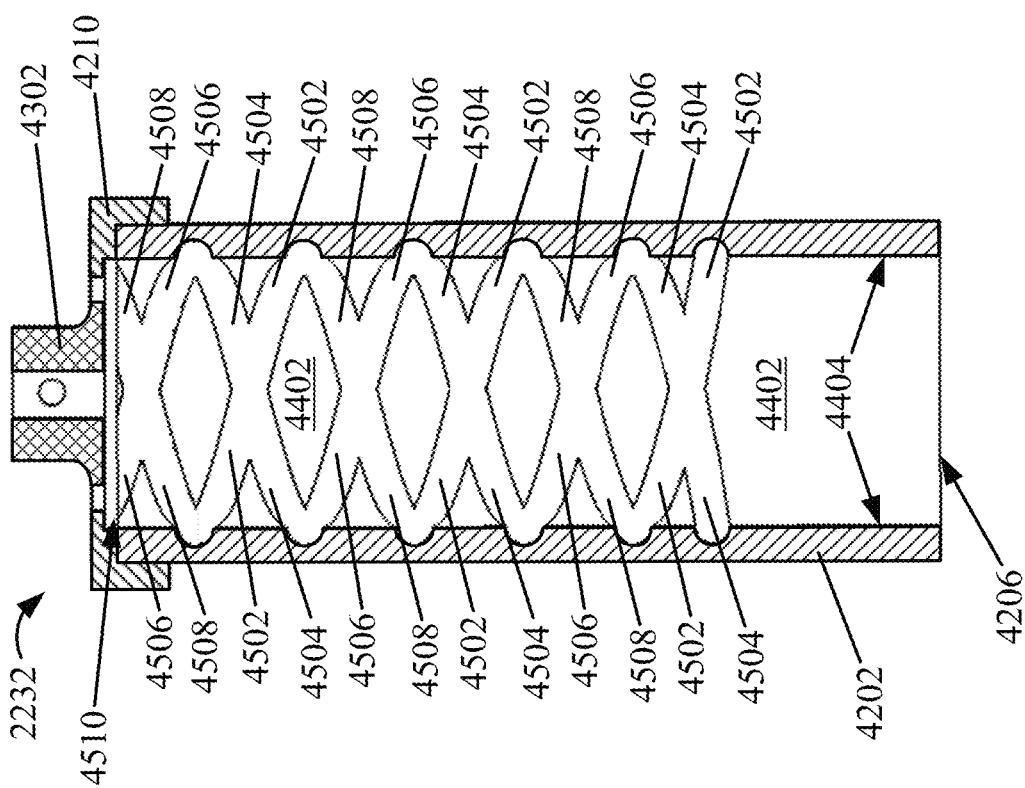
Figure 45:
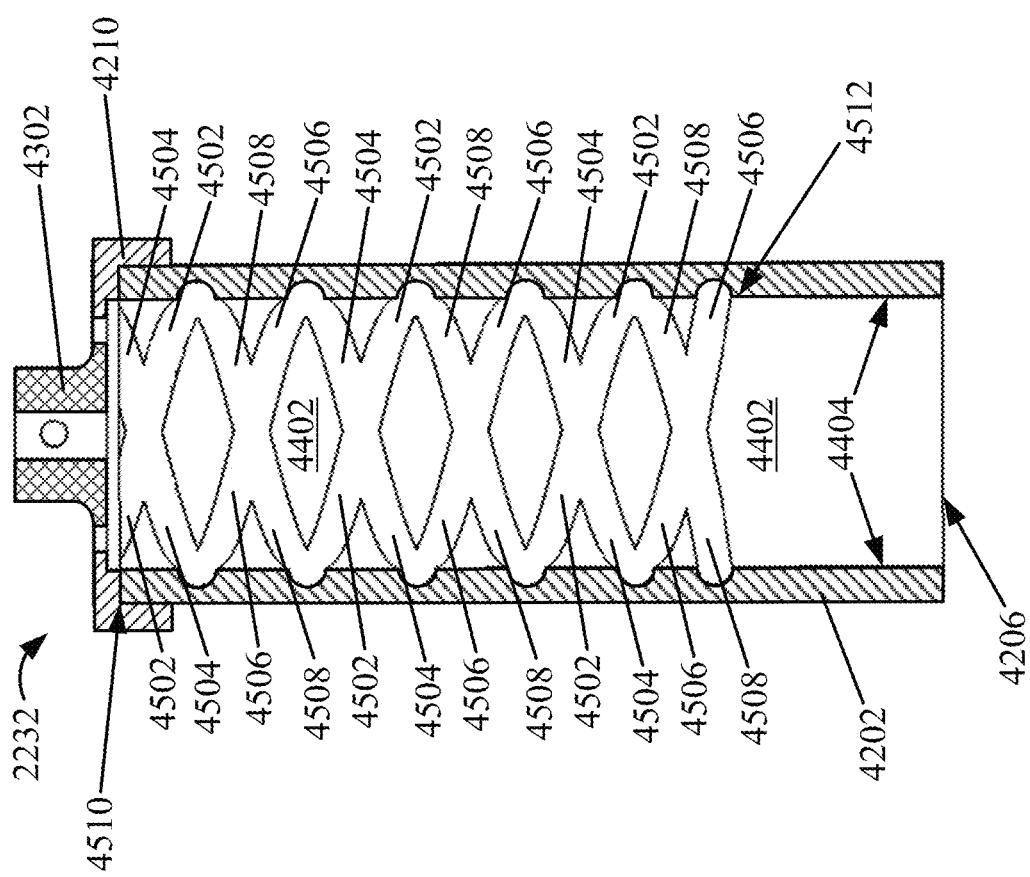

FIGS. 42-46 illustrate the device head guide 2232 according to one aspect. Specifically, FIG. 42 illustrates a bottom perspective view, FIG. 43 illustrates a top perspective view, and FIG. 44 illustrates a bottom view of the device head guide 2232 according to one aspect. FIGS. 45, 46, 47, and 48 illustrate cross-sectional views of the device head guide 2232 along the lines 45-45, 46-46, 47-47, and 48-48 (see FIG. 44), respectively.

Referring to FIG. 42, the device head guide 2232 may have a body 4202 that may be generally cylindrical in shape. The device head guide 2232 may also have a bottom end 4204 that includes a bottom opening 4206. At the other end 4208 of the device head guide 2232 may be a cap 4210.

Referring to FIG. 43, the top end 4208 of the device head guide 2232 may include a driveshaft engagement member 4302. Referring to FIGS. 41 and 43, the driveshaft engagement member 4302 couples to the motor's driveshaft 4104 so that when the driveshaft 4104 spins, the device head guide 2232, including its body 4202, spins along with the driveshaft 4104.

Referring to FIG. 44, the device head guide's body 4202 may be a substantially hollow cylinder having an internal cavity 4402. As described in greater detail below, a plurality of helical grooves run along an inner surface 4404 of the guide's body 4202. These grooves form tracks that are used by the stopper securement device head 2234 (see FIG. 22B) to travel longitudinally through the device head guide's internal cavity 4402.

FIGS. 45-48 illustrate a plurality of grooves 4502, 4504, 4506, 4508 bored into the inner surface 4404 of the device head guide's body 4202. The grooves 4502, 4504, 4506, 4508 may run helically starting at or near the top 4510 of body 4202 down to a base point 4512 that may be shy of the bottom end 4206 of the guide 2232. In the example shown, the base point 4512 is located a sufficient distance down from the top 4510 of the body 4202 to allow the stopper securement device 2206 to fully penetrate a bottle stopper 105 when a bottle's neck 11 is locked into place within the bottle securement assembly 2202 (see FIGS. 22B and 40). The base point 4512 may also be located a sufficient distance up from the bottom 4206 of the body 4202 so that the stopper securement device 2206 does not travel too far down into the bottle 10.

As described in greater detail below, the four paths of grooves 4502, 4504, 4506, 4508 that run helically along the inner surface 4404 of the body 4202 allow the stopper securement device head 2234 to travel longitudinally (e.g., up and down) through the device head guide's internal cavity 4402. Specifically, a first pair of grooves 4502, 4506 and a second pair of grooves 4504, 4508 allow the stopper securement device head 2234 (see FIG. 22B) to travel longitudinally (e.g., up and down) through the guide 2232. For example, the stopper securement device head 2234 may travel down through the guide 2232 along the second pair of grooves 4504, 4508 and then back up the guide 2232 along the first pair of grooves 4502, 4506. The device head 2234 may then reverse course and travel down through the guide 2232 along the first pair of grooves 4502, 4506 and then back up the guide 2232 along the second pair of grooves 4504, 4508.

Figure 49:
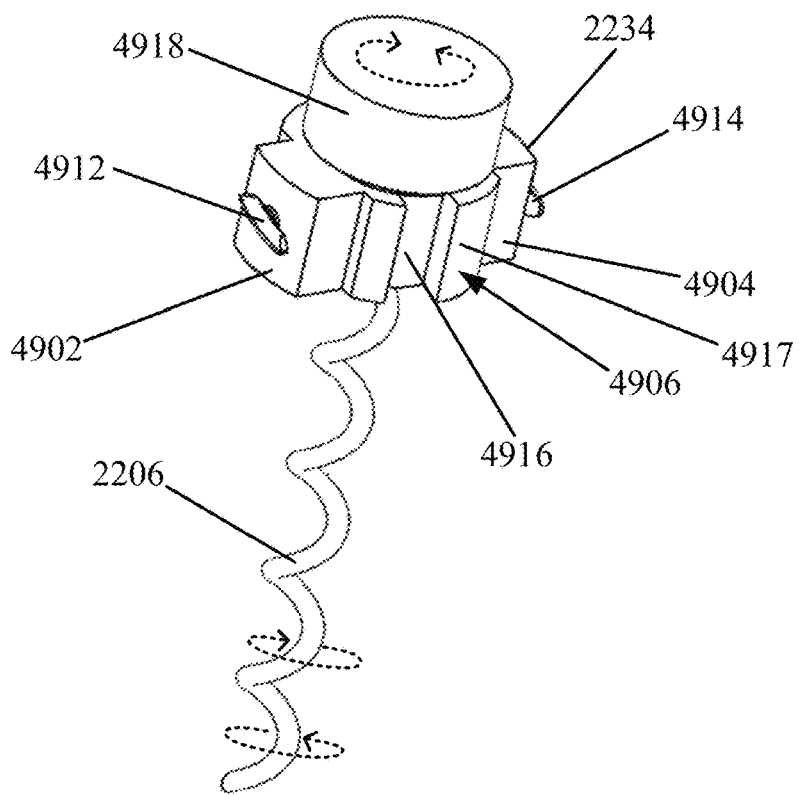
FIG. 49 illustrates a front perspective view of a stopper securement device head.
Figure 50:
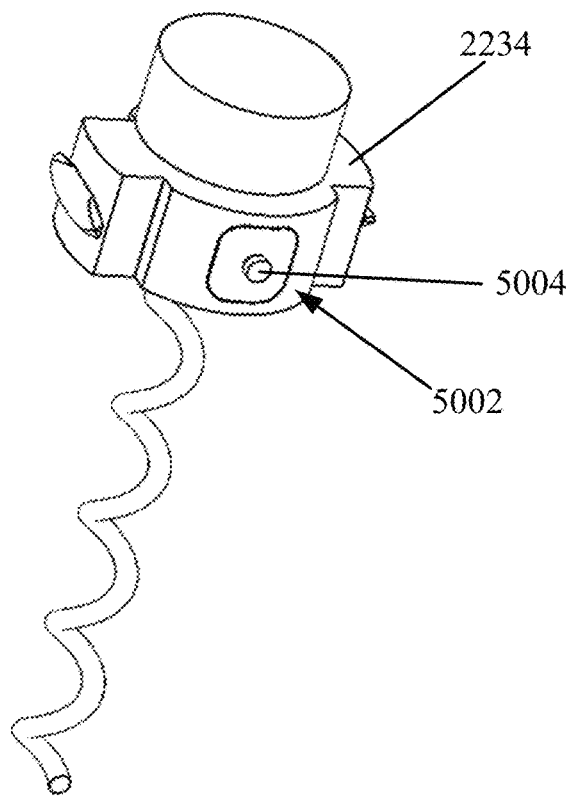
FIG. 50 illustrates a rear perspective view of the stopper securement device head.
Figure 51:
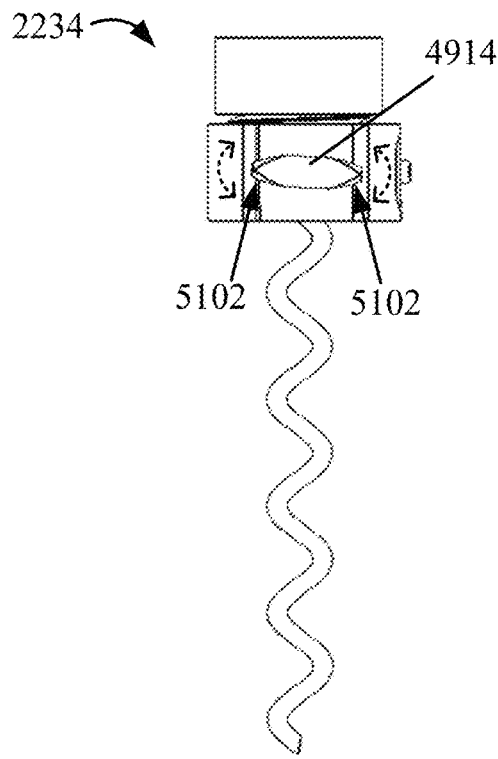
FIG. 51 illustrates a left side view of the stopper securement device head.
Figure 52:
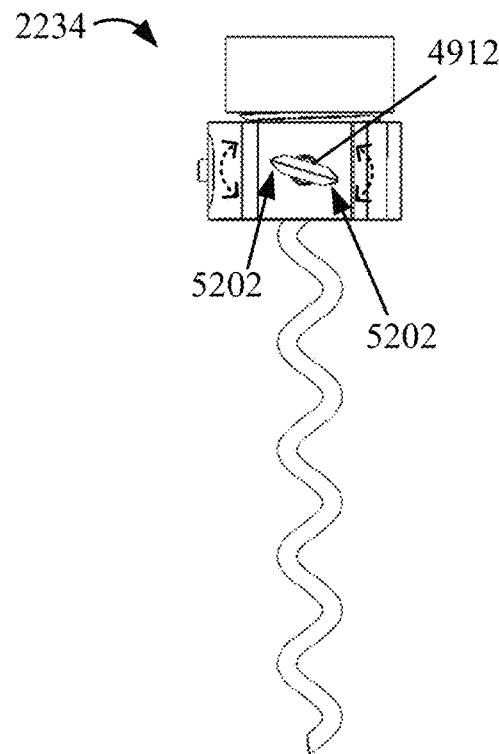
FIG. 52 illustrates a right side view of the stopper securement device head.
Figure 53:
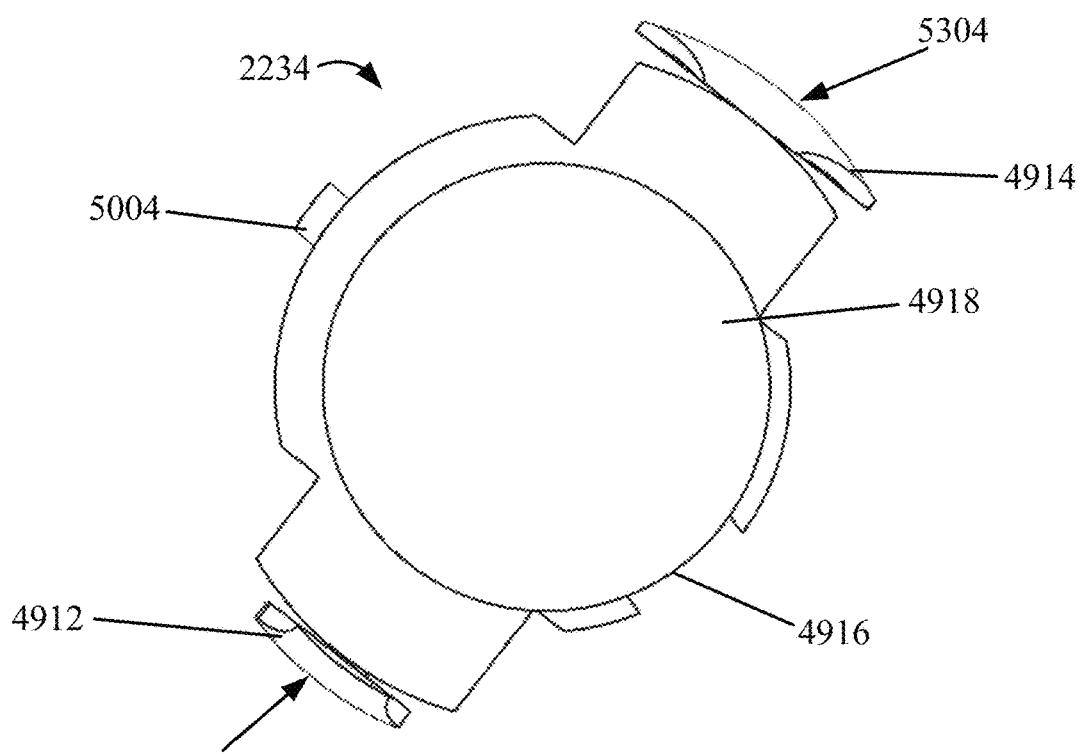
FIG. 53 illustrates a top view of the stopper securement device head.

FIGS. 49-54 illustrate the stopper securement device head 2234 according to one aspect. Specifically, FIG. 49 illustrates a front perspective view, FIG. 50 illustrates a rear perspective view, FIG. 51 illustrates a left side view, FIG. 52 illustrates a right side view, FIG. 53 illustrates a top view, and FIG. 54 illustrates a bottom view of the stopper securement device head 2234 according to one aspect.

Referring to FIGS. 49 and 50 the stopper securement device head 2234 may include a first side lobe 4902, a second side lobe 4904, a front face 4906, and a rear face 5002. The first side lobe 4902 may include a first runner 4912 and the second side lobe 4904 may include a second runner 4914. The front face 4906 may include a mode pin bypass channel 4916 and a mode pin actuator 4917 while the rear face 5002 may include a retractable protrusion 5004 (e.g., spring-mounted button). The stopper securement device head 2234 supports the stopper securement device 2206 (e.g., corkscrew), the latter passing through the stopper securement device head 2234. The stopper securement device 2206 includes a top portion 4918 that resides on the top side of the stopper securement device head 2234 to help secure the stopper securement device 2206 to the stopper securement device head 2234. In the example shown, the stopper securement device 2206 and its top portion 4918 may rotate together freely in the direction of the dashed arrows shown in FIG. 49 independent to the stopper securement device head 2234. That is, the stopper securement device head 2234 may remain still while the stopper securement device 2206 and its top portion 4918 rotate clockwise or counterclockwise.

Referring to FIG. 50, the retractable protrusion 5004 may be a spring-mounted button that can retract into the device head 2234 when pushed with a force that exceeds a predetermined amount. The protrusion 5004 may retract until it is substantially flush with the rear face 5002.

Referring to FIGS. 51 and 52, each runner 4912, 4914 may generally have an oblong shape as shown with a longitudinal axis that is generally tangential to the face 4902, 4904 from which the runner 4912, 4914 protrudes. The runners 4912, 4914 may be mounted to their respect device head face 4902, 4904 so that they are able to spin or rotate freely according to the directions indicated by the dashed arrows in FIGS. 51 and 52. The runners 4912, 4914 may also have tapered ends 5102, 5202. Referring to FIG. 53, an outer surface 5302, 5304 of the runners 4912, 4914 may be curved as shown to generally match the curvature of the device head guide's grooves 4502, 4504, 4506, 4508 (see FIG. 45).

FIGS. 55 and 56 illustrate the mode pin 2236 according to one aspect. Specifically, FIG. 55 illustrates a front perspective view and FIG. 56 illustrates a side view of the mode pin 2236 according to one aspect.

Referring to FIGS. 55 and 56, the mode pin 2236 may be composed of a strong yet flexible material such as, but not limited to, metal or plastic. The mode pin 2236 may be generally a planar, long, narrow strip of material that is relatively thin as shown. In one aspect, the mode pin 2236 may have a central portion 5502, a top end 5504 (e.g., first end), and a bottom end 5506 (e.g., bottom end). The top end 5504 may feature a looping portion 5508 that forms a hook 5510. Referring to FIGS. 36, 55, and 56, the hook 5510 allows the mode pin 2236 to couple to the top portion 3602 of the inner member's first guide 3304. Referring to FIGS. 55 and 56, the bottom end 5506 may flare out so that its termination point 5512 is located a distance d away from the plane in which the central portion 5502 lies. The termination point 5512 may be used to abut and secure the spin control accessory 2238 in some modes of operation of the device 2200. The mode pin 2236 may also have a transition surface 5514 between the central portion 5502 and the bottom end 5506.

Figure 57:
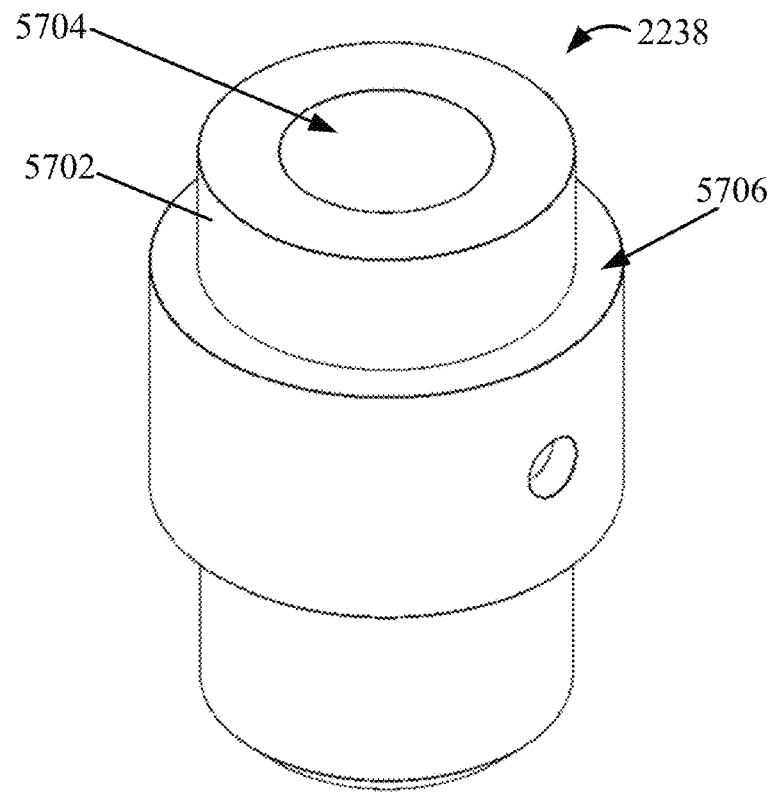
FIG. 57 illustrates a top perspective view of a spin control accessory.
Figure 58:
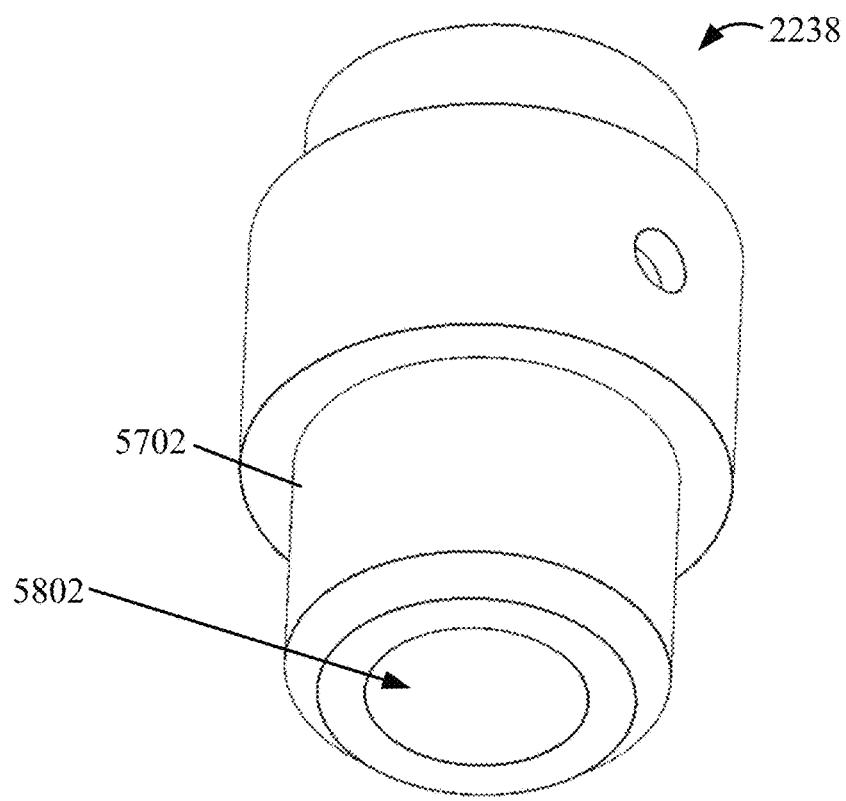
FIG. 58 illustrates a bottom perspective view of the spin control accessory.
Figure 59:
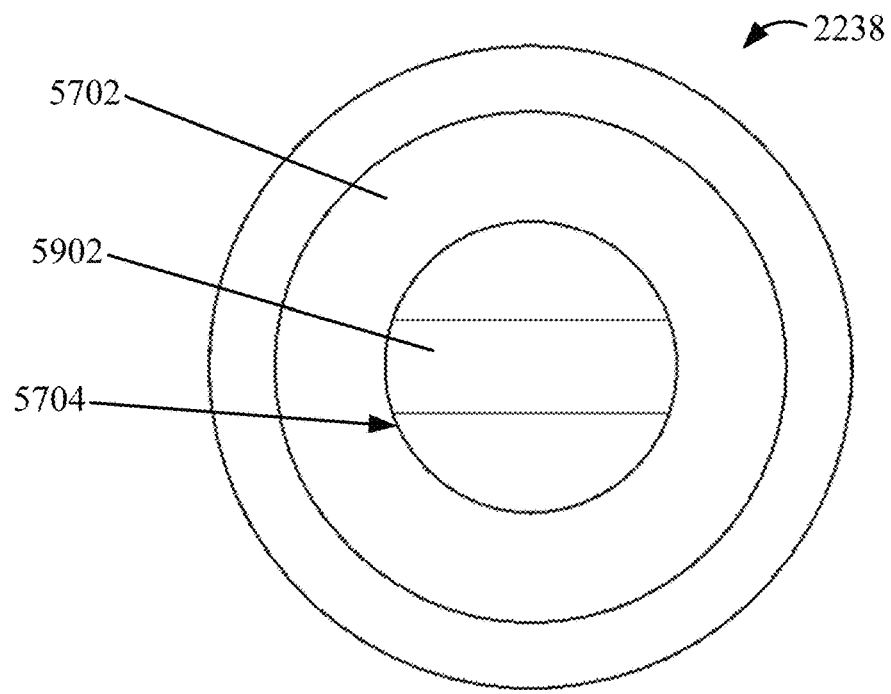
FIG. 59 illustrates a top view of the spin control accessory.
Figure 60:
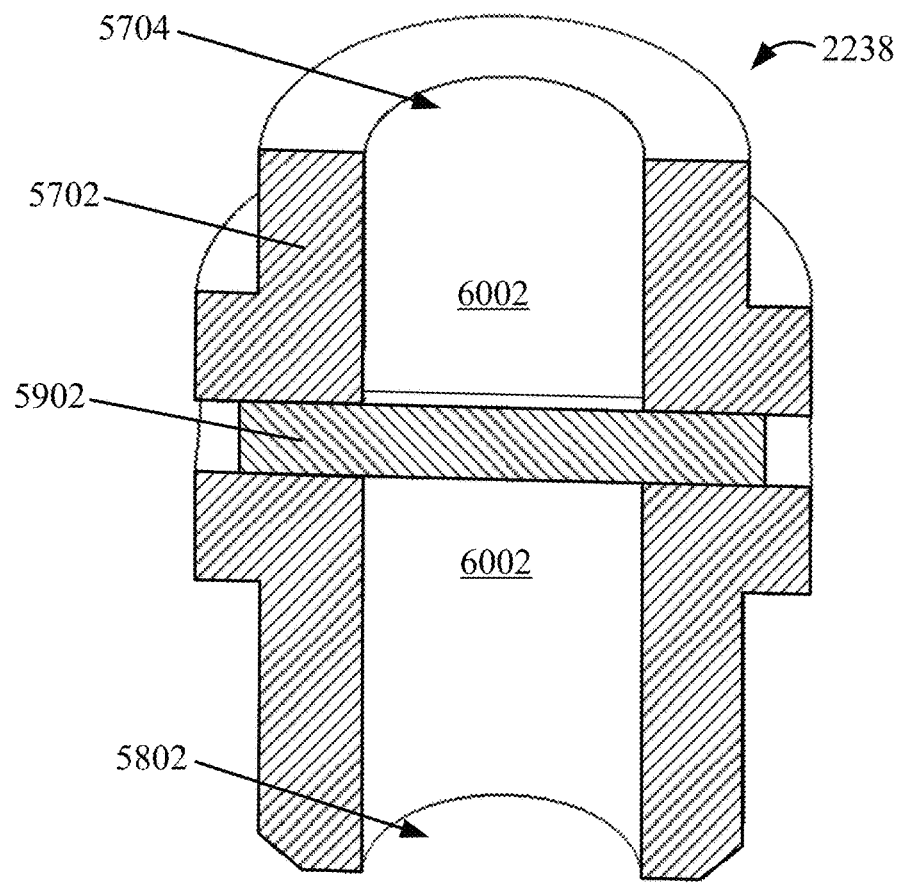
FIG. 60 illustrates a cross-sectional view along the line 60-60 shown in FIG. 59 of the spin control accessory.

FIGS. 57-60 illustrate the spin control accessory 2238 according to one aspect. Specifically, FIG. 57 illustrates a top perspective view, FIG. 58 illustrates a bottom perspective view, FIG. 59 illustrates a top view, and FIG. 60 illustrates a cross-sectional view along the line 60-60 (see FIG. 59) of the spin control accessory 2238 according to one aspect.

Referring to FIGS. 57 and 58, the spin control accessory 2238 may generally have a hollow cylindrical shape according to one aspect. The spin control accessory 2238 may include a main cylindrical body 5702 having a top opening 5704 (e.g., first opening) and a bottom opening 5802 (e.g., second opening). Referring to FIGS. 59 and 60, the spin control accessory 2238 may also include a bar 5902 within its internal cavity 6002 that runs across the hollow center perpendicular to the stopper securement device's 2206 (see FIG. 51) longitudinal axis. As described in greater detail below, the spin control accessory's bar 5902 may be responsible for causing the stopper securement device 2206 to rotate about its longitudinal axis in some operational modes of the device where the stopper securement device 2206 penetrates into or withdraws from the stopper 105.

FIGS. 61-64 and 66-80 illustrate the device 2200 in different operational modes to help demonstrate how the various components of the device 2200 may operate and interact with one another to open a sealed bottle and then reseal the bottle with its own stopper under vacuum.

FIGS. 61-64 and 80 illustrate the device 2200 in a first state where a bottle 10 having a stopper 105 secured within its neck 11 is inserted into the device 2200 to have its stopper 105 removed. The sealed bottle 10 is first inserted into the device's bottom opening 2216 (see FIG. 22B) and the bottle securement assembly 2202 locks the bottle 10 within the device 2200 as shown in FIGS. 39 and 40.

Figure 61:
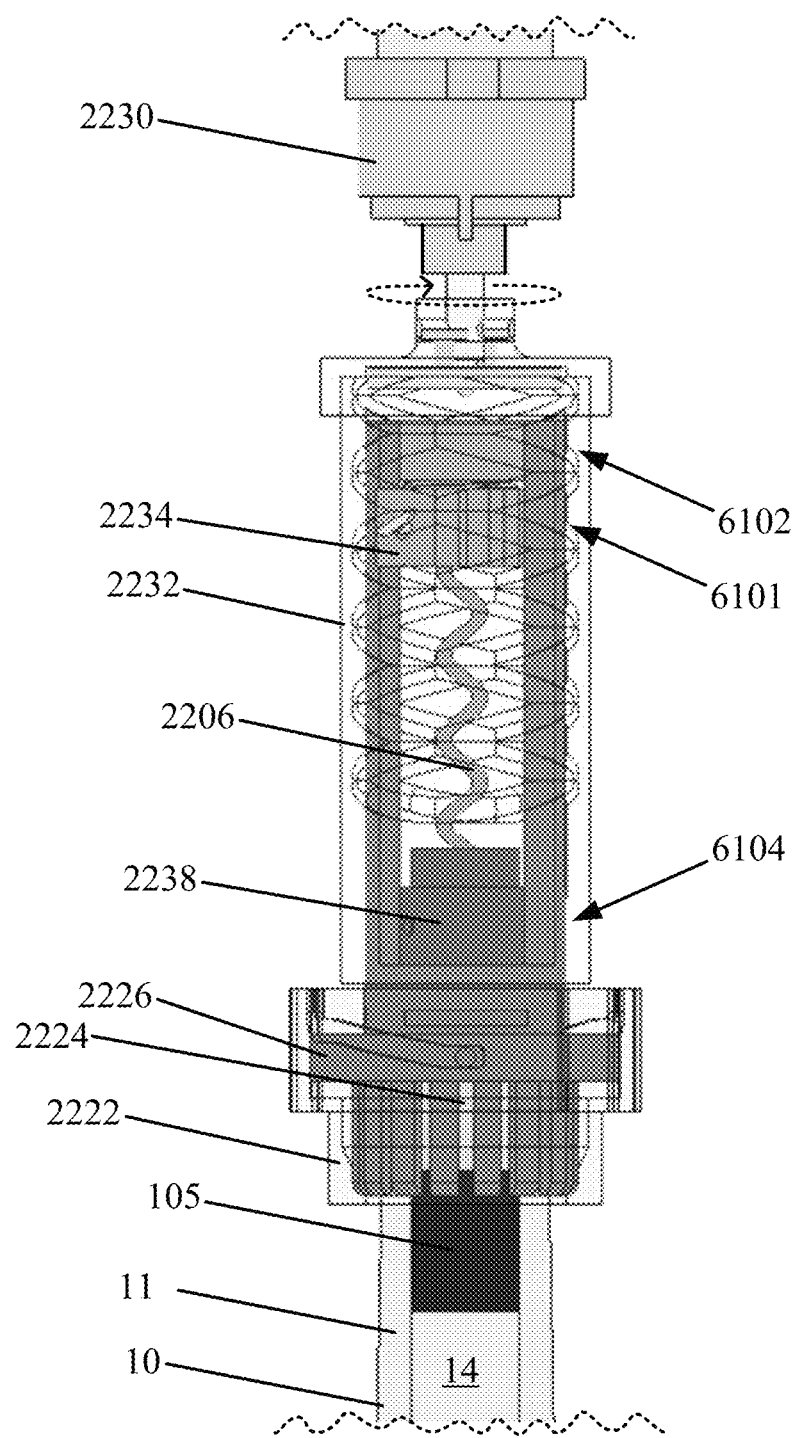
FIG. 61 illustrates a functional side view of a portion of the device in a first state.

FIG. 61 illustrates a functional side view of a portion of the device 2200 including the bottle lock outer member 2222, the bottle neck seal 2224, the bottle lock inner member 2226, the spin control accessory 2238, the device head guide 2232, the stopper securement device head 2234, and the stopper securement device 2206. Certain components, such as the bottle lock outer member 2222 and the device head guide 2232, are shown transparent, and other device components, such as the bottle lock nut 2220, the mode pin 2236, and the housing 2201, have been removed to improve clarity.

Figure 62:
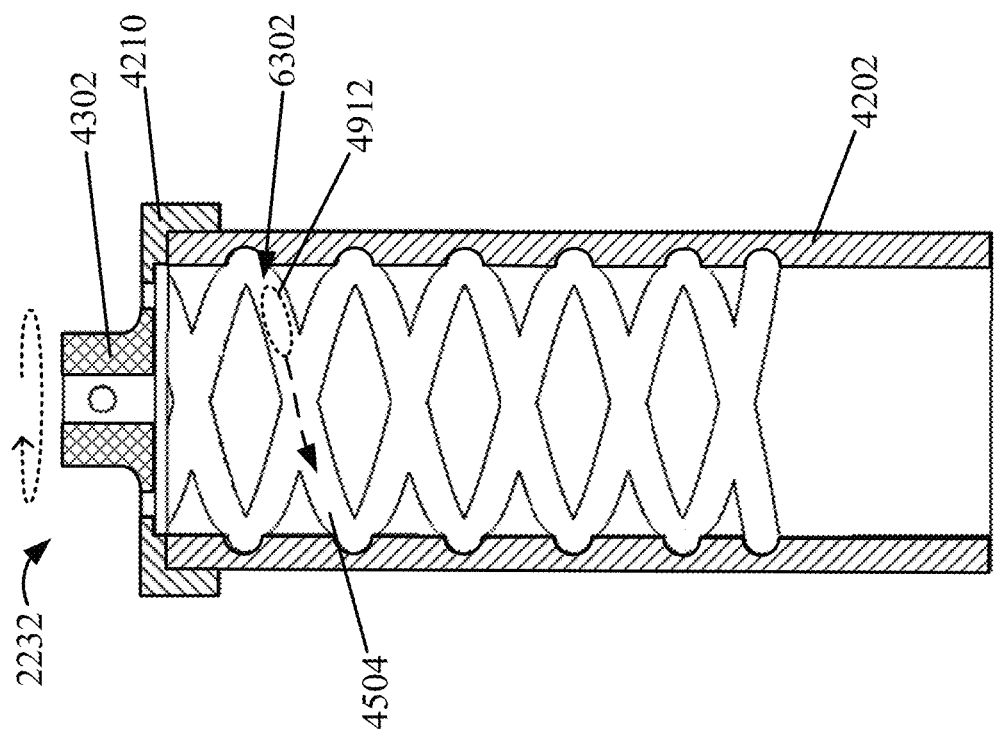
FIGS. 62 and 63 illustrate cross-sectional views of the device head guide and the position of the stopper securement device head's runners when the device is in the first state.
Figure 63:
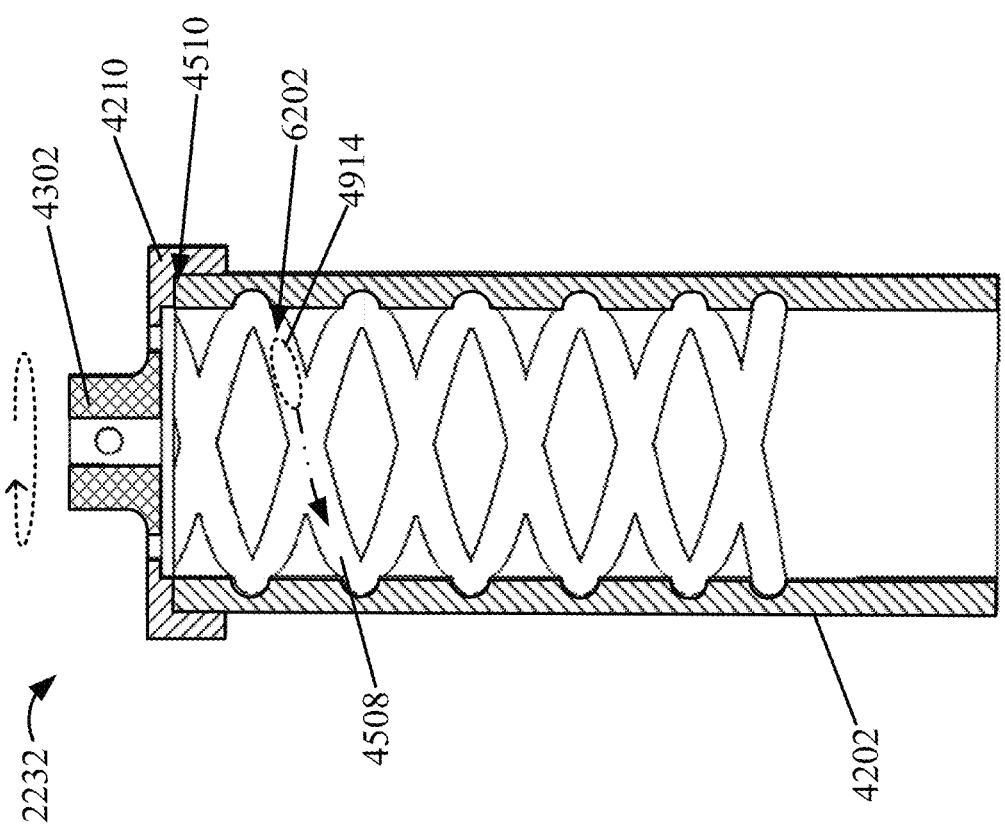
Figure 64:
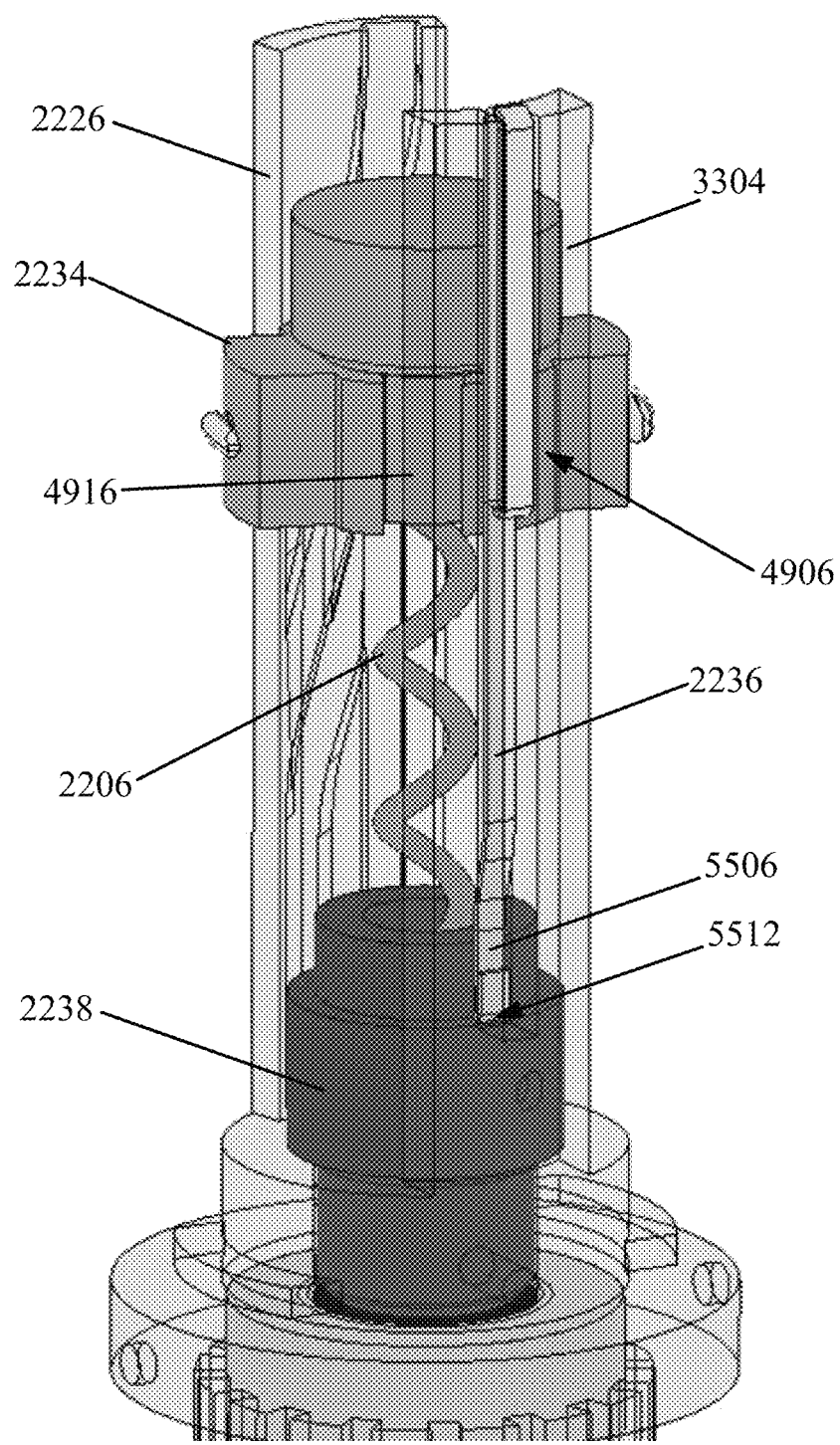
FIG. 64 illustrates a perspective view of the bottle lock inner member, the spin control accessory, the stopper securement device head, the mode pin, and the stopper securement device when the device is in the first state.
Figure 80:
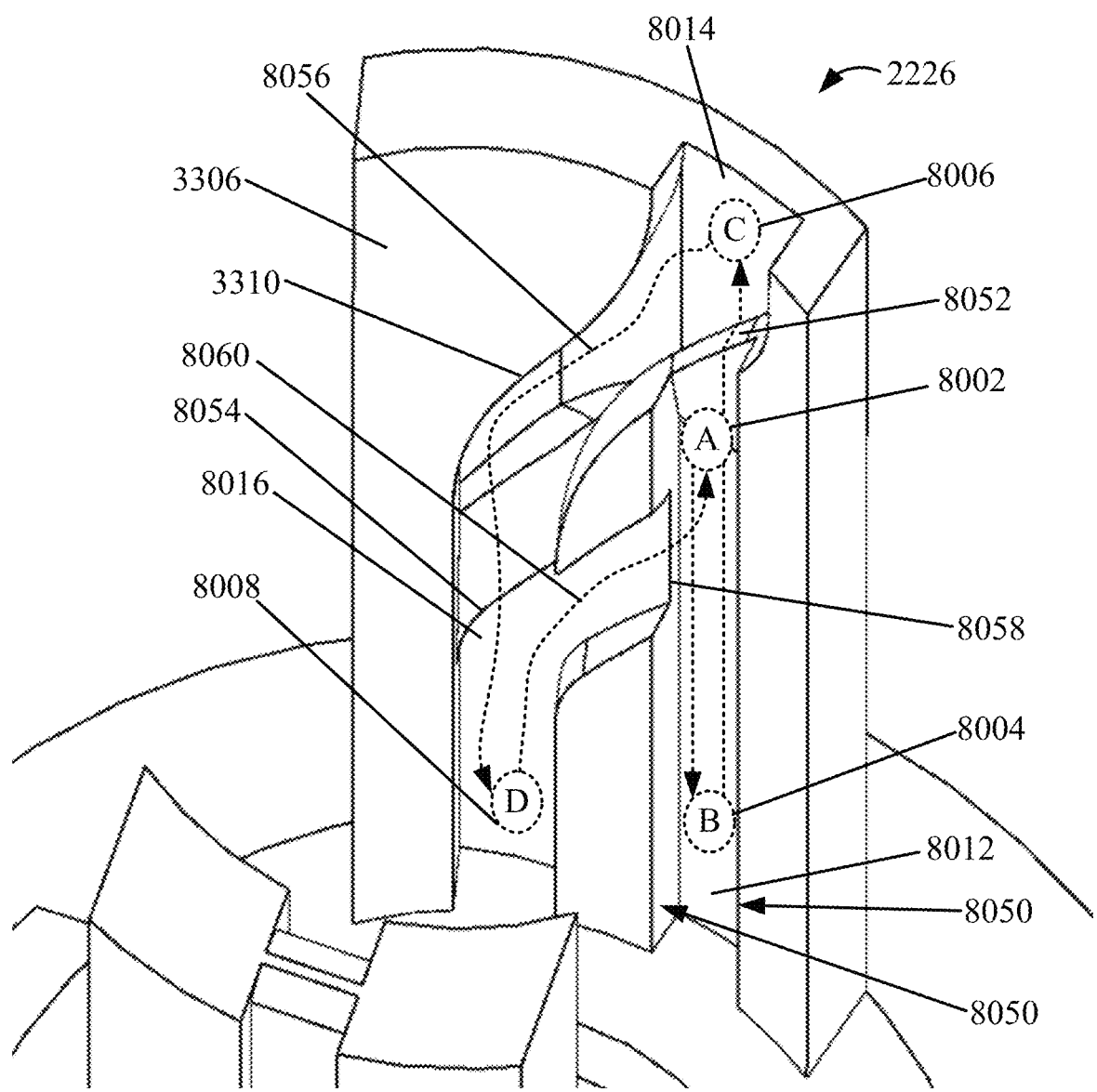
FIG. 80 illustrates various paths that the stopper securement device head's retractable protrusion may traverse with grooves of the bottle lock inner member's second guide while the device transitions between different states (e.g., first state to second state to third state to fourth state to first state).

FIGS. 62 and 63 illustrate cross-sectional views of the device head guide 2232 along the lines 45-45 and 46-46 (see FIG. 44), respectively, to help illustrate the position of the stopper securement device head's runners 4912, 4914 within the device head guide's grooves 4502, 4504, 4506, 4508. FIG. 64 illustrates a perspective view of the bottle lock inner member 2226, the spin control accessory 2238, the stopper securement device head 2234, the mode pin 2236, and the stopper securement device 2206. FIG. 80 illustrates the bottle lock inner member's second guide 3306, and in particular, it shows the location of the stopper secure device head's retractable protrusion 5004 with the second guide's grooves 3310 when the device 2200 is in the first state.

Referring to FIG. 61, when the device 2200 is in the first state, the stopper securement device head 2234 may be positioned at a first position 6101 near the top 6102 (may be slightly below the top 6102) of the device head guide 2232 and the spin control accessory 2238 may be positioned at or near the bottom 6104 of the device head guide 2232. In the first state, the stopper securement device 2206 (e.g., corkscrew) has not yet penetrated the stopper 105 and resides substantially within the bottle lock inner member's upper portion 3302 (see FIG. 33). Referring to FIGS. 62 and 63, the stopper securement device head's runners 4912, 4914 may be located at a first position 6202, 6302 somewhat close to the top 4510 of the device head guide's body 4202 as shown. In the illustrated example, the first runner 4912 and the second runner 4914 are shown resting within the second pair of grooves 4504, 4508. Referring to FIG. 64, in the first state the stopper securement device head 2234 is oriented such that the mode pin actuator 4917 (see FIG. 49) on the device head's front face 4906 is turned toward the mode pin 2236. FIG. 80 illustrates the corresponding position 8002 (labeled position A) of the stopper securement device head's retractable protrusion 5004 within the second guide's first channel 8012 while the device is in the first state. Specifically, position A is near the top of the first channel 8012.

While in the first state, a user may manipulate one or more controls 2212, 2213 (see FIG. 22B) of the device 2200 to open the bottle 10 by removing the stopper 105 within the bottle's neck 11. Referring to FIGS. 61-63, doing so may cause the electric motor 2230 to spin in a first direction (e.g., clockwise), which in turn also rotates the device head guide 2232 about its longitudinal axis in the first direction. However, rotating the device head guide 2232 may not cause continuous and substantial rotation of the stopper securement device head 2234 within the device head guide 2232 as explained below.

Figure 65:
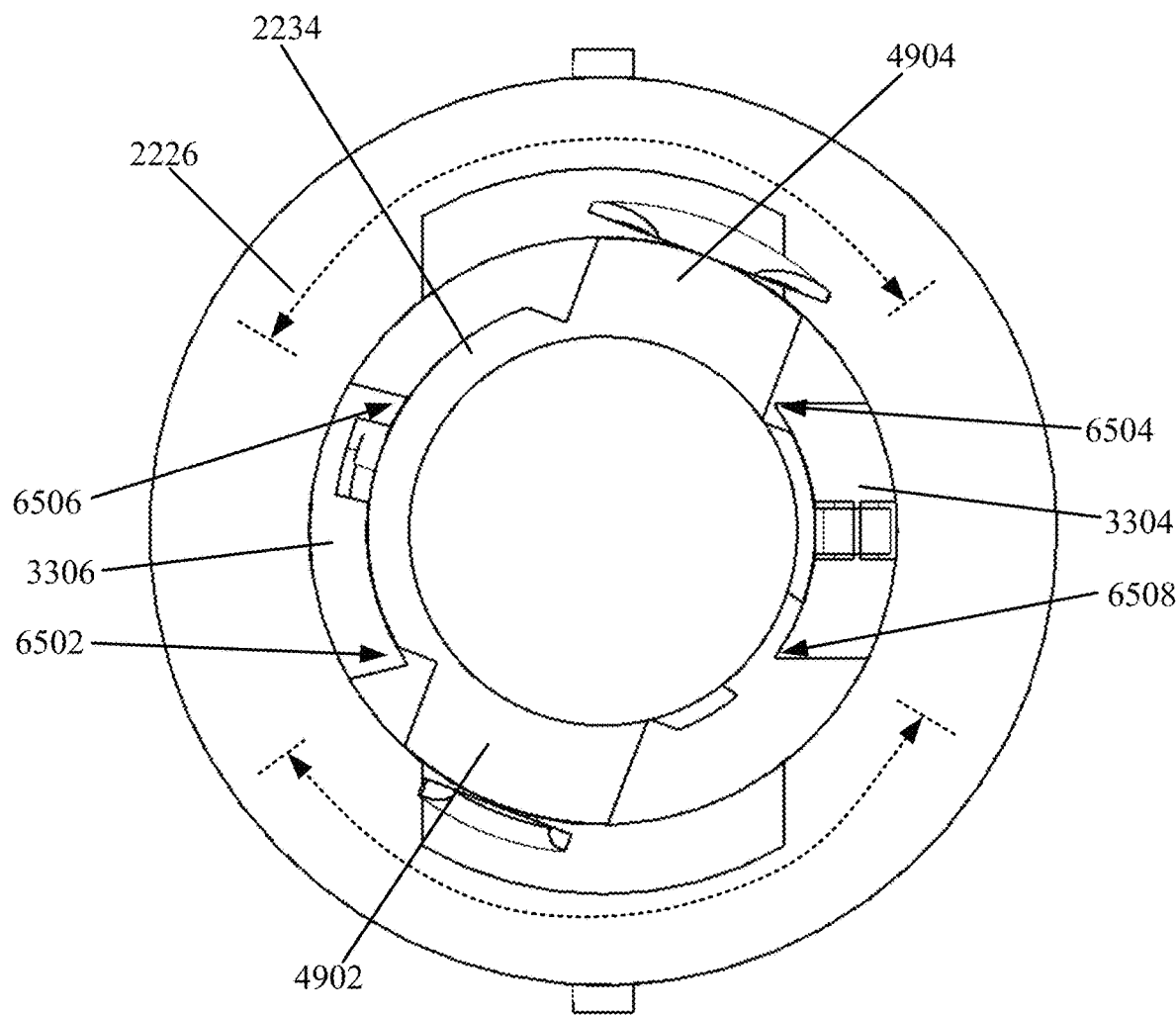
FIG. 65 illustrates a top view of the stopper securement device head and the bottle lock inner member.
Figure 66:
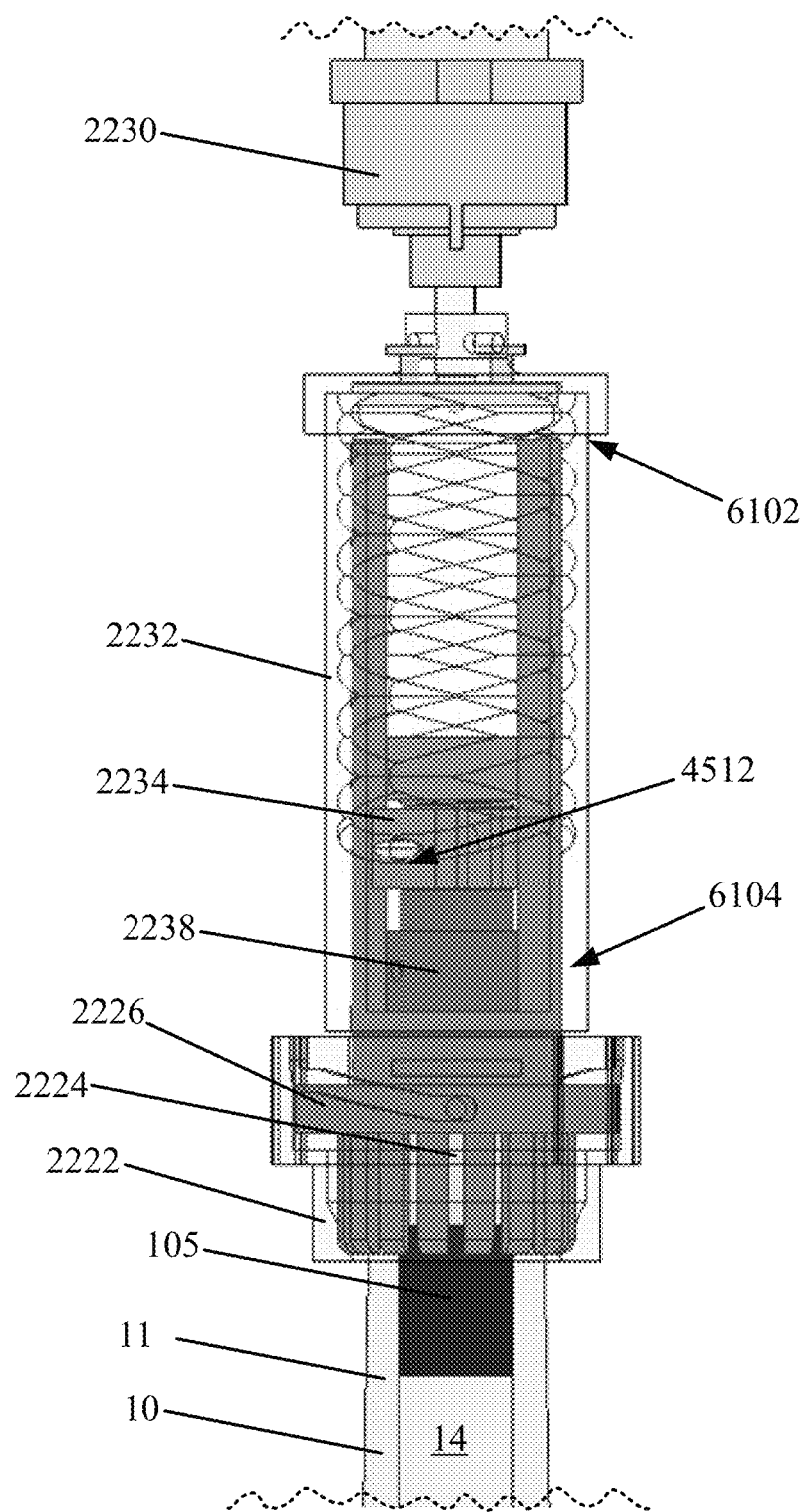
FIG. 66 illustrates a functional side view of a portion of the device in a second state.
Figure 68:
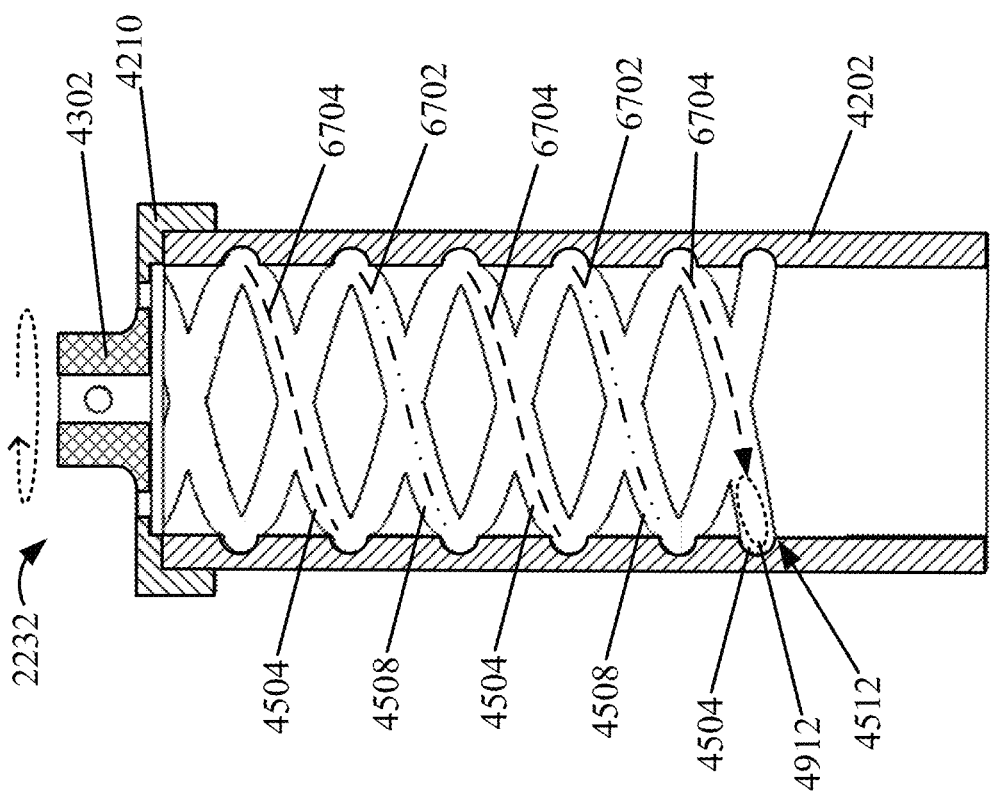
FIGS. 67 and 68 illustrate cross-sectional views of the device head guide and the position of the stopper securement device head's runners as the device transitions from the first state to the second state.
Figure 67:
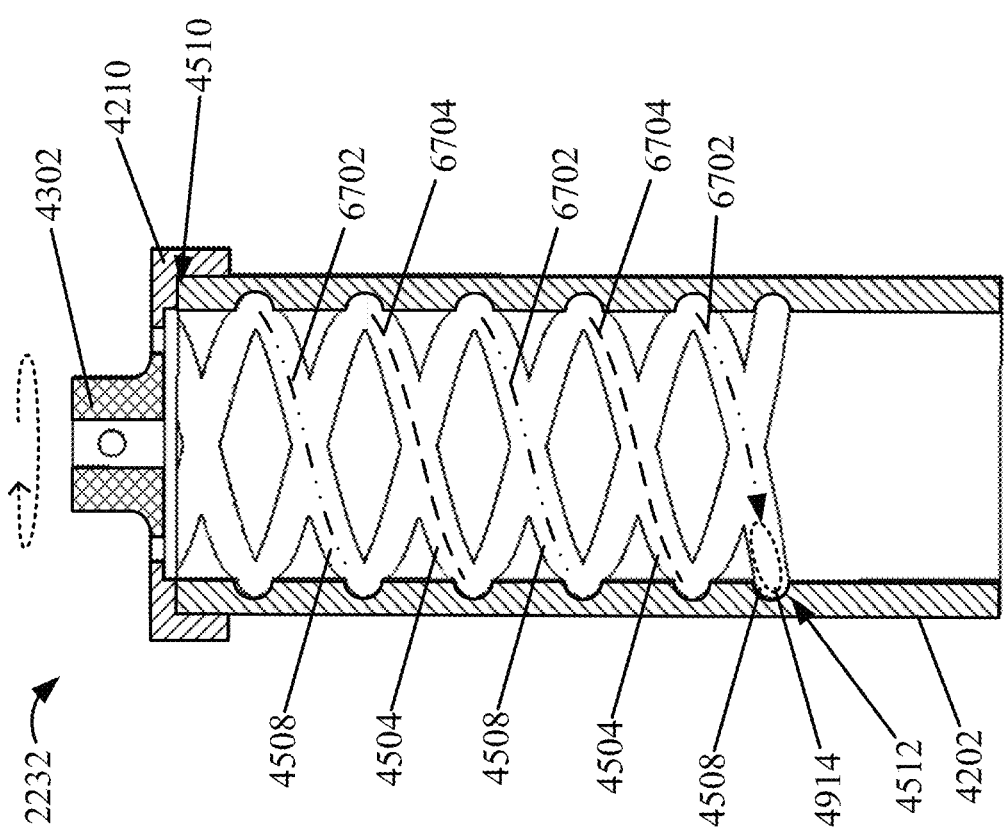

Referring to FIG. 65, a first edge 6502 of the bottle lock inner member's second guide 3306 and a first edge 6504 of the bottle lock inner member's first guide 3304 may block the stopper securement device head's first lobe 4902 and second lobe 4904, respectively, from continually rotating clockwise (viewed top down). Similarly, a second edge 6506 of the bottle lock inner member's second guide 3306 and a second edge 6508 of the bottle lock inner member's first guide 3304 may block the stopper securement device head's first lobe 4902 and second lobe 4904, respectively, from continually rotating counterclockwise. Specifically, the first and second guide's edges 6502, 6504, 6506, 6508 may limit the rotational movement of the stopper securement device head 2234 to the range represented by the dashed, curved double arrow shown. In this fashion, the first and second guides 3304, 3306 may substantially prevent the stopper securement device head 2234 from continuously rotating within the device head guide 2232 as the device head guide 2232 itself continues to rotate.

Referring back to FIGS. 61-63, as the device head guide 2232 rotates (e.g., clockwise when view top down), the stopper securement device head 2234—and the attached stopper securement device 2006—is forced to move longitudinally (e.g., down) through the device head guide 2232 as its runners 4912, 4914 navigate the device head guide's second pair of grooves 4504, 4508. Thus, in one aspect of the disclosure, the motor 2230 does not directly rotate the stopper securement device head 2234 (or the attached stopper securement device 2206) but instead rotates the device head guide 2232, which in combination with the first and second guides 3304, 3306 of the inner member 2226, cause the stopper securement device head 2234 and the attached stopper securement device 2006 to move up or down longitudinally within the device 2200 and the device head guide 2232.

FIGS. 66-69 and 80 illustrate the device 2200 in a second state where the device's stopper securement device 2206 (see FIG. 22B) is lowered down and penetrates the bottle's stopper 105 for removal. Referring to FIGS. 61-63 and 66-68, to transition from the first state to the second state, the device head guide 2232 rotates in a first direction (e.g., clockwise), which causes the stopper securement device head 2234 to travel down the device head guide 2232. Specifically, in the example shown, the first and second runners 4912, 4914 on the stopper securement device head 2234 travel helically down the second pair of grooves 4504, 4508 along the marked paths 6702, 6704 until the runners 4912, 4914 reach the grooves' base point 4512.

While the stopper securement device head 2234 moves longitudinally down the device head guide 2232, so too does the attached stopper securement device 2206. Referring to FIGS. 54, 59, 60, 61, and 66, as the stopper securement device 2206 makes its way down the device head guide 2232, it approaches the spin control accessory 2238 located at the bottom 6104 of the device head guide 2232. The tip 5402 of the stopper securement device 2206 enters the spin control device's top opening 5704 first and makes its way down the spin control device's internal cavity 6002. The stopper securement device's tip 5402 then makes contact with the spin control device's bar 5902. As the stopper securement device 2206 is forced further down lower into the device head guide 2232, the stopper securement device's 2206 corkscrew shape causes it to rotate about its longitudinal axis to spin its way around past the bar 5902. The stopper securement device 2206 continues to move through the spin control device's internal cavity 6002 past the bar 5902 and penetrates the bottle's stopper 105. The stopper securement device 2206 comes to rest within the bottle's stopper 105 as the stopper securement device head's runners 4912, 4914 reach the grooves' base point 4512.

Figure 69:
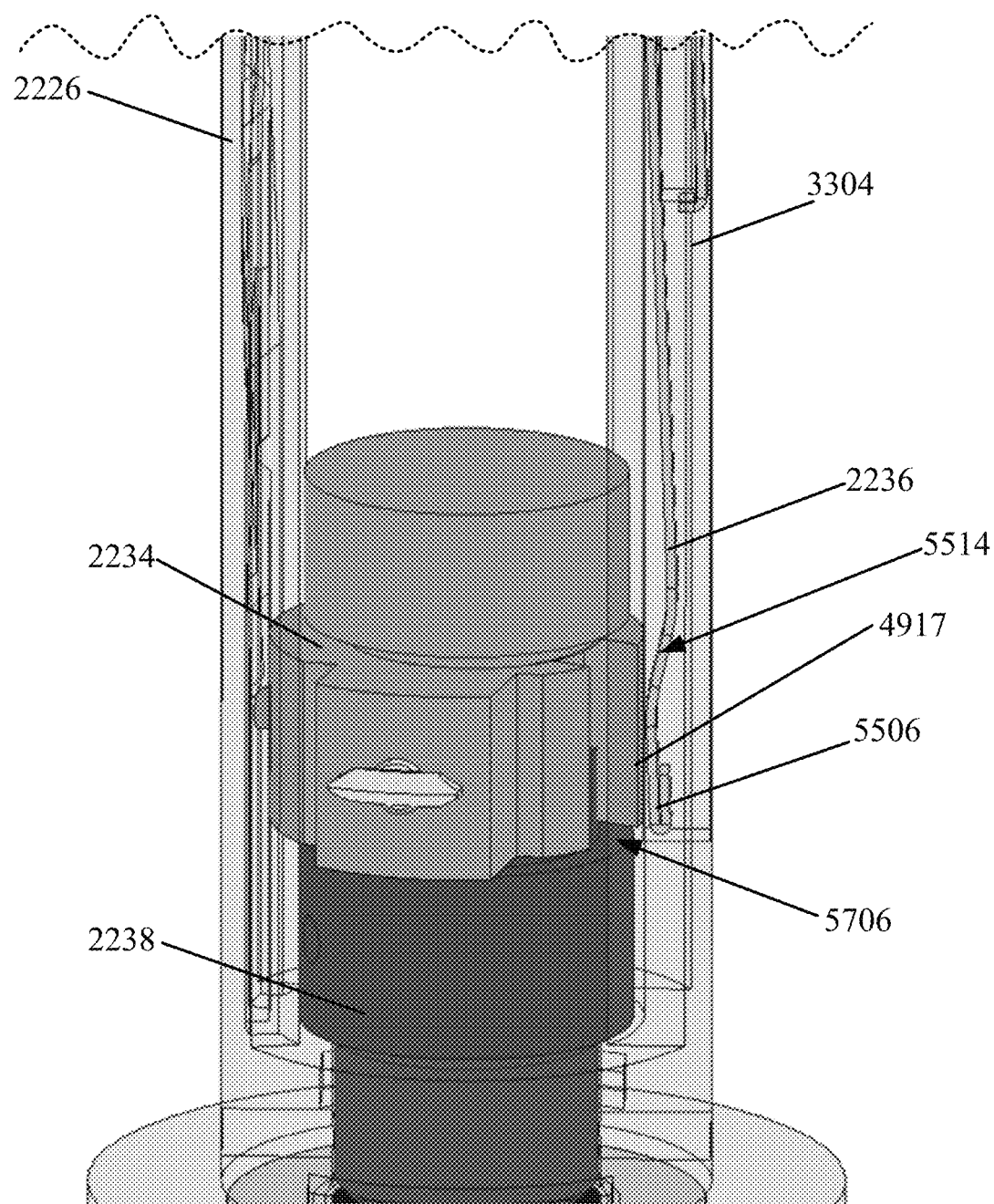
FIG. 69 illustrates a perspective view of the bottle lock inner member, the spin control accessory, the stopper securement device head, and the mode pin when the device is in the second state.

Referring to FIGS. 64, 69, and 80, as the stopper securement device head 2234 makes its way down the device head guide 2232, the device head's mode pin actuator 4917 presses against the mode pin's transition surface 5514 and bottom end 5506 pushing the mode pin's bottom end 5506 and termination point 5512 outward and away from the spin control device's pin abutment surface 5706. To keep the device head's mode pin actuator 4917 aligned with the mode pin 2236 and prevent it from rotating clockwise or counterclockwise while moving down the device head guide 2232, the stopper securement device head's retractable protrusion 5004 may travel straight down the inner member's second guide's first groove 8012 until it reaches position B 8004. The walls 8050 enclosing the first groove 8012 assure that the retractable protrusion 5004 follows the correct path down to position B 8004.

FIGS. 70-73 and 80 illustrate the device 2200 in a third state where the stopper securement device 2206 (see FIG. 22B) has pulled the bottle's stopper 105 out of the bottle's neck 11 and into the interior region 3312 of the bottle lock inner member's upper portion 3302. Referring to FIGS. 66-68 and 70-72, to transition from the second state to the third state, the device head guide 2232 continues to rotate in the first direction (e.g., clockwise), which now causes the stopper securement device head 2234 to travel up the device head guide 2232 after it reached the base point 4512 of the grooves. Specifically, in the example shown, the first and second runners 4912, 4914 on the stopper securement device head 2234 travel helically up the first pair of grooves 4502, 4506 along the marked paths 7102, 7104 until the runners 4912, 4914 reach a position (e.g., second position) near the top 4510 of the device head guide 2232. In some aspects of the disclosure, this position may be higher up than the first position 6202, 6302 the runners 4912, 4914 started at in FIGS. 62 and 63 at the first state.

Referring to FIGS. 47, 48, 67, 68, 71, and 72, the stopper securement device head 2234 begins to travel back up the device head guide 2232 even though the device head guide 2232 still rotates in the first direction because the first groove 4502 joins the fourth groove 4508 at the first groove transition point 4802 near the base point 4512 and the second groove 4504 joins the third groove 4506 at the second groove transition point 4702 near the base point 4512. In the example shown, the first runner 4912 crosses over from the second groove 4504 to the third groove 4506 on its way back up the device head guide 2232 while, similarly, the second runner 4914 crosses over from the fourth groove 4508 to the first groove 4502 on its way back up the device head guide 2232.

While the stopper securement device head 2234 moves longitudinally back up the device head guide 2232, so too does the attached stopper securement device 2206 with the stopper 105 attached thereto. Specifically, the stopper securement device 2206 pulls the attached stopper 105 up out of the bottle's neck 11 and through the bottle neck seal's top opening 3006 (see FIG. 30) and the bottle lock inner member's central opening 3402 (see FIGS. 34 and 35). The stopper securement device 2206 pulls the attached stopper 105 all the way up to the interior region 3312 of the bottle lock inner member's upper portion 3302. Referring to FIG. 35, the bottle lock inner member's inner surfaces 3502, 3504 may be concave to accommodate the cylindrical stopper 105.

Referring to FIGS. 54, 59, 60, 66, 69, 70, and 73, when the stopper securement device head 2234 moves longitudinally back up the device head guide 2232 during its transition from the second to the third state, the stopper securement device 2206 may not rotate about its longitudinal axis. Instead, the stopper securement device 2206 rises up through device head guide 2232 along with the stopper securement device head 2234 without substantial rotation because the spin control accessory 2238 is also pulled up by stopper securement device 2206. As described above, at the second state the device head's mode pin actuator 4917 presses against the mode pin's transition surface 5514 and bottom end 5506 thereby pushing the mode pin's bottom end 5506 and termination point 5512 outward and away from the spin control device's pin abutment surface 5706. This effectively releases the spin control accessory 2238 so that it is no longer being held in place at the bottom of the device head guide 2232 by the mode pin 2236 and is thus free to be pulled up along with the stopper securement device 2206 as the stopper securement device 2206 rises up.

FIG. 80 illustrates that during the transition from the second state to the third state, the stopper securement device head's retractable protrusion 5004 travels from position B 8004 to position C 8006. Specifically, the retractable protrusion 5004 travels back up the second guide's first groove 8012 past position A and over a first one-way ledge 8052 to fall down into the second guide's second groove 8014 at position C 8006.

Once the device 2200 is in the third state and the bottle's stopper 105 has been removed, a user may remove the opened bottle 10 from the device 2200. Referring to FIGS. 22A, 22B, 37, and 38, the user may manipulate the bottle lock nut 2220 (e.g., twisting it counterclockwise) to place the bottle securement assembly 2202 in a "bottle unlock state" before removing the bottle 10 from the device 2200. The user is then able to access the contents (e.g., wine, liquid, herbs, etc.) of the bottle 10 as they wish. Once the user is done accessing the bottle's contents, they may use the device 2200 to reseal the bottle under vacuum.

To do so, the user may place the open bottle's neck 11 back into the device's bottom opening 2216 at the bottle-receiving end 2215 and manipulate the bottle lock nut 2220 (e.g. twisting it clockwise) to place the bottle lock securement assembly in a "bottle lock state" thereby locking the bottle's neck within the device 2200 and creating an airtight seal between the bottle's outer surface 3902 and the bottle securement assembly 2202 to prevent ambient air outside the device 2200 from entering the device's interior air cavity 2250 or the bottle's headspace 14. A user may then manipulate the controls 2212, 2213 of the device 2200 to begin resealing the bottle 10 under vacuum.

Figure 70:
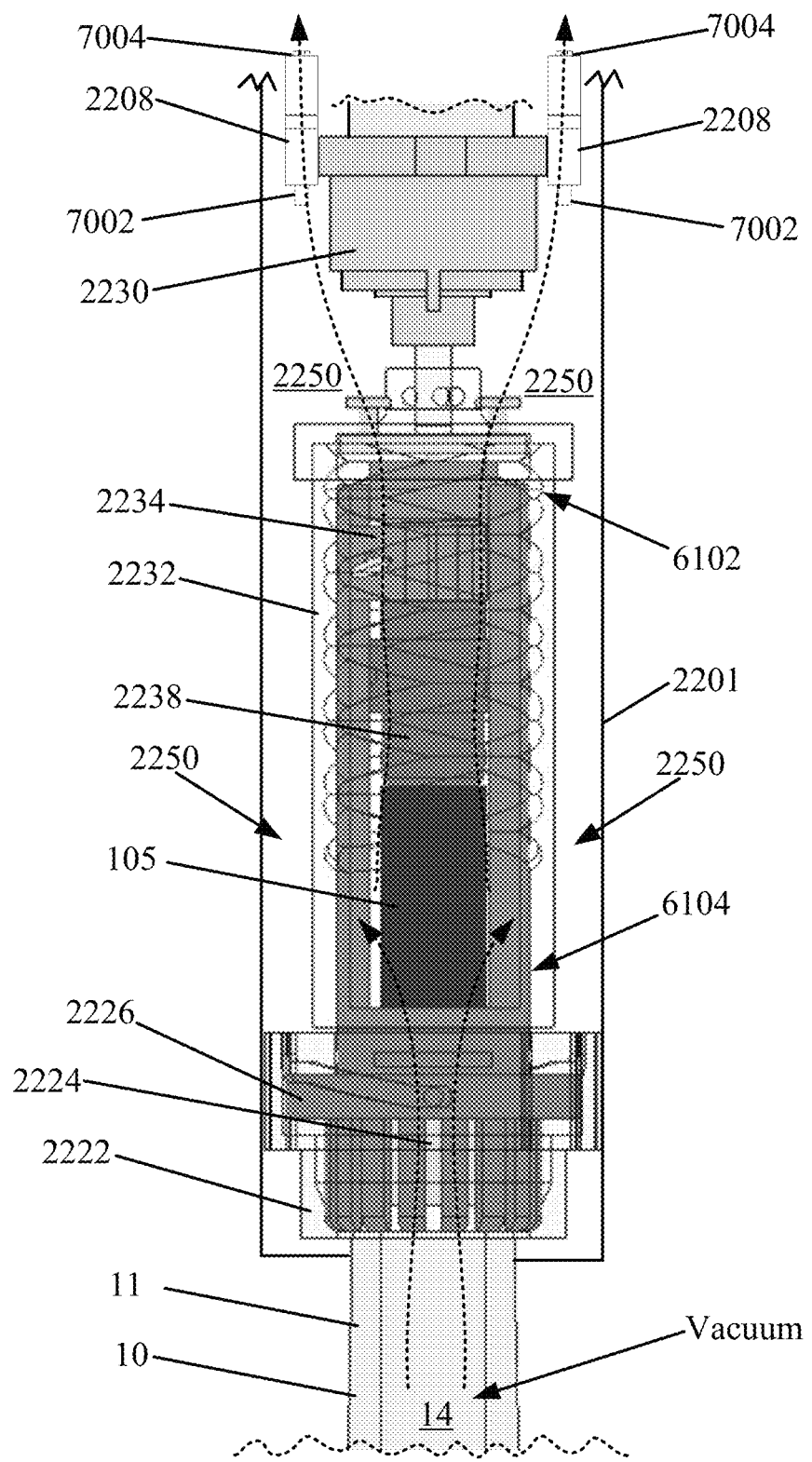
FIG. 70 illustrates a functional side view of a portion of the device in a third state and the bottle's headspace is undergoing evacuation.
Figures 71, 72:
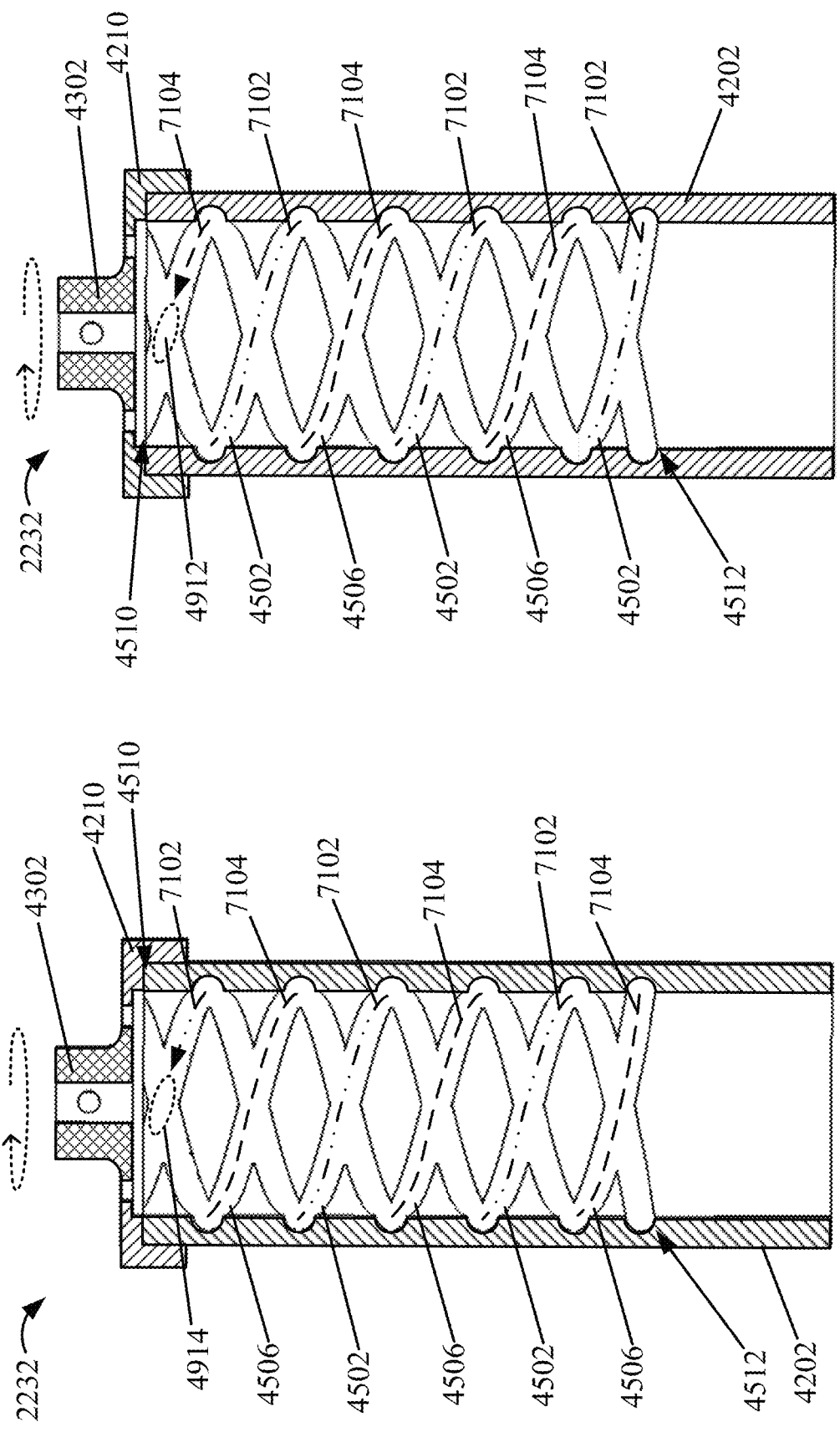
FIGS. 71 and 72 illustrate cross-sectional views of the device head guide and the position of the stopper securement device head's runners as the device transitions from the second state to the third state.
Figure 73:
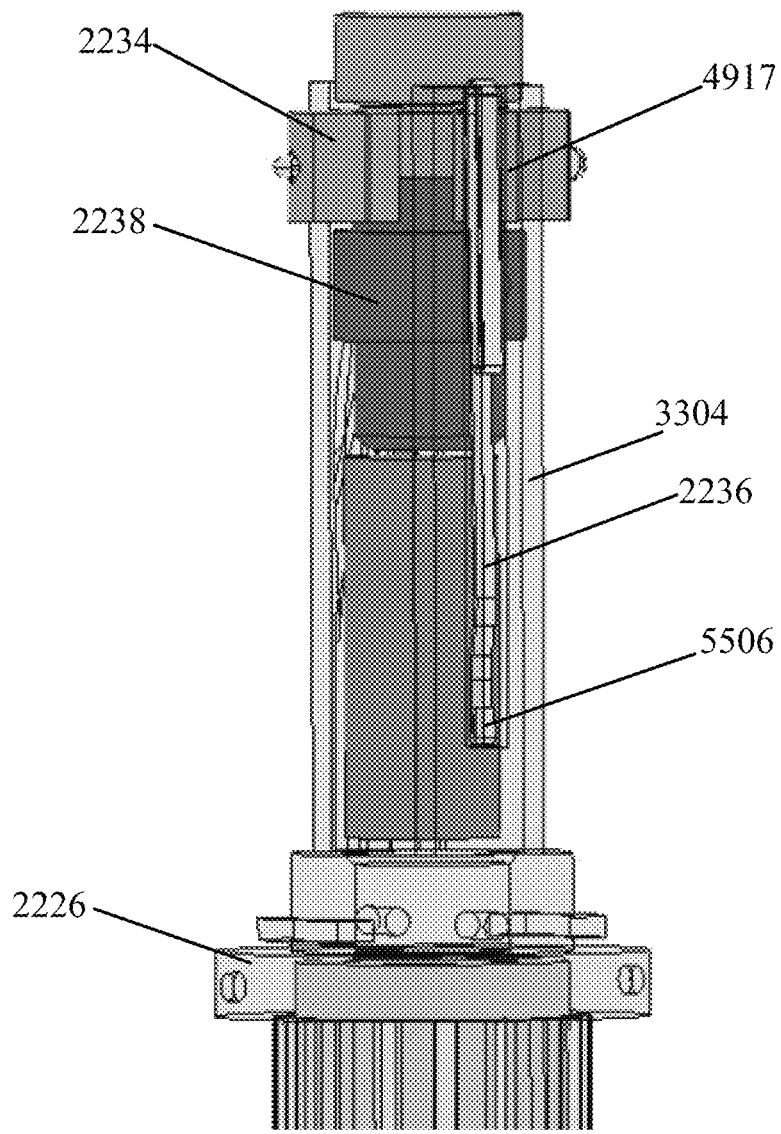
FIG. 73 illustrates a perspective view of the bottle lock inner member, the spin control accessory, the stopper securement device head, the stopper, and the mode pin when the device is in the third state.

Referring to FIG. 70, the device 2200 may then initiate evacuation of the bottle's headspace 14. The one or more vacuum pumps 2208 of the device 2200 may turn ON and begin pumping air out of the device's interior air cavity 2250 to the surrounding environment as indicated by the dashed arrows. Creating a low pressure region in the device's interior air cavity 2250 also draws air out from the bottle's headspace 14 since the two regions 14, 2250 are in fluid flow communication. The bottle neck seal 2224 also maintains an airtight seal between the device's interior air cavity 2250 and the outside environment so that air does not seep in through the device's bottom opening 2216 during the evacuation process. The vacuum pumps 2208 continue to draw air out from the bottle's headspace 14 and create a partial vacuum within the headspace 14 and interior air cavity 2250 until an acceptable air pressure level within these regions 14, 2250 has been attained. The vacuum pumps 2208 may include inlets 7002 within the interior air cavity 2250 of the main body 2201 to evacuate air from the interior air cavity 2250 and outlets 7004 at or near an exterior surface of the main body 2201 to eject the air evacuated outside the device 2200. The main body 2201 may also be designed and constructed so as to be hermetically sealed to prevent air from outside the device 2200 from seeping into the device's interior air cavity 2250 so that the interior air cavity 2250 may attain the appropriate level of vacuum or partial vacuum.

Figure 74:
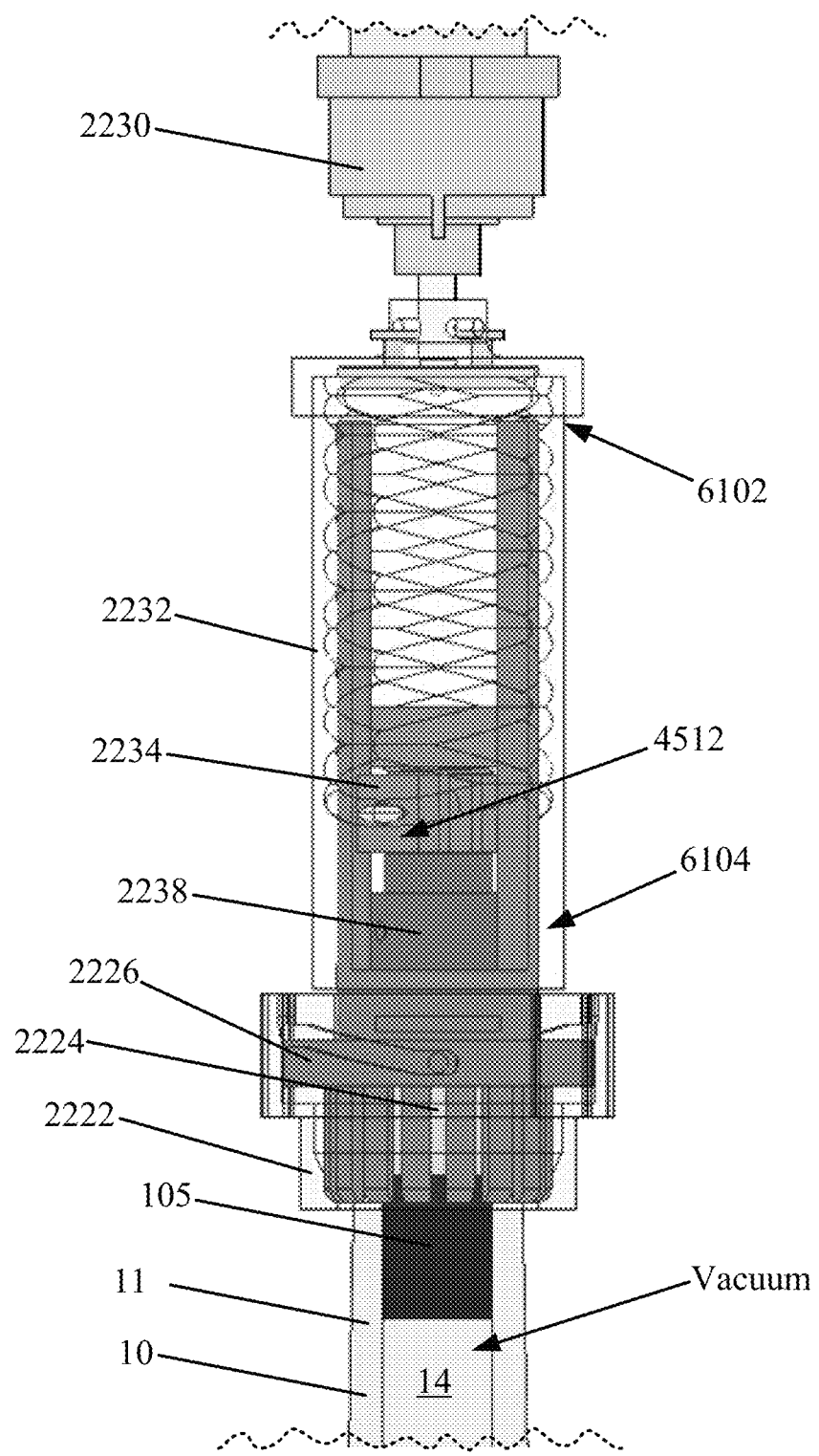
FIG. 74 illustrates a functional side view of a portion of the device in a fourth state.
Figure 76:
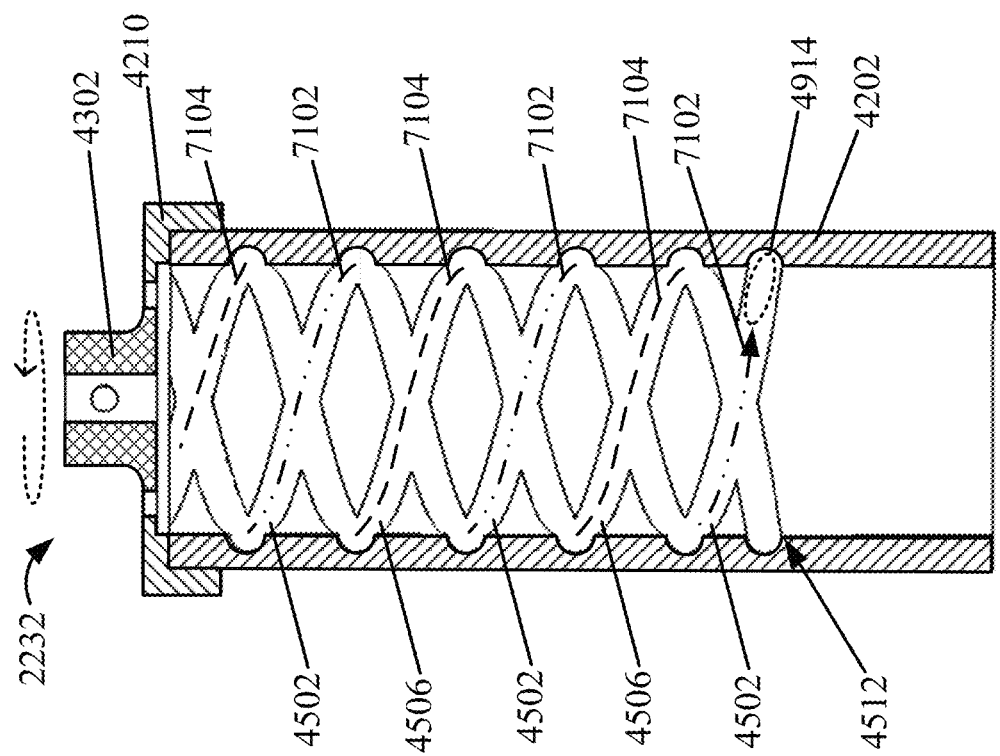
FIGS. 75 and 76 illustrate cross-sectional views of the device head guide and the position of the stopper securement device head's runners as the device transitions from the third state to the fourth state.
Figure 75:
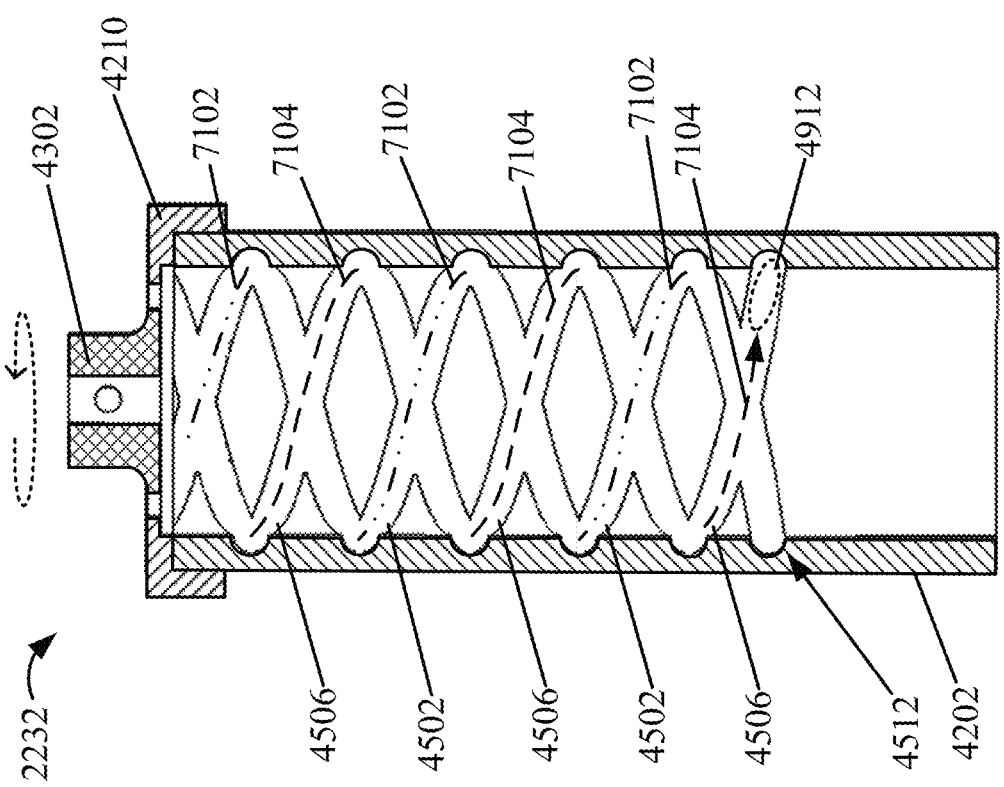

FIGS. 74-77 and 80 illustrate the device 2200 in a fourth state where the stopper securement device 2206 (see FIG. 22B) lowers the bottle's stopper 105 back into the bottle's neck 11 while the headspace 14 is still under vacuum or partial vacuum. Referring to FIGS. 70-72 and 74-76, to transition from the third state to the fourth state, the electric motor 2230 may now rotate in a second direction (e.g., counterclockwise) that is opposite the first direction of rotation. This causes the device head guide 2232 coupled to the motor 2230 to also rotate in the second direction. Referring to FIGS. 74-76, rotation of the device head guide 2232 in the second direction causes the stopper securement device head 2234 to also reverse course and travel back down the device head guide 2232. Specifically, in the example shown, the first and second runners 4912, 4914 on the stopper securement device head 2234 travel helically back down the first pair of grooves 4502, 4506 along the marked paths 7102, 7104 until the runners 4912, 4914 reach the base point 4512 of the device head guide 2232.

As the stopper securement device head 2234 travels back down, so too does the attached stopper securement device 2206, the stopper 105, and the spin control accessory 2238. Referring to FIGS. 30, 34, and 74, these components 2234, 2206, 105, 2238 continue down the device head guide 2232 until the stopper securement device 2206 and the stopper 105 pass back through the bottle lock inner member's central opening 3402 and the bottle neck seal's top opening 3006. In this fashion the stopper 105 is placed back into the bottle's neck 11 while the headspace 14 remains under vacuum.

Figure 77:
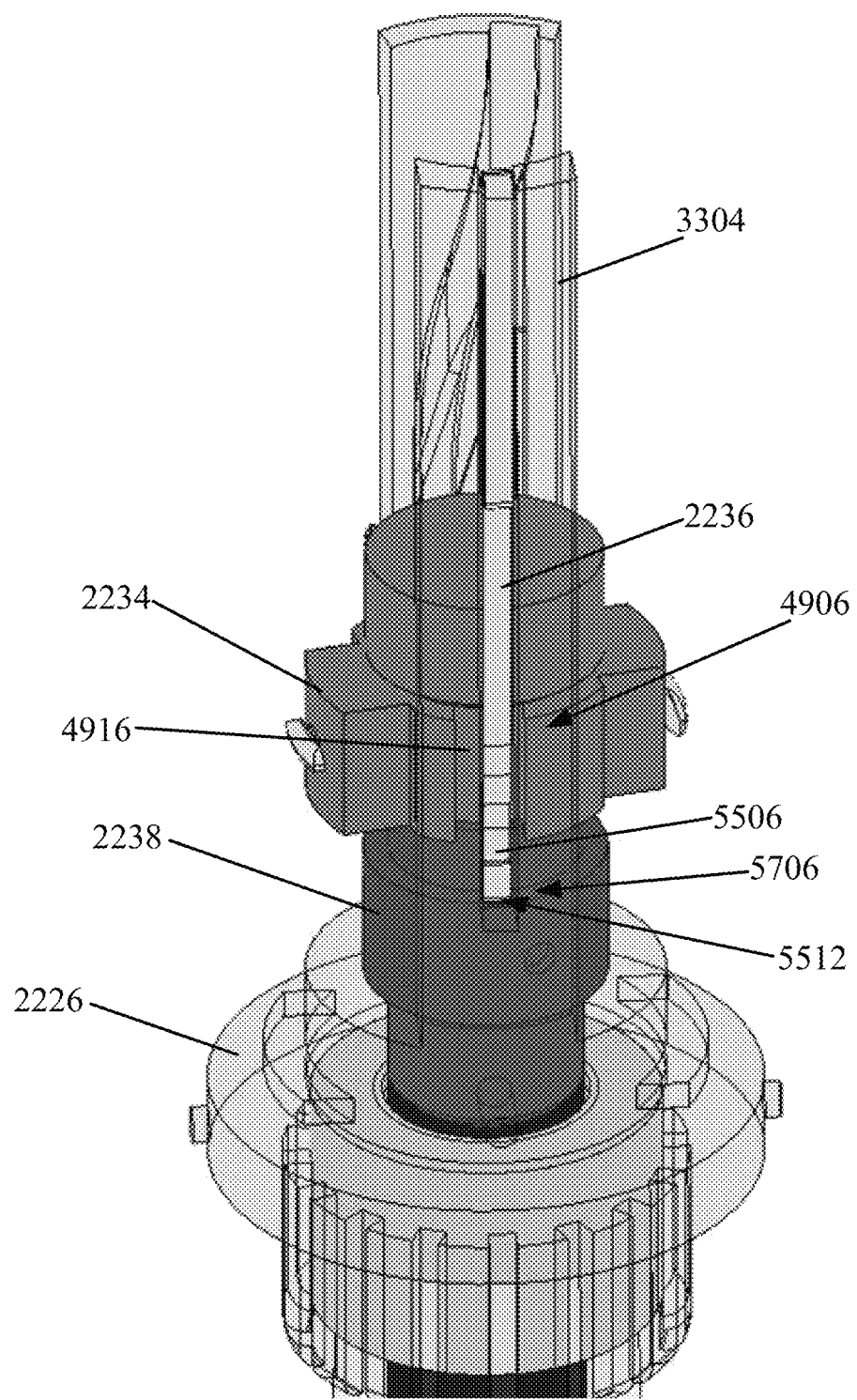
FIG. 77 illustrates a perspective view of the bottle lock inner member, the spin control accessory, the stopper securement device head, and the mode pin when the device is in the fourth state.
Figure 79:
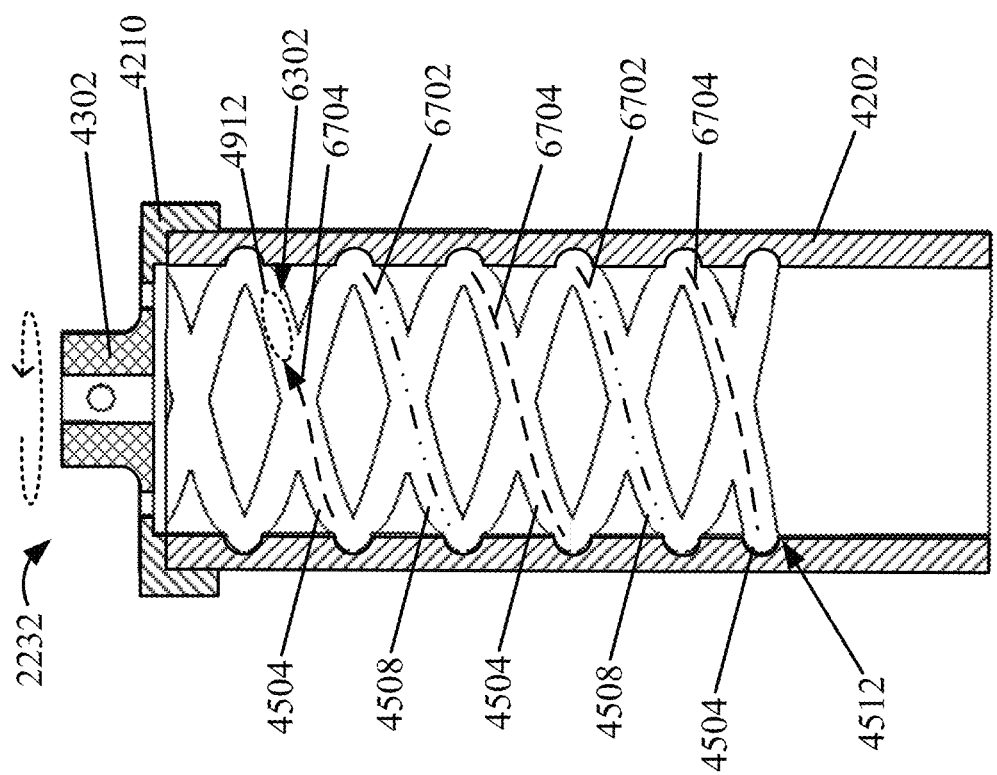
FIGS. 78 and 79 illustrate cross-sectional views of the device head guide and the position of the stopper securement device head's runners as the device transitions from the fourth state to the fifth state.
Figure 78:
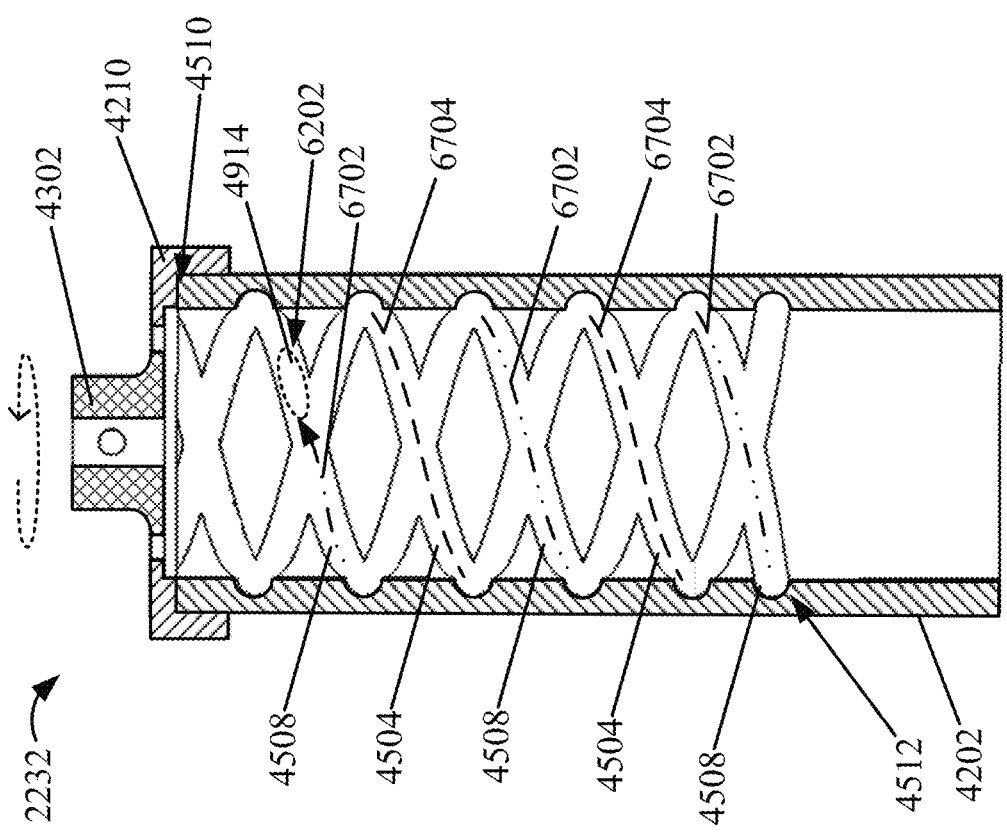

Referring to FIG. 80, the stopper securement device head's 2234 movement back down the device head guide 2232 during the device's transition from the third state to the fourth state, causes the stopper securement device head's retractable protrusion 5004 to travel from position C 8006 to position D 8008. Specifically, the retractable protrusion 5004 travels along the second guide's second groove 8014 and over a second one-way ledge 8054 to fall down into the second guide's third groove 8016 at position D 8008. Notably, the path 8056 from the position C 8006 to position D 8008 may be curved causing the stopper securement device head 2234 to rotate in the process. Referring to FIG. 77, this rotation causes the stopper securement device head's mode pin bypass channel 4916 to align with the mode pin 2236. Referring to FIGS. 74, 77, and 80, as the stopper securement device head 2234 moves down the device head guide 2232, the mode pin bypass channel 4916 accommodates the mode pin's bottom end 5506 so that the mode pin's bottom end's termination point 5512 presses against the spin control device's pin abutment surface 5706 and locks the spin control accessory 2238 in place after the stopper securement device head 2234 reaches the bottom (i.e., runners 4912, 4912 reach the base point 4512 in FIGS. 75 and 76).

Once the device 2200 is in the fourth state and the stopper 105 has been reinserted into the bottle's neck 11, the device 2200 may go back to the first state shown in FIGS. 61 and 64. Referring to FIGS. 61-63, 74-76, 78, and 79, to transition from the fourth state to the first state, the device head guide 2232 continues to rotate in the second direction (e.g., counterclockwise), which now causes the stopper securement device head 2234 to travel up the device head guide 2232 after it reached the base point 4512 of the grooves. Specifically, in the example shown, the first and second runners 4912, 4914 on the stopper securement device head 2234 travel helically up the second pair of grooves 4504, 4508 along the marked paths 6702, 6704 until the runners 4912, 4914 reach the first position 6202, 6302.

Referring to FIGS. 47, 48, 62, 63, 75, 76, 78, and 79, the stopper securement device head 2234 begins to travel back up the device head guide 2232 even though the device head guide 2232 still rotates in the second direction because the first groove 4502 joins the fourth groove 4508 at the first groove transition point 4802 near the base point 4512 and the second groove 4504 joins the third groove 4506 at the second groove transition point 4702 near the base point 4512. In the example shown, the first runner 4912 crosses over from the third groove 4506 to the second groove 4504 on its way back up the device head guide 2232 while, similarly, the second runner 4914 crosses over from the first groove 4502 to the fourth groove 4508 on its way back up the device head guide 2232.

Referring to FIGS. 64 and 77, as the stopper securement device head 2234 travels back up the device head guide 2232, the spin control accessory 2238 remains in place at the bottom of the device head guide 2232 because the mode pin's termination point 5512 presses down against the spin control device's pin abutment surface 5706. The mode pin bypass channel 4916 allows the stopper securement device head 2234 to pull up and away from the spin control accessory 2238 without pushing the mode pin's bottom end 5506 outward.

Referring to FIGS. 54, 59, 60, 61, and 74, as the stopper securement device head 2234 makes its way up the device head guide 2232, so too does the attached stopper securement device 2206. Since the spin control accessory 2238 is held in place by the mode pin's bottom end 5506, the corkscrew shape of the stopper securement device 2206 causes it to rotate about its longitudinal axis to spin its way around past the spin control accessory's bar 5902. In this fashion, the stopper securement device 2206 rotationally withdraws out of the stopper 105 while leaving the stopper 105 in place within the bottle's neck 11.

Referring to FIG. 80, the stopper securement device head's 2234 movement back up the device head guide 2232 during the device's transition from the fourth state to the first state, causes the stopper securement device head's retractable protrusion 5004 to travel from position D 8008 to position A 8002. Specifically, the retractable protrusion 5004 travels along the second guide's third groove 8016 and over a third one-way ledge 8058 to fall down into the second guide's first groove 8012 at position A 8002. Notably, the path 8060 from the position D 8008 to position A 8002 may be curved causing the stopper securement device head 2234 to rotate in the process. Referring to FIG. 64, this rotation causes the stopper securement device head's mode pin actuator 4917 to align with the mode pin 2236. The device 2200 is now ready to repeat the entire process over again to open and then reseal another bottle under vacuum.

The devices 100, 1000, 2200 described herein are not limited to use with wine or bottle storing wine but may be used to preserve any fluid or substance (e.g., herbs, powders, coffee, spirits, juices, chemicals, etc.) under vacuum in a container. The devices 100, 1000, 2200 may also be modified in size to function similarly with bottles, jars, or containers of various sizes and shapes.

Moreover, the devices 100, 1000, 2200 described herein allow a bottle 10 to be resealed under vacuum using the same stopper 105 it had before. No special, device-specific stoppers that are specifically adapted for use with the devices 100, 1000, 2200 are needed to reseal the bottle 10. This greatly reduces the cost and complexity of the devices 100, 1000, 2200 and also allows a user to reseal countless bottles without being limited to a specific number of device-specific stoppers available on hand. According to one aspect, the devices 100, 1000, 2200 may also be used to reseal the bottle using a stopper belonging to another bottle so long as the stopper has a size and shape corresponding to the bottle's neck.

One or more of the components, steps, features, and/or functions illustrated in FIGS. 1, 2, 3, 4, 5, 6, 7, 8, 9, 10, 11, 12, 13, 14, 15, 16, 17, 18, 19, 20, 21, 22A, 22B, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, and/or 80 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 4, 5, 6, 7, 8, 9, 10, 11, 12, 13, 14, 15, 16, 17, 18, 19, 20, 22A, 22B, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, and/or 80 may be configured to perform one or more of the methods, features, or steps described in FIG. 21. Some of the algorithms described herein may also be efficiently implemented in software and/or embedded in hardware.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different ways without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus comprising:
a main body having a bottle-receiving end that is configured to receive an end of a bottle having a mouth and form an airtight seal between an exterior surface of the bottle surrounding the bottle's mouth and an interior air cavity of the main body, the bottle-receiving end having a bottom opening to allow for fluid-flow communication between the interior air cavity and a headspace of the bottle;
an actuator assembly within the main body configured to drive a stopper securement device toward and away from the bottle-receiving end, the actuator assembly further configured to drive the stopper securement device into a stopper positioned within the mouth of the bottle and retract the stopper securement device to remove the stopper from the mouth of the bottle, wherein the actuator assembly includes
a device head guide having an internal cavity,
a stopper securement device head coupled to the stopper securement device, the stopper securement device head residing within the internal cavity of the device head guide, and
a motor configured to rotate the device head guide, wherein rotation of the device head guide in a first direction causes the stopper securement device head and the stopper securement device to move toward the bottom opening of the bottle-receiving end, and rotation of the device head guide in a second direction causes the stopper securement device head and the stopper securement device to move away from the bottom opening of the bottle-receiving end; and
a vacuum pump configured to evacuate air out of the interior air cavity and the headspace after the stopper has been removed to create a vacuum or partial vacuum within the headspace, wherein the actuator assembly is further configured to drive the stopper securement device and the stopper back into the mouth of the bottle to reseal the bottle while the headspace is under vacuum or partial vacuum.

2. The apparatus of claim 1, further comprising:
a bottle securement assembly configured to secure the end of the bottle having the mouth to the apparatus and form the airtight seal between the exterior surface of the bottle surrounding the bottle's mouth and the interior air cavity of the main body in a bottle lock state, the bottle securement assembly further configured to release the end of the bottle having the mouth from the apparatus in a bottle unlock state.

3. The apparatus of claim 2, wherein the bottle securement assembly comprises:
a bottle lock nut having an interior cavity and a bottom opening;
a bottle lock outer member that resides, at least in part, within the interior cavity of the bottle lock nut, the bottle lock outer member having a bottom opening;
a bottle lock inner member having a lower portion and an upper portion, the lower portion of the bottle lock inner member including a ring of flexible teeth that forms a bottom cavity; and
a bottle neck seal having a bottom opening, the bottle neck seal positioned, at least in part, within the bottom cavity of the bottle lock inner member's lower portion, and wherein the bottom openings of the bottle lock nut, bottle lock outer member, and the bottle neck seal are substantially aligned to allow the end of the bottle having the mouth to pass there through and rest within an internal cavity of the bottle neck seal.

4. The apparatus of claim 3, wherein the bottle lock inner member includes a central opening configured to allow a stopper to pass from the bottom cavity of the bottle lock inner member's lower portion to an interior region of the bottle lock inner member's upper portion, the bottle neck seal including a top opening opposite the bottle neck seal's bottom opening that is aligned with the bottle lock inner member's central opening.

5. The apparatus of claim 2, wherein the bottle securement assembly comprises:
a bottle lock nut having a bottom opening;
a bottle lock inner member including a ring of flexible teeth that forms a bottom cavity, the bottom cavity accessible via the bottle lock nut's bottom opening, and wherein the apparatus is placed in a bottle lock state by manipulating the bottle lock nut to cause the ring of flexible teeth to clamp down on an elastic material which presses against the exterior surface of the bottle surrounding the bottle's mouth to create a hermetic seal.

6. The apparatus of claim 1, wherein the device head guide includes a plurality of helical grooves along an inner surface of the device head guide's internal cavity, and the stopper securement device head includes at least one runner that resides in and navigates one or more of the plurality of helical grooves as the device head guide rotates to cause the stopper securement device head to move toward or away from the bottom opening of the bottle-receiving end.

7. The apparatus of claim 1, further comprising:
a bottle lock inner member having an upper portion that includes a first guide and a second guide, the first guide and the second guide extending into the device head guide's internal cavity through a bottom opening of the device head guide, the first guide and the second guide each having edges that limit rotational movement of the stopper securement device head.

8. The apparatus of claim 7, wherein the second guide includes at least one groove that receives a retractable protrusion on a rear face of the stopper securement device head.

9. The apparatus of claim 8, wherein the at least one groove of the second guide forms a path followed by the retractable protrusion that causes the stopper securement device head to rotate while the stopper securement device head moves toward or away from the bottom opening of the bottle-receiving end.

10. The apparatus of claim 1, further comprising:
a spin control accessory that resides within the internal cavity of the device head guide, the spin control accessory having a bottom opening and a top opening and an internal cavity there between, the spin control accessory including a bar that runs across the spin control accessory's internal cavity perpendicular to a longitudinal axis of the stopper securement device.

11. The apparatus of claim 10, wherein the spin control accessory is configured to remain fixed within the internal cavity of the device head guide while the stopper securement device traverses the spin control accessory's internal cavity causing the stopper securement device to rotate as the stopper securement device moves past the spin control accessory's bar.

12. The apparatus of claim 11, wherein a termination point at a bottom end of a mode pin presses against a surface of the spin control accessory to hold the spin control accessory fixed within the internal cavity of the device head guide.

13. The apparatus of claim 10, wherein the spin control accessory is configured to move up and down through the device head guide's internal cavity with the stopper securement device so the stopper securement device does not rotate as it moves toward or away from the bottom opening of the bottle-receiving end.

14. The apparatus of claim 10, wherein the stopper securement device head includes a pair of runners that navigate a first pair of helical grooves and a second pair of helical grooves that run along an inner surface of the device head guide's internal cavity, and when the apparatus is in a first state:
the pair of runners rest within a first position in the second pair of helical grooves, the stopper securement device head is located at a first position of the device head guide, and the spin control accessory is positioned at a bottom end of the device head guide.

15. The apparatus of claim 14, wherein when the apparatus transitions from the first state to a second state:
the pair of runners are configured to travel from the first position in the second pair of helical grooves to a groove transition point, the stopper securement device head is configured to travel down from the first position of the device head guide to a base point, and the stopper securement device is configured to rotate as it moves through the spin control accessory's internal cavity and past the spin control accessory's bar thereby penetrating into a stopper within a bottle positioned within the bottle opening of the bottle-receiving end.

16. The apparatus of claim 15, wherein when the apparatus transitions from the second state to a third state:
the pair of runners are configured to travel from the groove transition point to a second position in the first pair of helical grooves, the stopper securement device head is configured to travel up from the base point of the device head guide to a second position at a top end of the device head guide, the stopper securement device travels up along with the stopper securement device head to pull the stopper out of the bottle, and the spin control accessory moves up with the stopper securement device to prevent the stopper securement device from rotating.

17. The apparatus of claim 16, wherein when the apparatus transitions from the third state to a fourth state:
the vacuum pump is configured to evacuate air out of the interior air cavity and headspace of the bottle to create a vacuum or partial vacuum within the headspace, the pair of runners are configured to travel from the second position in the first pair of helical grooves to the groove transition point, the stopper securement device head is configured to travel down from the second position at the top end of the device head guide to the base point, the stopper securement device travels down along with the stopper securement device head to push the stopper back into the bottle while the headspace is under vacuum or partial vacuum, and the spin control accessory moving down with the stopper securement device to prevent the stopper securement device from rotating.

18. The apparatus of claim 17, wherein when the apparatus transitions from the fourth state to the first state:
the pair of runners are configured to travel from the groove transition point to the first position of the second pair of helical grooves, the stopper securement device head is configured to travel up from the base point to the first position of the device head guide, the stopper securement device travels up along with the stopper securement device head while rotating and withdrawing from the stopper, and the spin control accessory remains fixed within the internal cavity of the device head guide.

19. An apparatus comprising:
a housing having a bottle-receiving end that is configured to receive an end of a bottle having a mouth and form an airtight seal between an exterior surface of the bottle surrounding the bottle's mouth and an interior air cavity of the housing;
an actuator assembly within the housing configured to actuate a stopper securement device toward and away from the bottle-receiving end, the actuator assembly further configured to actuate the stopper securement device to penetrate into a stopper positioned within the mouth of the bottle and retract the stopper securement device to remove the stopper from the mouth of the bottle, the housing's interior air cavity configured to temporarily retain the stopper, wherein the actuator assembly includes
a device head guide having an internal cavity,
a stopper securement device head coupled to the stopper securement device, the stopper securement device head residing within the internal cavity of the device head guide, and
a motor configured to rotate the device head guide, wherein rotation of the device head guide in a first direction causes the stopper securement device head and the stopper securement device to move toward a bottom opening of the bottle-receiving end, and rotation of the device head guide in a second direction causes the stopper securement device head and the stopper securement device to move away from the bottom opening of the bottle-receiving end; and
a vacuum pump configured to evacuate air out of the interior air cavity and the headspace after the stopper has been removed to create a vacuum or partial vacuum within the headspace, wherein the actuator assembly is further configured to actuate the stopper securement device to push the stopper back into the mouth of the bottle to reseal the bottle while the headspace is under vacuum or partial vacuum.

* * * * *